U S011085946B2

(12) United States Patent　　(10) Patent No.: US 11,085,946 B2
Tanaka　　(45) Date of Patent: Aug. 10, 2021

(54) PHYSICAL QUANTITY SENSOR, PHYSICAL QUANTITY SENSOR DEVICE, ELECTRONIC DEVICE, AND MOBILE BODY

(71) Applicant: Seiko Epson Corporation, Tokyo (JP)

(72) Inventor: Satoru Tanaka, Chino (JP)

(73) Assignee: Seiko Epson Corporation

( * ) Notice: Subject to any disclaimer, the term of this patent is extended or adjusted under 35 U.S.C. 154(b) by 173 days.

(21) Appl. No.: 16/111,287

(22) Filed: Aug. 24, 2018

(65) Prior Publication Data

US 2019/0064203 A1　Feb. 28, 2019

(30) Foreign Application Priority Data

Aug. 25, 2017　(JP) .............................. JP2017-162281

(51) Int. Cl.
| | |
|---|---|
| *G01P 15/125* | (2006.01) |
| *G01P 3/44* | (2006.01) |
| G01P 1/07 | (2006.01) |
| G01P 15/08 | (2006.01) |

(52) U.S. Cl.
CPC .............. *G01P 15/125* (2013.01); *G01P 3/44* (2013.01); *G01P 1/07* (2013.01); *G01P 2015/0814* (2013.01); *G01P 2015/0831* (2013.01); *G01P 2015/0871* (2013.01)

(58) Field of Classification Search
CPC .. G01P 15/125; G01P 3/44; G01P 1/07; G01P 2015/0814; G01P 2015/0831; G01P 2015/0871; G01P 2015/0808; G01P 2015/0811
USPC .................... 73/511, 514.01, 514.32, 514.38
See application file for complete search history.

(56) References Cited

U.S. PATENT DOCUMENTS

| | | | |
|---|---|---|---|
| 5,983,721 | A | 11/1999 | Sulzberger et al. |
| 6,065,341 | A | 5/2000 | Ishio et al. |
| 7,322,242 | B2 | 1/2008 | Merassi et al. |
| 8,516,890 | B2 | 8/2013 | Rehle |
| 2004/0182157 | A1 | 9/2004 | Sakai et al. |

(Continued)

FOREIGN PATENT DOCUMENTS

| | | |
|---|---|---|
| JP | 2004-286615 A | 10/2004 |
| JP | 2007-139505 A | 6/2007 |

(Continued)

OTHER PUBLICATIONS

Extended European Search Report for Patent Application No. EP18190450.9, dated Jan. 21, 2019 (12 pages).

*Primary Examiner* — Robert R Raevis
(74) *Attorney, Agent, or Firm* — Harness, Dickey & Pierce, P.L.C.

(57) ABSTRACT

A physical quantity sensor includes a substrate, a fixed member fixed to the substrate, a movable member displaceable in a first direction with respect to the fixed member, a movable electrode assembly provided in the movable member, a fixed electrode assembly fixed to the substrate and opposing the movable electrode assembly in the first direction, and a restrictor configured to restrict a movable range of the movable member in the first direction. The movable member includes a first outer edge disposed on one side in the first direction and a second outer edge disposed on the other side. The restrictor includes at least one of a first restrictor facing the first outer edge across a gap and a second restrictor facing the second outer edge across another gap.

18 Claims, 46 Drawing Sheets

(56) References Cited

U.S. PATENT DOCUMENTS

| | | | |
|---|---|---|---|
| 2010/0223997 A1* | 9/2010 | Geisberger | G01P 15/125 |
| | | | 73/514.32 |
| 2012/0073370 A1* | 3/2012 | Schubert | G01P 15/125 |
| | | | 73/504.12 |
| 2013/0299923 A1* | 11/2013 | Classen | B81B 3/0018 |
| | | | 257/415 |
| 2014/0196542 A1 | 7/2014 | Naruse | |
| 2015/0059474 A1 | 3/2015 | Tanaka | |
| 2016/0061858 A1 | 3/2016 | Tanaka | |
| 2016/0370397 A1* | 12/2016 | Lin | G01P 15/18 |
| 2018/0328959 A1* | 11/2018 | Classen | B81B 5/00 |

FOREIGN PATENT DOCUMENTS

| | | |
|---|---|---|
| JP | 2010-238921 A | 10/2010 |
| JP | 2013-024765 A | 2/2013 |

\* cited by examiner

PHYSICAL QUANTITY SENSOR, PHYSICAL QUANTITY SENSOR DEVICE, ELECTRONIC DEVICE, AND MOBILE BODY

BACKGROUND

1. Technical Field

The present invention relates to a physical quantity sensor, a physical quantity sensor device, an electronic device, and a mobile body.

2. Related Art

An acceleration sensor described in JP-A-2013-24765 includes a glass substrate and a silicon substrate bonded to the upper surface of the glass substrate. From the silicon substrate, a stem, a spring that connects the stem and the glass substrate to enable the stem to be displaced in a detection axis direction with respect to the glass substrate, a plurality of comb teeth-like movable electrodes extending in a direction orthogonal to the detection axis direction from both sides of the stem, and a plurality of comb teeth-like fixed electrodes fixed to the glass substrate and extending in the direction orthogonal to the detection axis direction are formed. In such an acceleration sensor, a weight (proof mass) is displaced by acceleration applied thereto, whereby capacitance between the comb teeth-like movable electrode and the comb teeth-like fixed electrode paired with each other changes. The acceleration sensor can detect the received acceleration on the basis of a change in the capacitance. In the acceleration described in JP-A-2013-24765, a stopper that limits a movable range of the stem when an excessive shock or the like is applied is provided to achieve improvement of shock resistance. The stopper is configured by a projection projecting from the comb teeth-like movable electrode toward the comb teeth-like fixed electrode paired with the comb teeth-like movable electrode or a projection oppositely projecting from the comb teeth-like fixed electrode toward the comb teeth-like movable electrode paired with the comb teeth-like fixed electrode. The projection collides with the comb teeth-like movable electrode or the comb tooth-like fixed electrode to limit the movable range of the stem.

However, when the projection provided in the comb tooth-like fixed electrode collides with the comb tooth-like movable electrode having an elongated shape and low mechanical strength, the comb teeth-like movable electrode is highly likely to be damaged. Therefore, the acceleration sensor described in JP-A-2013-24765 does not have excellent shock resistance.

SUMMARY

An advantage of some aspects of the invention is to provide a physical quantity sensor, a physical quantity sensor device, an electronic device, and a mobile body having excellent shock resistance.

The invention can be implemented as the following configurations.

A physical quantity sensor according to an aspect of the invention includes: a substrate; a fixed member fixed to the substrate; a movable member displaceable in a first direction with respect to the fixed member; a movable electrode assembly provided in the movable member; a fixed electrode assembly fixed to the substrate and opposing the movable electrode assembly in the first direction; and a restrictor configured to restrict a movable range in the first direction of the movable member. The movable member includes: a first outer edge disposed on one side of the first direction along a second direction orthogonal to the first direction; and a second outer edge disposed on another side of the first direction along the second direction. The restrictor includes at least one of: a first restrictor facing the first outer edge across a gap on a side of the first outer edge opposite to a side of the fixed member; and a second restrictor facing the second outer edge across a gap on a side of the second outer edge opposite to a side of the fixed member.

With this configuration, a physical quantity sensor having excellent shock resistance is obtained.

In the physical quantity sensor according to the aspect of the invention, it is preferable that the first restrictor is disposed along an outer edge of the first outer edge, and the second restrictor is disposed along an outer edge of the second outer edge.

With this configuration, when the movable member is excessively displaced in the first direction, the movable member can be more surely brought into contact with the first restrictor or the second restrictor.

In the physical quantity sensor according to the aspect of the invention, it is preferable that at least one of the first restrictor and the second restrictor has elasticity in the first direction.

With this configuration, a shock during contact of the movable member and the restrictor can be mitigated. Damage to the movable member can be effectively reduced.

In the physical quantity sensor according to the aspect of the invention, it is preferable that at least one of the first restrictor the second restrictor has a slit extending along the second direction in a plan view from a normal direction of the substrate.

With this configuration, with a relatively simple configuration, elasticity can be imparted to the first and second restrictors in a first axial direction.

In the physical quantity sensor according to the aspect of the invention, it is preferable that a gap is formed between at least one of the first restrictor and the second restrictor and the substrate.

With this configuration, the first and second restrictors can be deflectively deformed in the first direction. Therefore, a shock during contact of the movable member and the restrictor can be mitigated. Damage to the movable member can be effectively reduced.

In the physical quantity sensor according to the aspect of the invention, it is preferable that at least one of the first restrictor and the second restrictor includes a plurality of stoppers disposed at intervals along the second direction.

With this configuration, a wire can be drawn around in a gap present between the stoppers adjacent to each other. The wire and the restrictor can be prevented from overlapping. Formation of parasitic capacitance between the wire and the restrictor can be reduced.

In the physical quantity sensor according to the aspect of the invention, it is preferable that the movable member includes: a third outer edge disposed along the first direction on one side of the second direction; and a fourth outer edge disposed along the first direction on another side of the second direction, and the restrictor includes: a third restrictor facing the third outer edge across a gap on a side of the third outer edge opposite to a side of the fixing section; and a fourth restrictor facing the fourth outer edge across a gap on a side of the fourth outer edge opposite to a side of the fixing section.

With this configuration, when the movable member is displaced in the second direction, the movable member comes into contact with the third restrictor or the fourth restrictor. Further displacement in the second direction is reduced. Therefore, excessive displacement of the movable member in the second direction can be reduced.

In the physical quantity sensor according to the aspect of the invention, it is preferable that the movable electrode assembly includes a movable electrode finger, extending longitudinally along the second direction, in a plan view from a normal direction of the substrate, the fixed electrode assembly includes a fixed electrode finger, extending longitudinally to be opposed to the movable electrode finger in the first direction along the second direction, and, when a separation distance along the first direction between the movable electrode finger and the fixed electrode finger opposed to each other is represented as G1, a separation distance along the first direction between the first outer edge and the first restrictor is represented as G2, and a separation distance along the first direction between the second outer edge and the second restrictor is represented as G3, G1>G2 and G1>G3 are satisfied.

With this configuration, contact of the movable electrode finger and the fixed electrode finger can be effectively reduced. Damage to the movable electrode finger and the fixed electrode finger can be effectively reduced.

In the physical quantity sensor according to the aspect of the invention, it is preferable that the restrictor has the same potential as potential of the movable member.

With this configuration, parasitic capacitance does not occur between the restrictor and the movable member. Deterioration in detection accuracy due to the parasitic capacitance can be effectively reduced.

In the physical quantity sensor according to the aspect of the invention, it is preferable that the movable member and the restrictor are made of the same material.

With this configuration, hardness of the movable member and hardness of the restrictor can be made uniform. When the movable member and the restrictor come into contact, damage to one of the movable member and the restrictor due to weaker strength can be effectively reduced.

In the physical quantity sensor according to the aspect of the invention, it is preferable that, when the movable member comes into contact with the restrictor, the movable member and the restrictor come into surface contact.

With this configuration, a shock of the contact of the movable member and the restrictor is dispersed. Damage to the movable member and the restrictor can be effectively reduced.

A physical quantity sensor according to another aspect of the invention includes: a substrate; a fixed member fixed to the substrate; a movable member displaceable in a first direction with respect to the fixed member and including an outer edge disposed along a second direction orthogonal to the first direction; a movable electrode assembly provided in the movable member; and a fixed electrode assembly fixed to the substrate and opposing the movable electrode assembly in the first direction. A restrictor is provided to be opposed to the outer edge across a gap on a side of the outer edge opposite to a side of the fixed member in a plan view.

A physical quantity sensor according to still another aspect of the invention includes: a substrate; a swinging body including a movable member including a first mass member and a second mass member, a fixed member disposed between the first mass member and the second mass member in a plan view and supported by the substrate, and a coupler coupling the movable member and the fixed member; a first fixed electrode assembly disposed on the substrate to be opposed to the first mass member; a second fixed electrode assembly disposed on the substrate to be opposed to the second mass member; and a restrictor configured to restrict a movable range of the swinging body in a direction in which the first mass member and the second mass member are arranged side by side in a plan view from a normal direction of the substrate. The restrictor includes at least one of: a first restrictor facing a first end, which is located on the first mass member side of the movable member, across a gap on an opposite side of a side of the fixed member with respect to the first end; and a second restrictor facing a second end, which is located on the second mass member side of the movable member, on an opposite side of a side of the fixed member with respect to the second end.

With this configuration, a physical quantity sensor having excellent shock resistance can be obtained.

A physical quantity sensor device according to still another aspect of the invention includes: the physical quantity sensor according to the aspect of the invention; and a circuit element.

With this configuration, the effects of the physical quantity sensor according to the aspect of the invention can be enjoyed. The physical quantity sensor device having high reliability can be obtained.

In the physical quantity sensor device according to the aspect of the invention, it is preferable that the circuit element is disposed to overlap the physical quantity sensor.

With this configuration, a reduction in the size of the physical quantity sensor device can be achieved.

In the physical quantity sensor device according to the aspect of the invention, it is preferable that the physical quantity sensor includes: an acceleration sensor; and an angular velocity sensor.

With this configuration, the physical quantity sensor device can be used as a composite sensor that can detect different physical quantities. Convenience of the physical quantity sensor device is improved.

An electronic device according to still another aspect of the invention includes: the physical quantity sensor according to the aspect of the invention; a control circuit; and a correction circuit.

With this configuration, the effects of the physical quantity sensor according to the aspect of the invention can be enjoyed. The electronic device having high reliability can be obtained.

A portable electronic device according to still another aspect of the invention includes: the physical quantity sensor according to the aspect of the invention; a case in which the physical quantity sensor is housed; a processor housed in the case and configured to process output data from the physical quantity sensor; a display housed in the case, and a light-transmissive cover closing an opening of the case.

With this configuration, the effects of the physical quantity sensor according to the aspect of the invention can be enjoyed. The portable electronic device having high reliability can be obtained.

A mobile body according to still another aspect of the invention includes: the physical quantity sensor according to the aspect of the invention; and a posture controller.

With this configuration, the effects of the physical quantity sensor according to the aspect of the invention can be enjoyed. The mobile body having high reliability can be obtained.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Embodiments of the invention are explained in detail below with reference to the accompanying drawings.

First Embodiment

First, a physical quantity sensor according to a first embodiment of the invention is explained.

Figure 1:
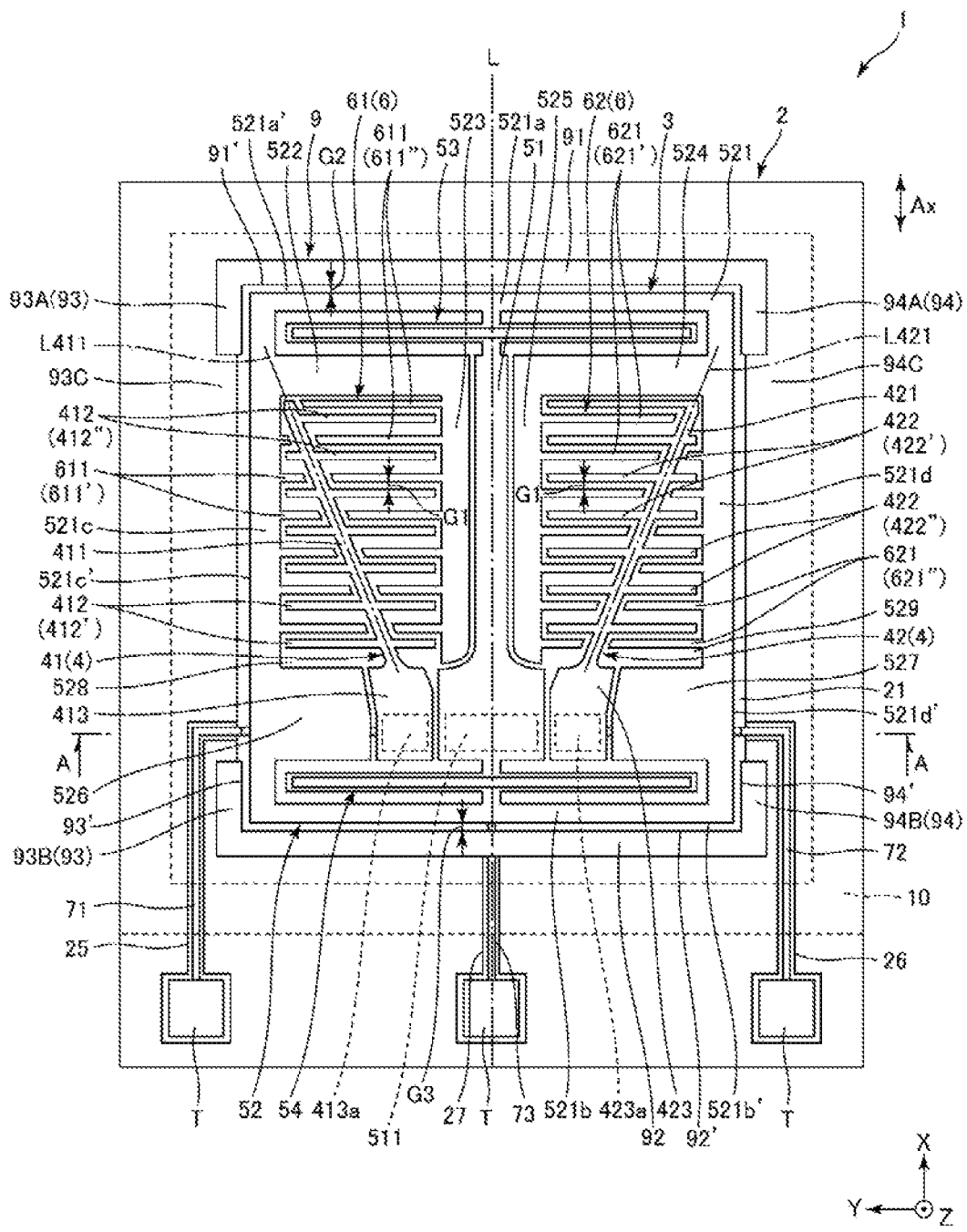
FIG. 1 is a plan view showing a physical quantity sensor according to a first embodiment of the invention.
Figure 2:
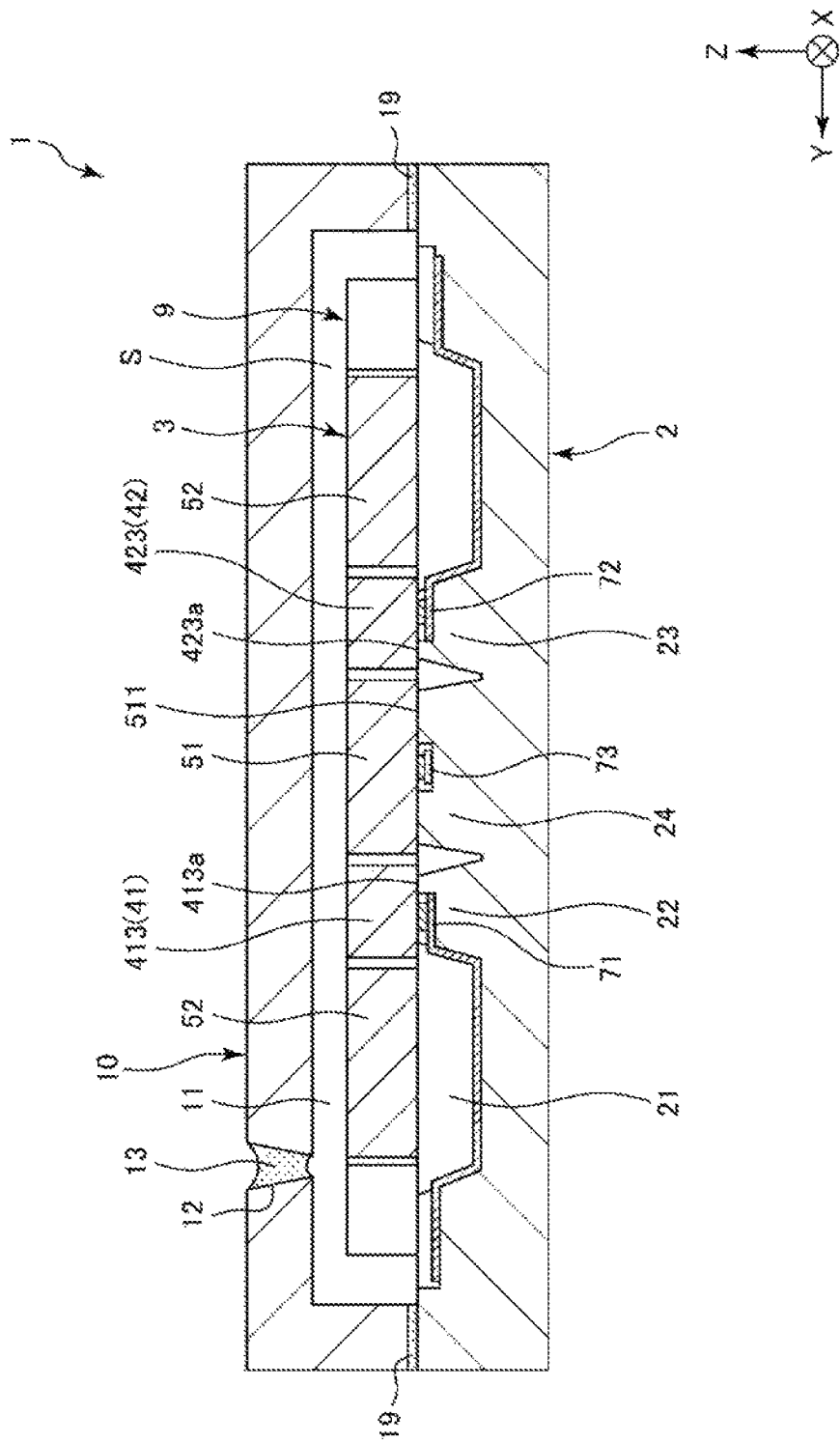
FIG. 2 is an A-A line sectional view in FIG. 1.
Figure 3:
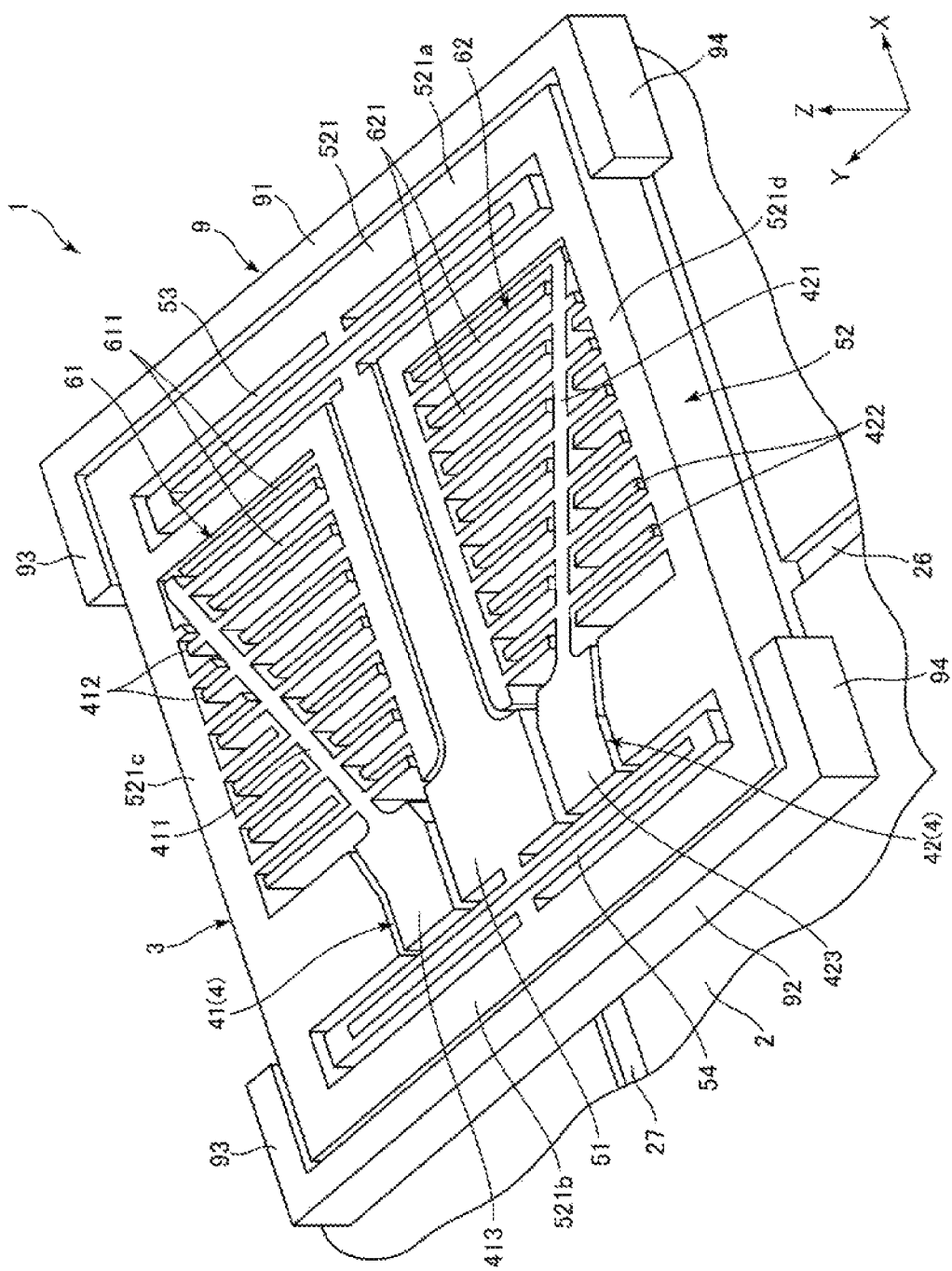
FIG. 3 is a perspective view of the physical quantity sensor shown in FIG. 1.
Figure 4:
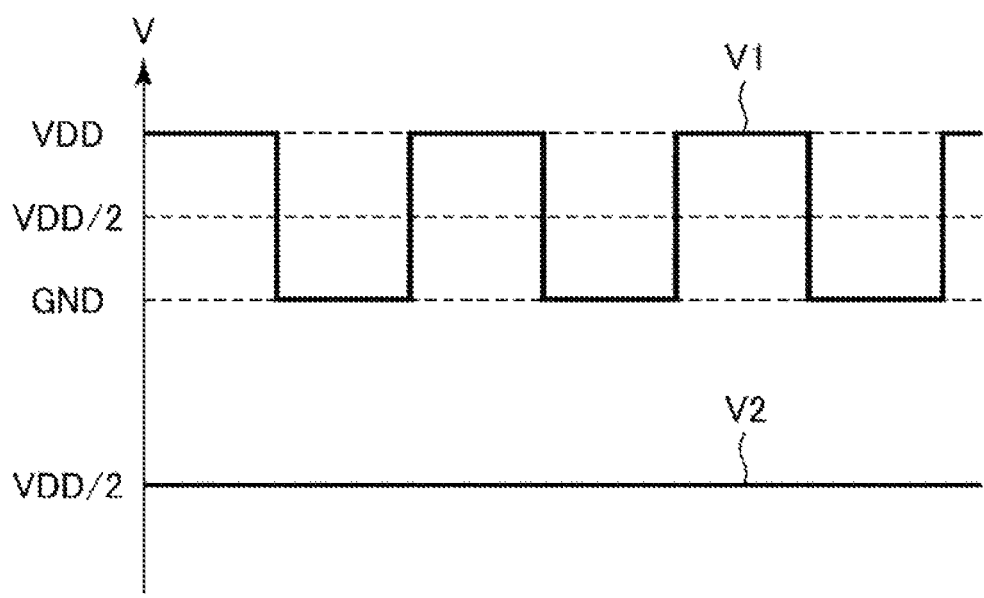
FIG. 4 is a diagram showing a voltage applied to the physical quantity sensor shown in FIG. 1.

FIG. 1 is a plan view showing the physical quantity sensor according to the first embodiment of the invention. FIG. 2 is an A-A line sectional view in FIG. 1. FIG. 3 is a perspective view of the physical quantity sensor shown in FIG. 1. FIG. 4 is a diagram showing a voltage applied to the physical quantity sensor shown in FIG. 1. Note that, in the following explanation, for convenience of explanation, a paper surface near side in FIG. 1 and an upper side in FIG. 2 are referred to as "upper" as well and a paper surface depth side in FIG. 1 and a lower side in FIG. 2 are referred to as "lower" as well. As shown in the figures, three axes orthogonal to one another are represented as an X axis, a Y axis, and a Z axis. A direction parallel to the X axis is referred to as "X-axis direction" as well. A direction parallel to the Y axis is referred to as "Y-axis direction" as well. A direction parallel to the Z axis is referred to as "Z-axis direction" as well. An arrow direction distal end side of the axes is referred to as "plus side" as well. The opposite side is referred to as "minus side" as well.

Note that, in this specification, "orthogonal" includes crossing at an angle slightly tilting from 90° (e.g., approximately 90°±10°) besides crossing at exactly 90°. Specifically, "orthogonal" includes tilting of the X axis at approximately ±10° with respect to the normal direction of a YZ plane, tilting of the Y axis at approximately ±10° with respect to the normal direction of an XZ plane, and tilting of the Z axis at approximately ±10° with respect to the normal direction of an XY plane.

A physical quantity sensor 1 shown in FIG. 1 is an acceleration sensor that can detect acceleration Ax in the X-axis direction. The physical quantity sensor 1 includes a substrate 2, an element assembly 3 provided on the substrate 2 and configured to detect the acceleration Ax (a physical quantity) in the X-axis direction, a restrictor 9 configured to restrict excessive displacement of the element assembly 3, and a lid body 10 bonded to the substrate 2 to cover the element assembly 3 and the restrictor 9.

Substrate

As shown in FIG. 1, the substrate 2 is formed in a tabular shape having a rectangular plan view shape. The substrate 2 includes a recess 21 opened to the upper surface side. In a plan view from the Z-axis direction, the recess 21 is formed larger than the element assembly 3 to include the element assembly 3 on the inner side. The recess 21 functions as open space for preventing contact of the element assembly 3 and the substrate 2. Note that a plan view shape of the substrate 2 is not particularly limited and may be any shape such as a triangle, a square other than a rectangle, a polygon such as a pentagon, a circle, an ellipse, or an irregular shape.

As shown in FIG. 2, the substrate 2 includes three protrusion-like mounts 22, 23, and 24 provided on the bottom surface of the recess 21. A first fixed electrode assembly is bonded to the mount 22, a second fixed electrode assembly 42 is bonded to the mount 23, and a fixed member 51 is bonded to the mount 24.

As shown in FIG. 1, the substrate 2 includes grooves 25, 26, and 27 opened to the upper surface side. One end of the grooves 25, 26, and 27 is respectively located on the outer side of the lid body 10. The other ends are respectively connected to the recess 21.

As the substrate 2 explained above, for example, a glass substrate made of a glass material including an alkali metal ion (a movable ion) (borosilicate glass such as Pyrex glass (registered trademark) or Tempax glass (registered trademark)) can be used. Consequently, as explained blow, the element assembly 3 and the substrate 2 can be bonded by anodic bonding and can be firmly bonded. Because the substrate 2 having light transmissivity is obtained, a state of the element assembly 3 can be visually recognized from the outer side of the physical quantity sensor 1 via the substrate 2.

However, the substrate 2 is not limited to the glass substrate. For example, a silicon substrate or a ceramic substrate may be used as the substrate 2. Note that, when the silicon substrate is used, from the viewpoint of preventing a short circuit, it is desirable to use a high-resistance silicon substrate or use a silicon substrate, on the surface of which a silicon oxide film (an insulating oxide) is formed by thermal oxidation or the like.

As shown in FIG. 1, wires 71, 72, and 73 are provided in the grooves 25, 26, and 27. One end of the wires 71, 72, and 73 is respectively exposed to the outer side of the lid body 10 and function as terminals T for electric connection to an external device. As shown in FIG. 2, the other end of the wire 71 is drawn around to the mount via the recess 21 and connected to the first fixed electrode assembly 41 on the mount 22. The other end of the wire 72 is drawn around to the mount 23 via the recess 21 and connected to the second fixed electrode assembly 42 on the mount 23. The other end of the wire 73 is drawn around to the mount 24 via the recess 21 and connected to the fixed member 51 on the mount 24.

A constituent material of the wires 71, 72, and 73 is not particularly limited. Examples of the constituent material include metal materials such as gold (Au), silver (Ag), platinum (Pt), palladium (Pd), iridium (Ir), copper (Cu), aluminum (Al), nickel (Ni), titanium (Ti), and tungsten (W), alloys containing the metal materials, and oxide-based transparent conductive materials such as ITO (Indium Tin Oxide), IZO (Indium Zinc Oxide), ZnO, and IGZO. One kind of these constituent materials can be used or two or more kinds of these constituent materials can be used in combination (e.g., as a stacked body of two or more layers).

Lid Body

As shown in FIG. 1, the lid body 10 is formed in a tabular shape having a rectangular plan view shape. As shown in FIG. 2 the lid body 10 includes a recess 11 opened to the lower surface side. The lid body 10 is bonded to the substrate 2 to house the element assembly 3 in the recess 11. A housing space S for housing the element assembly 3 is formed by the lid body 10 and the substrate 2. Note that the plan view shape of the lid body 10 is not particularly limited and is determined according to the plan view shape of the substrate 2. The plan view shape may be any shape such as a triangle, a square other than a rectangle, a polygon such as a pentagon, a circle, an ellipse, or an irregular shape.

As shown in FIG. 2, the lid body 10 includes a communication hole 12 for causing the inside and the outside of the housing space S to communicate. The housing space S can be replaced with a desired atmosphere via the communication hole 12. A sealing member 13 is disposed in the communication hole 12. The communication hole 12 is sealed by the sealing member 13.

The sealing member 13 is not particularly limited if the sealing member 13 can seal the communication hole 12. For example, various alloys such as a gold (Au)/tin (Sn)-based alloy, a gold (Au)/germanium (Ge)-based alloy, and a gold (Au)/aluminum (Al)-based alloy and a glass material such as low-melting point glass can be used.

It is desirable that an inert gas such as nitrogen, helium, or argon is encapsulated in the housing space S and the housing space S has nearly the atmospheric pressure at a working temperature (approximately −40° C. to 80° C.). By setting the housing space S to the atmospheric pressure, viscous resistance increases and a dumping effect is exerted. Vibration of a movable member 52 can be quickly converged (stopped). Therefore, detection accuracy of the acceleration Ax of the physical quantity sensor 1 is improved.

In this embodiment, such a lid body 10 is configured by a silicon substrate. However, the lid body 10 is not limited to the silicon substrate. For example, a glass substrate or a ceramic substrate may be used. A bonding method for the substrate 2 and the lid body 10 is not particularly limited and only has to be selected as appropriate according to the materials of the substrate 2 and the lid body 10. Examples of the bonding method include anodic bonding, activation bonding for bonding junction surfaces activated by plasma irradiation, bonding by a bonding material such as glass frit, and diffusion bonding for bonding metal films formed on the upper surface of the substrate 2 and the lower surface of the lid body 10.

In this embodiment, as shown in FIG. 2, the substrate 2 and the lid body 10 are bonded via glass frit (low-melting point glass), which is an example of a bonding material. In a state in which the substrate 2 and the lid body 10 are superimposed, the inside and the outside of the housing space S communicate via the grooves 25, 26, and 27. However, by using the glass frit 19, the substrate 2 and the lid body 10 can be bonded, the grooves 25, 26, and 27 can be sealed, and the housing space S can be more easily hermetically sealed. Note that, when the substrate 2 and the lid body 10 are bonded by the anodic bonding or the like (i.e., a bonding method that cannot seal the grooves 25, 26, and 27), for example, the grooves 25, 26, and 27 can be closed by a $SiO_2$ film formed by a CVD method or the like using TEOS (tetraethoxylilane).

Element Assembly

As shown in FIGS. 1 and 3, the element assembly 3 includes a fixed electrode assembly 4 fixed to the substrate 2, the fixed member 51 fixed to the substrate 2, the movable member 52 displaceable in the X-axis direction with respect to the fixed member 51, springs 53 and 54 configured to couple the fixed member 51 and the movable member 52, and a movable electrode assembly 6 provided in the movable member 52. The fixed member 51, the movable member 52, the springs 53 and 54, and the movable electrode assembly 6 are integrally formed.

The element assembly 3 can be formed by patterning, with etching (in particular, dry etching), a silicon substrate doped with an impurity such as phosphorus (P) or boron (B). The element assembly 3 is bonded to the substrate 2 (the mounts 22, 23, and 24) by the anodic bonding. However, a material of the element assembly 3 and a method of bonding the element assembly 3 to the substrate 2 are not particularly limited.

The fixed member 51 is formed in a longitudinal shape extending in the X-axis direction. The fixed member 51 includes a bonding surface 511 bonded to the mount 24 at an end on an X-axis direction minus side. Note that, in this embodiment, the fixed member 51 is formed in the longitudinal shape extending in the X-axis direction. However, the shape of the fixed member 51 is not particularly limited as long as the fixed member 51 can exert the function of the fixed member 51. In the following explanation, an imaginary axis that equally divides the fixed member 51 into two in the Y-axis direction in the plan view from the Z-axis direction is represented as a center axis L.

The fixed member 51 is located between the first fixed electrode assembly 41 and the second fixed electrode assembly 42. Consequently, the fixed member 51 can be disposed in the center of the movable member 52. The movable member 52 can be stably supported.

The movable member 52 is formed in a frame shape in the plan view from the Z-axis direction. The movable member 52 surrounds the fixed member 51, the springs 53 and 54, and the first and second fixed electrode assembly 41 and 42. By forming the movable member 52 in the frame shape in this way, the mass of the movable member 52 can be increased. Therefore, sensitivity is improved and a physical quantity can be accurately detected.

The movable member 52 includes a first opening 528, on the inner side of which the first fixed electrode assembly 41 is disposed, and a second opening 529, on the inner side of which the second fixed electrode assembly 42 is disposed. The first and second openings 528 and 529 are disposed side by side in the Y-axis direction. The movable member 52 is symmetrical with respect to the center axis L.

The shape of the movable member 52 is more specifically explained. The movable member 52 includes a frame 521 configured to surround the fixed member 51, the springs 53 and 54, and the first and second fixed electrode assemblies 41 and 42, a first Y-axis extending bar 522 located on an X-axis direction plus side of the first opening 528 and extending from the frame 521 to a Y-axis direction minus side, a first X-axis extending bar 523 extending from the distal end of the first Y-axis extending bar 522 to the X-axis direction minus side, a second Y-axis extending bar 524 located on the X-axis direction plus side of the second opening 529 and extending from the frame 521 to a Y-axis direction plus side, and a second X-axis extending bar 525 extending from the distal end of the second Y-axis extending bar 524 to the X-axis direction minus side. The first and second Y-axis extending bars 522 and 524 are respectively provided near the spring 53 and disposed along the Y-axis direction. The first and second X-axis extending bars 523 and 525 are respectively provided near the fixed member 51 and dispose along the fixed member 51.

In such a configuration, the first Y-axis extending bar 522 and the first X-axis extending bar 523 function as supports that support first movable electrode fingers 611. The second Y-axis extending bars 524 and the second X-axis extending bar 525 function as supports that support second movable electrode fingers 621.

The movable member 52 includes a first projection 526 projecting from the frame 521 into the first opening 528 to fill an excess space of the first opening 528 and a second projection 527 projecting from the frame 521 into the second opening 529 to fill an excess space of the second opening 529. By providing the first and second projections 526 and 527 in this way, it is possible to further increase the mass of the movable member 52 without causing an increase in the size of the movable member 52. Therefore, the physical quantity sensor 1 having higher sensitivity is obtained.

The springs 53 and 54 are elastically deformable. The springs 53 and 54 are elastically deformed, whereby the movable member 52 can be displaced in the X-axis direction with respect to the fixed member 51. As shown in FIG. 1, the spring 53 couples the end on the X-axis direction plus side of the movable member 52 and the end on the X-axis direction plus side of the fixed member 51. The spring 54 couples the end on the X-axis direction minus side of the movable member 52 and the end on the X-axis direction minus side of the fixed member 51. Consequently, the movable member 52 can be supported on both sides in the X-axis direction. The posture and the behavior of the movable member 52 are stabilized. Therefore, unnecessary vibration in directions other than the X-axis direction decreases. The acceleration Ax can be more accurately detected.

The fixed electrode assembly 4 includes the first fixed electrode assembly 41 located in the first opening 528 and the second fixed electrode assembly 42 located in the second opening 529. The first and second fixed electrode assemblies 41 and 42 are disposed side by side in the Y-axis direction.

The first fixed electrode assembly 41 includes a first fixed member 413 fixed to the substrate 2, a first stem 411 supported by the first fixed member 413, and a plurality of first fixed electrode fingers 412 extending from the first stem 411 to Y-axis direction on both sides. Note that the first fixed member 413, the first stem 411, and the first fixed electrode fingers 412 are integrally formed.

The first fixed member 413 includes a bonding surface 413a bonded to the mount 22. The bonding surface 413a is disposed eccentrically to the X-axis direction minus side of the first fixed member 413.

The first stem 411 is formed in a bar-like longitudinal shape. One end of the first stem 411 is connected to the first fixed member 413, whereby the first stem 411 is supported by the first fixed member 413. The first stem 411 extends in a direction inclined with respect to each of the X axis and the Y axis in the plan view from the Z-axis direction. Specifically, the first stem 411 is inclined such that a separation distance between the first stem 411 and the center axis L increases toward the distal end side of the first stem 411. By adopting such disposition, the first fixed member 413 is easily disposed near the fixed member 51.

Note that a tilt of an axis L411 of the first stem 411 with respect to the X axis is not particularly limited. However, the tilt is desirably 10° or more and 45° or less and more desirably 10° or more and 30° or less. Consequently, spread in the Y-axis direction of the first fixed electrode assembly 41 can be reduced. A reduction in the size of the element assembly 3 can be achieved.

The first fixed electrode fingers 412 extend from the first stem 411 to the Y-axis direction on both sides. That is, the first fixed electrode fingers 412 include first fixed electrode fingers 412' located on the Y-axis direction plus side of the first stem 411 and first fixed electrode fingers 412" located on the Y-axis direction minus side. Pluralities of the first fixed electrode fingers 412' and 412" are respectively provided to be separated from one another along the X-axis direction.

The length (the length in the Y-axis direction) of the plurality of first fixed electrode fingers 412' gradually decreases toward the X-axis direction plus side. The distal ends of the plurality of first fixed electrode fingers 412' are respectively located on the same straight line extending along the X-axis direction. On the other hand, the length (the length in the Y-axis direction) of the plurality of first fixed electrode fingers 412" gradually increases toward the X-axis direction plus side. The distal ends of the plurality of first fixed electrode fingers 412" are respectively located on the same straight line extending along the X-axis direction. Total lengths of the first fixed electrode fingers 412' and the first fixed electrode fingers 412" disposed side by side in the Y-axis direction are respectively substantially the same.

The second fixed electrode assembly 42 includes a second fixed member 423 fixed to the substrate 2, a second stem 421 supported by the second fixed member 423, and a plurality of second fixed electrode fingers 422 extending from the second stem 421 to the Y-axis direction on both sides. Note that the second fixed member 423, the second stem 421, and the second fixed electrode fingers 422 are integrally formed.

The second fixed member 423 includes a bonding surface 423a bonded to the upper surface of the mount 23. Note that the bonding surface 423a is disposed eccentrically to the X-axis direction minus side of the second fixed member 423.

The second stem 421 is formed in a bar-like longitudinal shape. One end of the second stem 421 is connected to the second fixed member 423, whereby the second stem 421 is supported by the second fixed member 423. The second stem 421 extends in a direction inclined with respect to each of the X axis and the Y axis in the plan view from the Z-axis direction. More specifically, the second stem 421 is inclined such that a separation distance between the second stem 421 and the center axis L increases toward the distal end side of the stem 421. By adopting such disposition, the second fixed member 423 is easily disposed near the fixed member 51.

Note that a tilt of an axis L421 of the second stem 421 with respect to the X axis is not particularly limited. However, the tilt is desirably 10° or more and 45° or less and more desirably 10° or more and 30° or less. Consequently, spread in the Y-axis direction of the second fixed electrode assembly 42 can be reduced. A reduction in the size of the element assembly 3 can be achieved.

The second fixed electrode fingers 422 extend from the second stem 421 to the Y-axis direction on both sides. That is, the second fixed electrode fingers 422 include second fixed electrode fingers 422' located on the Y-axis direction plus side of the second stem 421 and second fixed electrode fingers 422" located on the Y-axis direction minus side. Pluralities of the second fixed electrode fingers 422' and 422" are respectively provided to be separated from one another along the X-axis direction.

The length (the length in the Y-axis direction) of the plurality of second fixed electrode fingers 422' gradually increases toward the X-axis direction plus side. The distal ends of the plurality of second fixed electrode fingers 422' respectively located on the same straight line extending along the X-axis direction. On the other hand, the length (the length in the Y-axis direction) of the plurality of second fixed electrode fingers 422" gradually decreases toward the X-axis direction plus side. The distal ends of the plurality of second fixed electrode fingers 422" are respectively located on the same straight line extending along the X-axis direction. Total lengths of the second fixed electrode fingers 422' and the second fixed electrode fingers 422" disposed side by side in the Y-axis direction are respectively substantially the same.

The first fixed electrode assembly 41 and the second fixed electrode assembly 42 are explained above. The shape and the disposition of the first and second fixed electrode assemblies 41 and 42 are symmetrical with respect to the center axis L (except that the first and second fixed electrode fingers 412 and 422 deviate in the X-axis direction). In particular, the first and second stems 411 and 421 respectively extend in a direction inclined with respect to the X axis such that the separation distance between the first and second stems 411 and 421 and the center axis L gradually increases toward the distal end side. Therefore, the bonding surface 413a of the first fixed member 413 and the bonding surface 423a of the second fixed member 423 can be disposed near the bonding surface 511 of the fixed member 51. Therefore, it is possible to more effectively reduce a difference in deviation in the Z-axis direction between the movable member 52 and the fixed electrode assembly 4 at the time when a warp or a bend occurs in the substrate 2 because of heat, residual stress, or the like, specifically, a difference in deviation in the Z-axis direction between the first movable electrode fingers 611 and the first fixed electrode fingers 412 and a difference in deviation in the Z-axis direction between the second movable electrode fingers 621 and the second fixed electrode fingers 422.

In particular, in this embodiment, the bonding surface 413a of the first fixed member 413, the bonding surface 423a of the second fixed member 423, and the bonding surface 511 of the fixed member 51 are disposed side by side in the Y-axis direction. Consequently, the bonding surfaces 413a and 423a can be disposed nearer the bonding surface 511. The effects explained above become more conspicuous.

As shown in FIG. 1, the movable electrode assembly 6 includes a first movable electrode assembly 61 located in the first opening 528 and a second movable electrode assembly 62 located in the second opening 529. The first and second movable electrode assemblies 61 and 62 are disposed side by side in the Y-axis direction.

The first movable electrode assembly 61 includes a plurality of first movable electrode fingers 611 located on the Y-axis direction on both sides of the first stem 411 and extending in the Y-axis direction. That is, the first movable electrode fingers 611 include first movable electrode fingers 611' located on the Y-axis direction plus side of the first stem 411 and first movable electrode fingers 611" located on the Y-axis direction minus side. Pluralities of the first movable electrode fingers 611' and 611" are respectively provided to be separated from one another along the X-axis direction. The first movable electrode fingers 611' extend from the frame 521 toward the Y-axis direction minus side. The first movable electrode fingers 611" extend from the first X-axis extending bar 523 toward the Y-axis direction plus side.

The first movable electrode fingers 611 are located on the X-axis direction plus side with respect to the first fixed electrode fingers 412 corresponding to the first movable electrode fingers 611 and are opposed to the first fixed electrode fingers 412 via gaps.

The length (the length in the Y-axis direction) of the plurality of first movable electrode fingers 611' gradually decreases toward the X-axis direction plus side. The distal ends of the plurality of first movable electrode fingers 611' are respectively located on the same straight line extending along the extending direction of the first stem 411. On the other hand, the length (the length in the Y-axis direction) of the plurality of first movable electrode fingers 611" gradually increases toward the X-axis direction plus side. The distal ends of the plurality of first movable electrode fingers 611" are respectively located on the same straight line extending along the extending direction of the first stem 411. Total lengths of the first movable electrode fingers 611' and the first movable electrode fingers 611" disposed side by side in the Y-axis direction are respectively substantially the same.

The second movable electrode assembly 62 includes a plurality of second movable electrode fingers 621 located on the Y-axis direction on both sides of the second stem 421 and extending in the Y-axis direction. That is, the second movable electrode fingers 621 includes second movable electrode fingers 621' located on the Y-axis direction plus side of the second stem 421 and second movable electrode fingers 621" located on the Y-axis direction minus side. Pluralities of the second movable electrode fingers 621' and 621" are respectively provided to be separated from one another along the X-axis direction. The second movable electrode fingers 621' extend from the second X-axis extending bar 525 toward the Y-axis direction minus side. The second movable electrode fingers 621" extend from the frame 521 toward the Y-axis direction plus side.

The second movable electrode fingers 621 are located on the X-axis direction minus side with respect to the second fixed electrode fingers 422 corresponding to the second movable electrode fingers 621 and are opposed to the second fixed electrode fingers 422 via gaps.

The length (the length in the Y-axis direction) of the plurality of second movable electrode fingers 621' gradually increases toward the X-axis direction plus side. The distal ends of the plurality of second movable electrode fingers 621' are respectively located on the same straight line extending along the extending direction of the second stem 421. On the other hand, the length (the length in the Y-axis direction) of the plurality of second movable electrode fingers 621" gradually decreases toward the X-axis direction plus side. The distal ends of the plurality of second movable electrode fingers 621" are respectively located on the same straight line extending along the extending direction of the second stem 421. Total lengths of the second movable electrode fingers 621' and the second movable electrode fingers 621" disposed side by side in the Y-axis direction are respectively substantially the same.

The first movable electrode assembly 61 and the second movable electrode assembly 62 are explained above. The shape and the disposition of the first and second movable electrode assemblies 61 and 62 are symmetrical with respect to the center axis L (except that the first and second movable electrode fingers 611 and 621 deviate in the X-axis direction).

During the operation of the physical quantity sensor 1, for example, a voltage V1 shown in FIG. 4 is applied to the movable electrode assembly 6 and a voltage V2 shown in FIG. 4 is applied to each of the first fixed electrode assembly 41 and the second fixed electrode assembly 42. Therefore, capacitance is formed between the first movable electrode fingers 611 and the first fixed electrode fingers 412 and capacitance is formed between the second movable electrode fingers 621 and the second fixed electrode fingers 422.

When the acceleration Ax is applied to the physical quantity sensor 1, the movable member 52 is displaced in the X-axis direction while elastically deforming the springs 53 and 54 on the basis of the magnitude of the acceleration Ax. According to such displacement, the gaps between the first movable electrode fingers 611 and the first fixed electrode fingers 412 and the gaps between the second movable electrode fingers 621 and the second fixed electrode fingers 422 respectively change. According to this displacement, the magnitude of the capacitance between the first movable electrode fingers 611 and the first fixed electrode fingers 412 and the magnitude of the capacitance between the second movable electrode fingers 621 and the second fixed electrode fingers 422 respectively change. Therefore, the acceleration Ax can be detected on the basis of the changes of the capacitance.

As explained above, the first movable electrode fingers 611 are located on the X-axis direction plus side with respect to the first fixed electrode fingers 412 corresponding to the first movable electrode fingers 611. Conversely, the second movable electrode fingers 621 are located on the X-axis direction minus side with respect to the second fixed electrode finger 422 corresponding to the second movable electrode finger 621. Therefore, when the acceleration Ax is applied, the gaps between the first movable electrode fingers 611 and the first fixed electrode fingers 412 decrease and the gaps between the second movable electrode fingers 621 and the second fixed electrode fingers 422 increase or, conversely, the gaps between the first movable electrode fingers 611 and the first fixed electrode fingers 412 increase and the gaps between the second movable electrode fingers 621 and the second fixed electrode fingers 422 decrease. Therefore, by performing a differential operation of a first detection signal obtained from between the first fixed electrode fingers 412 and the first movable electrode fingers 611 and a second detection signal obtained from between the second fixed electrode fingers 422 and the second movable electrode fingers 621, noise can be cancelled and the acceleration Ax can be more accurately detected.

Note that the width of the first and second movable electrode fingers 611 and 621 and the width of the first and second fixed electrode fingers 412 and 422 are not respectively particularly limited. However, the widths can be set to, for example, 3 μm or more and 10 μm or less. Consequently, it is possible to reduce these widths while maintaining mechanical strength of the first and second movable electrode fingers 611 and 621 and the first and second fixed electrode fingers 412 and 422. Therefore, the first and second movable electrode fingers 611 and 621 and the first and second fixed electrode fingers 412 and 422 can be more densely disposed. Therefore, if the size of the physical quantity sensor 1 is the same, the first and second movable electrode fingers 611 and 621 and the first and second fixed electrode fingers 412 and 422 can be disposed more. Detection accuracy of the acceleration Ax is improved. If the number of the first and second movable electrode fingers 611 and 621 and the first and second fixed electrode fingers 412 and 422 is the same, a further reduction in the size of the physical quantity sensor 1 can be achieve.

Restrictor

As shown in FIG. 1, the restrictor 9 configured to restrict a movable range of the movable member 52 is disposed around the movable member 52. The restrictor 9 can be formed by patterning, with etching (in particular, dry etching), a silicon substrate doped with an impurity such as phosphorus (P) or boron (B). That is, the restrictor 9 is made of the same material as the material of the element assembly 3. The restrictor 9 is bonded to the upper surface of the substrate 2 by the anodic bonding.

In particular, in this embodiment, by patterning, with etching, a silicon substrate bonded to the upper surface of the substrate 2, the element assembly 3 and the restrictor 9 are collectively formed from the silicon substrate. Consequently, it is easy to position the element assembly 3 and the restrictor 9. Deviation from design values of the element assembly 3 and the restrictor 9 can be reduced. However, a material of the restrictor 9, a method of forming the restrictor 9, a method of bonding the restrictor 9 to the substrate 2, and the like are not particularly limited.

As shown in FIG. 1, the frame 521 of the movable member 52 includes a first outer edge 521a located on the X-axis direction plus side of the fixed member 51 and disposed along the Y-axis direction, a second outer edge 521b located on the X-axis direction minus side of the fixed member 51 and disposed along the Y-axis direction, a third outer edge 521c located on the Y-axis direction plus side of the fixed member 51 and disposed along the X-axis direction, and a fourth outer edge 521d located on the Y-axis direction minus side of the fixed member 51 and disposed along the X-axis direction.

As shown in FIG. 1, the restrictor 9 includes a first restrictor 91 located on the X-axis direction plus side of the first outer edge 521a and disposed to be opposed to the first outer edge 521a via a gap, a second restrictor 92 located on the X-axis direction minus side of the second outer edge 521b and disposed to be opposed to the second outer edge 521b via a gap, a third restrictor 93 located on the Y-axis direction plus side of the third outer edge 521c and disposed to be opposed to the third outer edge 521c via a gap, and a fourth restrictor 94 located on the Y-axis direction minus side of the fourth outer edge 521d and disposed to be opposed to the fourth outer edge 521d via a gap.

The movable member 52 comes into contact with the first restrictor 91, whereby displacement of the movable member 52 in the X-axis direction plus side is restricted. The movable member 52 comes into contact with the second restrictor 92, whereby displacement of the movable member 52 to the X-axis direction minus side is restricted. The movable member 52 comes into contact with the third restrictor 93, whereby displacement of the movable member 52 in the Y-axis direction plus side is restricted. The movable member 52 comes into contact with the fourth restrictor 94, whereby displacement of the movable member 52 in the Y-axis direction minus side is restricted. With the restrictor 9, while allowing displacement (displacement in the X-axis direction) for detection of the movable member 52, it is possible to reduce excessive displacement other than the desired displacement. Therefore, excessive stress does not occur in the element assembly 3. Damage to the element assembly 3 can be reduced. The physical quantity sensor 1 having excellent shock resistance is obtained.

The first restrictor 91 is disposed to extend in the Y-axis direction along the outer edge of the first outer edge 521a. Consequently, when the movable member 52 is displaced to the X-axis direction plus side, the movable member 52 can be more surely brought into contact with the first restrictor 91. A side surface 521a' of the first outer edge 521a and a contact surface 91' (a surface opposed to the side surface 521a') of the first restrictor 91 are respectively formed by YZ planes. Therefore, when the movable member 52 is displaced to the X-axis direction plus side, the first restrictor 91 and the first outer edge 521a come into surface contact. Consequently, a contact area of the first restrictor 91 and the first outer edge 521a increases. A shock of the contact is dispersed. Damage to the first restrictor 91 and the first outer edge 521a can be effectively reduced. However, the first restrictor 91 and the first outer edge 521a may come into line contact or may come into point contact.

Note that, in the first restrictor 91 and the first outer edge 521a, widths in the X-axis direction are desirably respectively 15 μm or more and 100 μm or less. Consequently, mechanical strength of the first restrictor and the first outer edge 521a is sufficiently high. Damage during the contact can be effectively reduced. Note that the widths in the X-axis direction of the first restrictor 91 and the first outer edge 521a may be the same or may be different.

The second restrictor 92 is disposed to extend in the Y-axis direction along the outer edge of the second outer edge 521b. Consequently, when the movable member 52 is displaced in the X-axis direction minus side, the movable member 52 can be more surely brought into contact with the second restrictor 92. A side surface 521b' of the second outer edge 521b and a contact surface 92' (a surface opposed to the side surface 521b') of the second restrictor 92 are respectively formed by YZ planes. Therefore, when the movable member 52 is displaced to the X-axis direction minus side, the second restrictor 92 and the second outer edge 521b come into surface contact. Consequently, a contact area of the second restrictor 92 and the second outer edge 521b increases. A shock of the contact is dispersed. Damage to the second restrictor 92 and the second outer edge 521b can be effectively reduced. However, the second restrictor 92 and the second outer edge 521b may come into line contact or may come into point contact.

Note that, in the second restrictor 92 and the second outer edge 521b, widths in the X-axis direction are desirably respectively 15 μm or more and 100 μm or less. Consequently, mechanical strength of the second restrictor and the second outer edge 521b is sufficiently high. Damage during the contact can be effectively reduced. Note that the widths in the X-axis direction of the second restrictor 92 and the second outer edge 521b may be the same or may be different.

The third restrictor 93 is disposed to extend in the X-axis direction along the outer edge of the third outer edge 521c. Consequently, when the movable member 52 is displaced in the Y-axis direction plus side, the movable member 52 can be more surely brought into contact with the third restrictor 93. The third restrictor 93 includes a first arm 93A located on the X-axis direction plus side and connected to the end on the Y-axis direction plus side of the first restrictor 91 and a second arm 93B located on the X-axis direction minus side and connected to the end on the Y-axis direction plus side of the second restrictor 92. A gap 93C is provided between the first and second arms 93A and 93B. The wire 71 is disposed to traverse the gap 93C. Therefore, the gap 93C can be considered to have a function of preventing overlap of the wire 71 and the restrictor 9.

A side surface 521$c'$ of the third outer edge 521$c$ and a contact surface 93' (a surface opposed to the side surface 521$c'$) of the third restrictor 93 are respectively formed by XZ planes. Therefore, when the movable member 52 is displaced to the Y-axis direction plus side, the third restrictor 93 and the third outer edge 521$c$ come into surface contact. Consequently, a contact area of the third restrictor 93 and the third outer edge 521$c$ increases. A shock of the contact is dispersed. Damage to the third restrictor 93 and the third outer edge 521$c$ can be effectively reduced. However, the third restrictor 93 and the third outer edge 521$c$ may come into line contact or may come into point contact.

Note that, in the third restrictor 93 and the third outer edge 521$c$, widths in the Y-axis direction are desirably respectively 10 μm or more and 100 μm or less. Consequently, mechanical strength of the third restrictor and the third outer edge 521$c$ is sufficiently high. Damage during the contact can be effectively reduced. Note that the widths in the Y-axis direction of the third restrictor 93 and the third outer edge 521$c$ may be the same or may be different.

The fourth restrictor 94 is disposed to extend in the X-axis direction along the outer edge of the fourth outer edge 521$d$. Consequently, when the movable member 52 is displaced in the Y-axis direction minus side, the movable member 52 can be more surely brought into contact with the fourth restrictor 94. The fourth restrictor 94 includes a first arm 94A located on the X-axis direction plus side and connected to the end on the Y-axis direction minus side of the first restrictor 91 and a second arm 94B located on the X-axis direction minus side and connected to the end on the Y-axis direction minus side of the second restrictor 92. A gap 94C is provided between the first and second arms 94A and 94B. The wire 72 is disposed to traverse the gap 94C. Therefore, the gap 94C can be considered to have a function of preventing overlap of the wire 72 and the restrictor 9.

A side surface 521$d'$ of the fourth outer edge 521$d$ and a contact surface 94' (a surface opposed to the side surface 521$d'$) of the fourth restrictor 94 are respectively formed by XZ planes. Therefore, when the movable member 52 is displaced to the Y-axis direction plus side, the fourth restrictor 94 and the fourth outer edge 521$d$ come into surface contact. Consequently, a contact area of the fourth restrictor 94 and the fourth outer edge 521$d$ increases. A shock of the contact is dispersed. Damage to the fourth restrictor 94 and the fourth outer edge 521$d$ can be effectively reduced. However, the fourth restrictor 94 and the fourth outer edge 521$d$ may come into line contact or may come into point contact.

Note that, in the fourth restrictor 94 and the fourth outer edge 521$d$, widths in the Y-axis direction are desirably respectively 10 μm or more and 100 μm or less. Consequently, mechanical strength of the fourth restrictor and the fourth outer edge 521$d$ is sufficiently high. Damage during the contact can be effectively reduced. Note that the widths in the Y-axis direction of the fourth restrictor 94 and the fourth outer edge 521$d$ may be the same or may be different.

A gap (a separation distance along the X-axis direction) between the first movable electrode finger 611 and the first fixed electrode finger 412 paired with each other and a gap (a separation distance along the X-axis direction) between the second movable electrode finger 621 and the second fixed electrode finger 422 paired with each other are respectively represented as G1, a gap (a separation distance along the X-axis direction) between the first outer edge 521$a$ and the first restrictor 91 is represented as G2, and a gap (a separation distance along the X-axis direction) between the second outer edge 521$b$ and the second restrictor 92 is represented as G3. Then, G1, G2, and G3 satisfy relations of G1>G2 and G1>G3.

Consequently, when the movable member 52 is displaced in the X-axis direction, the movable member 52 and the first restrictor 91 or the second restrictor 92 come into contact before the first movable electrode finger 611 and the first fixed electrode finger 412 paired with each other come into contact and the second movable electrode finger 621 and the second fixed electrode finger 422 paired with each other come into contact. Therefore, it is possible to surely reduce contact of the first movable electrode finger 611 and the first fixed electrode finger 412 paired with each other and the second movable electrode finger 621 and the second fixed electrode finger 422 paired with each other. It is possible to effectively reduce damage to the first and second movable electrode fingers 611 and 621 and the first and second fixed electrode fingers 412 and 422 and a short circuit of the first movable electrode finger 611 and the first fixed electrode finger 412 and a short circuit of the second movable electrode finger 621 and the second fixed electrode finger 422.

Note that G1, G2, and G3 desirably satisfy relations of 1.0<G1/G2<4.0 and 1.0<G1/G3<4.0 and more desirably satisfy relations of 1.0<G1/G2<1.5 and 1.0<G1/G3<1.5. Consequently, the effects explained above become more conspicuous. Specific values of G1, G2, and G3 are not particularly limited. However, for example, G1 can be set to approximately 2.5 μm and G2 and G3 can be respectively set to approximately 1.7 μm.

The restrictor 9 is electrically connected to the wire 73 and has the same potential as the potential of the movable member 52. Therefore, parasitic capacitance does not occur between the restrictor 9 and the movable member 52. Deterioration in detection accuracy due to the parasitic capacitance can be effectively reduced. As explained above, the wires 71 and 72 are respectively disposed not to overlap the restrictor 9. Therefore, parasitic capacitance less easily occurs between the wires 71 and 72 and the restrictor 9. Deterioration in detection accuracy due to the parasitic capacitance can be effectively reduced. However, not only this, but the restrictor 9 may have potential (e.g., ground) different from the potential of the movable member 52.

The physical quantity sensor 1 is explained in detail above. As explained above, the physical quantity sensor 1 includes the substrate 2, the fixed member 51 fixed to the substrate 2, the movable member 52 displaceable in the X-axis direction (a first direction) with respect to the fixed member 51, the movable electrode assembly 6 provided in the movable member 52, the fixed electrode assembly 4 fixed to the substrate 2 and disposed to be opposed to the movable electrode assembly 6 in the X-axis direction, and the restrictor 9 configured to restrict the movable range in the X-axis direction of the movable member 52. The movable member 52 includes the first outer edge 521$a$ disposed along the Y-axis direction orthogonal to the X-axis direction on the plus side (one side) in the X-axis direction and the second outer edge 521b disposed along the Y-axis direction on the minus side (the other side) in the X-axis direction. The restrictor 9 includes at least one of (in this embodiment both of) the first restrictor 91 disposed to be opposed to the first outer edge 521a via the gap on the side of the first outer edge portion 521a opposite to the side of the fixed member 51 and the second restrictor 92 disposed to be opposed to the second outer edge 521b via the gap on the side of the second outer edge 521b opposite to the side of the fixed member 51.

With such a configuration, the movable member 52 having the mechanical strength higher than the mechanical strength of the movable electrode assembly 6 and the fixed electrode assembly 4 and the restrictor 9 having the mechanical strength higher than the mechanical strength of the movable electrode assembly 6 and the fixed electrode assembly 4 come into contact, whereby excessive displacement in the X-axis direction of the movable member 52 is prevented. Therefore, even if the movable member 52 and the restrictor 9 come into contact, the physical quantity sensor 1 is less easily damaged. The physical quantity sensor 1 having excellent shock resistance is obtained.

As explained above, the first restrictor 91 is disposed along the outer edge (the side surface 521a') of the first outer edge 521a. The second restrictor 92 is disposed along the outer edge (the side surface 521b') of the second outer edge 521b. Therefore, when the movable member 52 is excessively displaced in the X-axis direction, the movable member 52 can be more surely brought into contact with the first restrictor 91 or the second restrictor 92.

As explained above, the movable member 52 includes the third outer edge 521c disposed along the X-axis direction on the plus side (one side) in the Y-axis direction (a second direction) and the fourth outer edge 521d disposed along the X-axis direction on the minus side (the other side) in the Y-axis direction. On the other hand, the restrictor 9 includes the third restrictor 93 disposed to be opposed to the third outer edge 521c via the gap on the side of the third outer edge 521c opposite to the side of the fixed member 51 and the fourth restrictor 94 disposed to be opposed to the fourth outer edge 521d via the gap on the side of the fourth outer edge 521d opposite to the side of the fixed member 51. Consequently, when the movable member 52 is displaced in the Y-axis direction, the movable member 52 comes into contact with the third restrictor 93 or the fourth restrictor 94. Further displacement in the Y-axis direction is reduced. Therefore, excessive displacement in the Y-axis direction of the movable member 52 can be reduced. Note that at least one of the third restrictor 93 and the fourth restrictor 94 may be omitted.

As explained above, in the physical quantity sensor 1, the movable electrode assembly 6 includes the first and second movable electrode fingers 611 and 621 (movable electrode fingers), longitudinally extending along the Y-axis direction in the plan view from the Z-axis direction (the normal direction of the substrate 2). The fixed electrode assembly 4 includes the first and second fixed electrode fingers 412 and 422 (fixed electrode fingers), longitudinally extending to be opposed to the first and second movable electrode fingers 611 and 621 in the X-axis direction along the Y-axis direction in the plan view from the Z-axis direction (the normal direction of the substrate 2). When the separation distance along the X-axis direction between the first movable electrode finger 611 and the first fixed electrode finger 412 opposed to each other and the separation distance along the X-axis direction between the second movable electrode finger 621 and the second fixed electrode finger 422 opposed to each other are respectively represented as G1, the separation distance along the X-axis direction between the first outer edge 521a and the first restrictor 91 is represented as G2, and the separation distance along the X-axis direction between the second outer edge 521b and the second restrictor 92 is represented as G3, G1>G2 and G1>G3 are satisfied. Consequently, when the movable member 52 is displaced in the X-axis direction, the first outer edge 521a and the first restrictor 91 or the second outer edge 521b and the second restrictor 92 come into contact before the first movable electrode finger 611 and the first fixed electrode finger 412 come into contact and the second movable electrode finger 621 and the second fixed electrode finger 422 come into contact. Therefore, it is possible to effectively reduce contact of the first and second movable electrode fingers 611 and 621 and the first and second fixed electrode fingers 412 and 422. It is possible to effectively reduce damage to the first and second movable electrode fingers 611 and 621 and the first and second fixed electrode fingers 412 and 422.

As explained above, the restrictor 9 has the same potential as the potential of the movable member 52. Therefore, parasitic capacitance does not occur between the restrictor 9 and the movable member 52. Deterioration in detection accuracy due to the parasitic capacitance can be effectively reduced.

As explained above, the movable member 52 and the restrictor 9 are made of the same material. Consequently, hardness of the movable member 52 and hardness of the restrictor 9 can be made uniform. When the movable member 52 and the restrictor 9 come into contact, damage to one of the movable member 52 and the restrictor 9 due to weaker strength can be effectively reduced. As explained above, for example, by patterning one silicon substrate with etching, the movable member 52 and the restrictor 9 can be formed from the silicon substrate. It is easy to manufacture the physical quantity sensor 1.

As explained above, in the physical quantity sensor 1, when the movable member 52 comes into contact with the restrictor 9, the movable member 52 and the restrictor 9 come into surface contact. Consequently, a shock of the contact is dispersed. Damage to the movable member 52 and the restrictor 9 can be effectively reduced.

Second Embodiment

A physical quantity sensor according to a second embodiment of the invention is explained.

Figure 5:
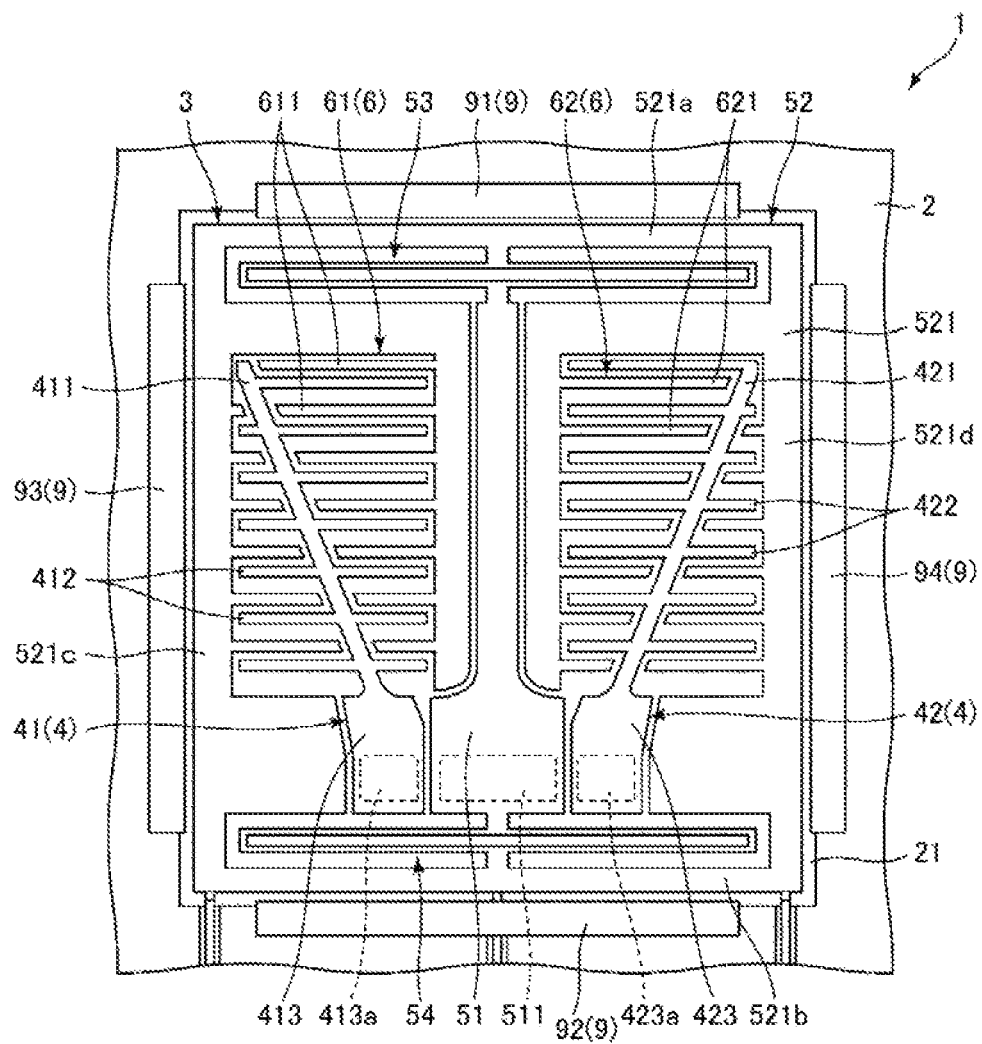
FIG. 5 is a plan view showing a physical quantity sensor according to a second embodiment of the invention.
Figure 5:
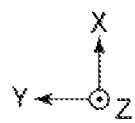

FIG. 5 is a plan view showing the physical quantity sensor according to the second embodiment of the invention.

The physical quantity sensor 1 according to this embodiment is the same as the physical quantity sensor 1 according to the first embodiment mainly except that the configuration of the restrictor 9 is different.

Note that, in the following explanation, concerning the physical quantity sensor 1 according to the second embodiment, differences from the first embodiment explained above are mainly explained. Explanation of the similarities is omitted. In FIG. 5, the same components as the components in the first embodiment explained above are denoted by the same reference numerals and signs.

As shown in FIG. 5, the third restrictor 93 extends in the X-axis direction along the third outer edge 521c. The end on the X-axis direction plus side of the third restrictor 93 is disposed to be separated from the first restrictor 91. The end on the X-axis direction minus side is disposed to be separated from the second restrictor 92. The fourth restrictor 94 extends in the X-axis direction along the fourth outer edge 521d. The end on the X-axis direction plus side of the fourth restrictor 94 is disposed to be separated from the first restrictor 91. The end on the X-axis direction minus side is disposed to be separated from the second restrictor 92.

With such a configuration, the restrictor 9 can be disposed to avoid corners of the frame 521. Therefore, even if the movable member 52 is displaced in the X-axis direction or the Y-axis direction and comes into contact with the restrictor 9, contact of the corners of the frame 521 with the restrictor 9 is reduced. The corners are parts that are easily damaged. By reducing contact with such parts, damage to the frame 521 due to the contact with the restrictor 9 can be effectively reduced.

According to the second embodiment, the same effects as the effects of the first embodiment explained above can be exerted.

Third Embodiment

A physical quantity sensor according to a third embodiment of the invention is explained.

Figure 6:
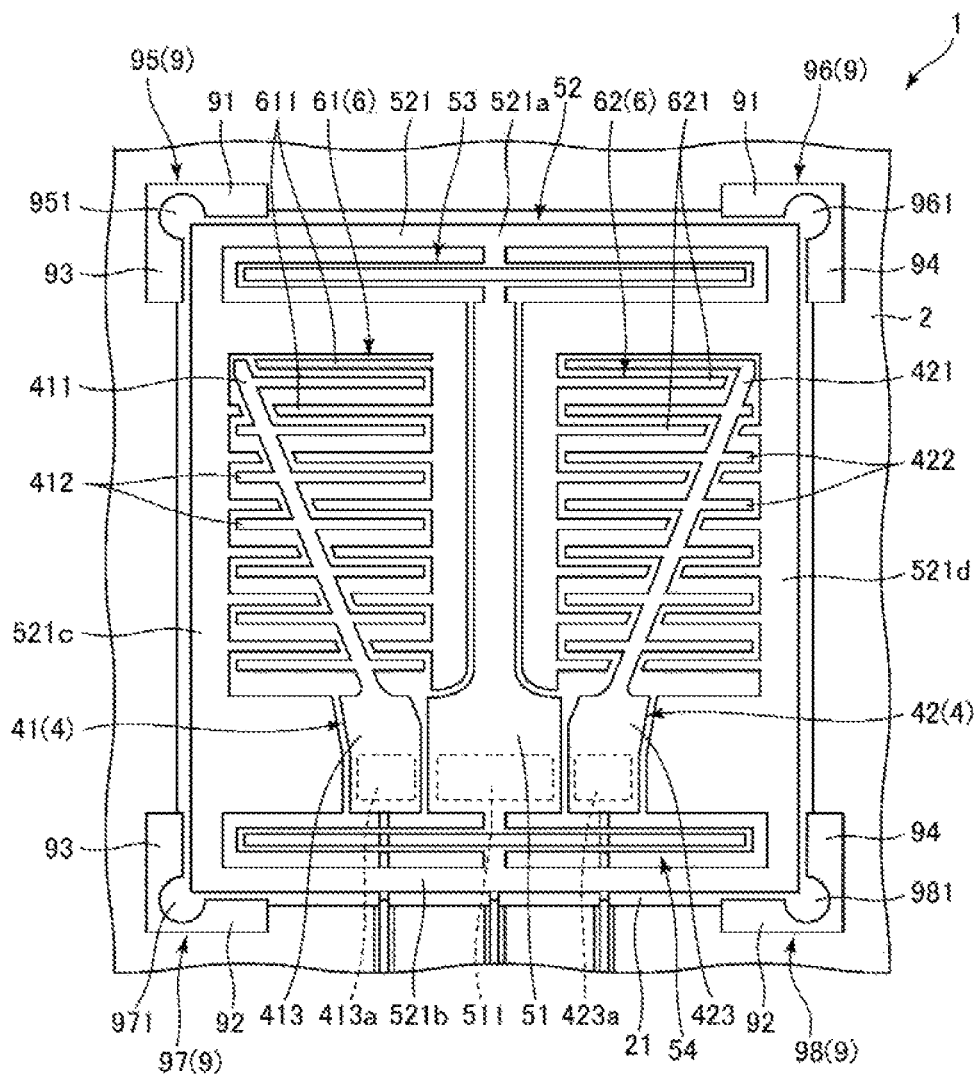
FIG. 6 is a plan view showing a physical quantity sensor according to a third embodiment of the invention.

FIG. 6 is a plan view showing the physical quantity sensor according to the third embodiment of the invention.

The physical quantity sensor 1 according to this embodiment is the same as the physical quantity sensor 1 according to the first embodiment mainly except that the configuration of the restrictor 9 is different.

Note that, in the following explanation, concerning the physical quantity sensor 1 according to the third embodiment, differences from the first embodiment explained above are mainly explained. Explanation of the similarities is omitted. In FIG. 6, the same components as the components in the first embodiment explained above are denoted by the same reference numerals and signs.

As shown in FIG. 6, the restrictor 9 is provided to correspond to corners of the frame 521. Specifically, the restrictor 9 includes a first arm 95, a second arm 96, a third arm 97, and a fourth arm 98.

The first arm 95 is disposed to correspond to a corner located on the upper left in the figure of the frame 521 and is formed in a substantial L shape obtained by integrating the first restrictor 91 and the third restrictor 93. The second arm 96 is disposed to correspond to a corner located on the upper right in the figure of the frame 521 and is formed in a substantial L shape obtained by integrating the first restrictor 91 and the fourth restrictor 94. The third arm 97 is disposed to correspond to a corner located on the lower left in the figure of the frame 521 and is formed in a substantial L shape obtained by integrating the second restrictor 92 and the third restrictor 93. The fourth arm 98 is disposed to correspond to a corner located on the lower right in the figure of the frame 521 and is formed in a substantial L shape obtained by integrating the second restrictor 92 and the fourth restrictor 94.

A cutout 951 recessed to the opposite side of the frame 521 is provided at an internal corner of the first arm 95. A cutout 961 recessed to the opposite side of the frame 521 is provided at an internal corner of the second arm 96. A cutout 971 recessed to the opposite side of the frame 521 is provided in an internal corner of the third arm 97. A cutout 981 recessed to the opposite side of the frame 521 is provided in an internal corner of the fourth arm 98. When the restrictor 9 comes into contact with the movable member 52, the cutouts 951, 961, 971, and 981 function as escape spaces for preventing the corners of the movable member 52 from coming into contact with the restrictor 9.

With such a configuration, even if the movable member 52 is displaced in the X-axis direction or the Y-axis direction and comes into contact with the restrictor 9, contact of the corners of the frame 521 with the restrictor 9 is reduced. Therefore, damage to the frame 521 due to the contact with the restrictor 9 can be effectively reduced. Note that, in this embodiment, the shape of the cutouts 951, 961, 971, and 981 is circular. However, the shape is not limited to this and may be a rectangle or may be any shape such as a square other than the rectangle, a polygon other than the square, or an irregular shape.

According to the third embodiment, the same effects as the effects in the first embodiment explained above can be exerted.

Fourth Embodiment

A physical quantity sensor according to a fourth embodiment of the invention is explained.

Figure 7:
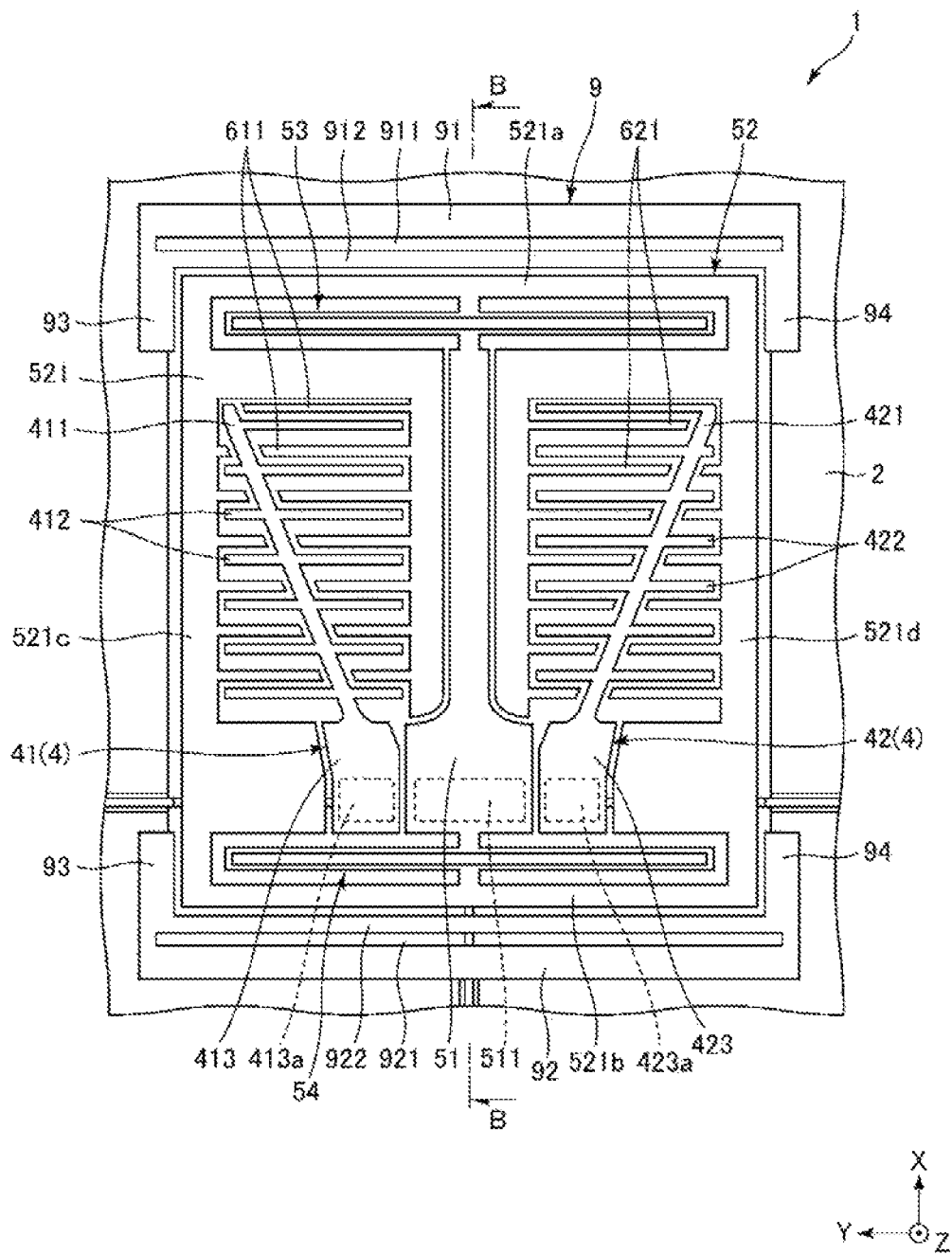
FIG. 7 is a plan view showing a physical quantity sensor according to a fourth embodiment of the invention.
Figure 8:
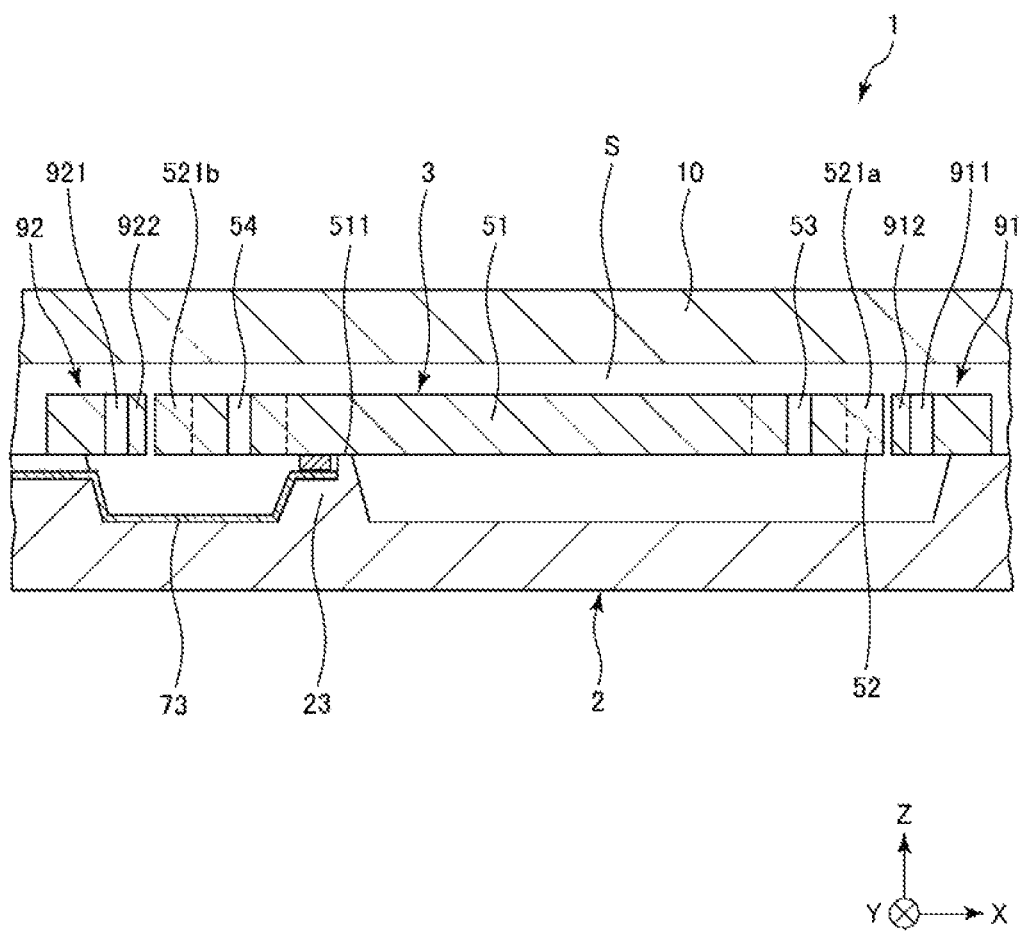
FIG. 8 is a B-B line sectional view in FIG. 7.
Figure 9:
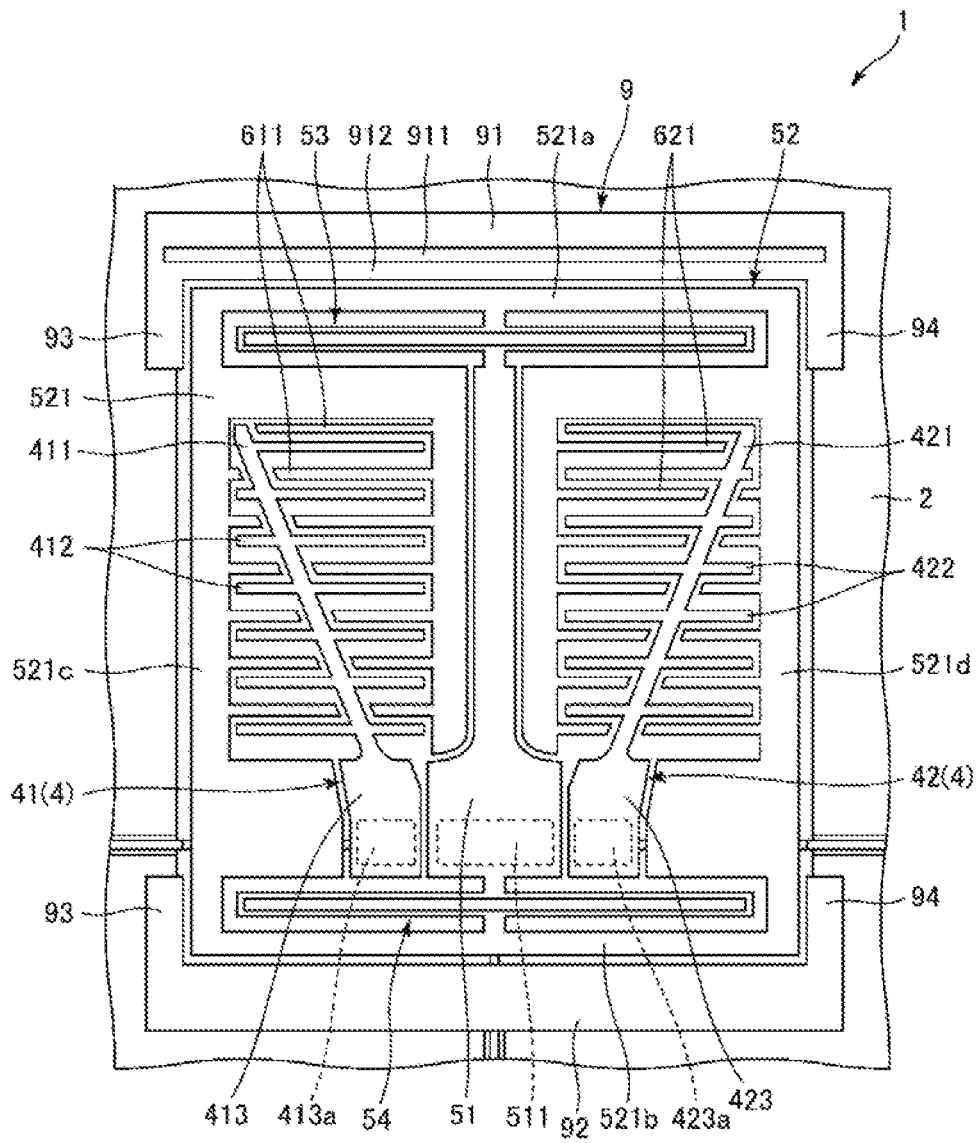
FIG. 9 is a plan view showing a modification of the physical quantity sensor shown in FIG. 7.
Figure 10:
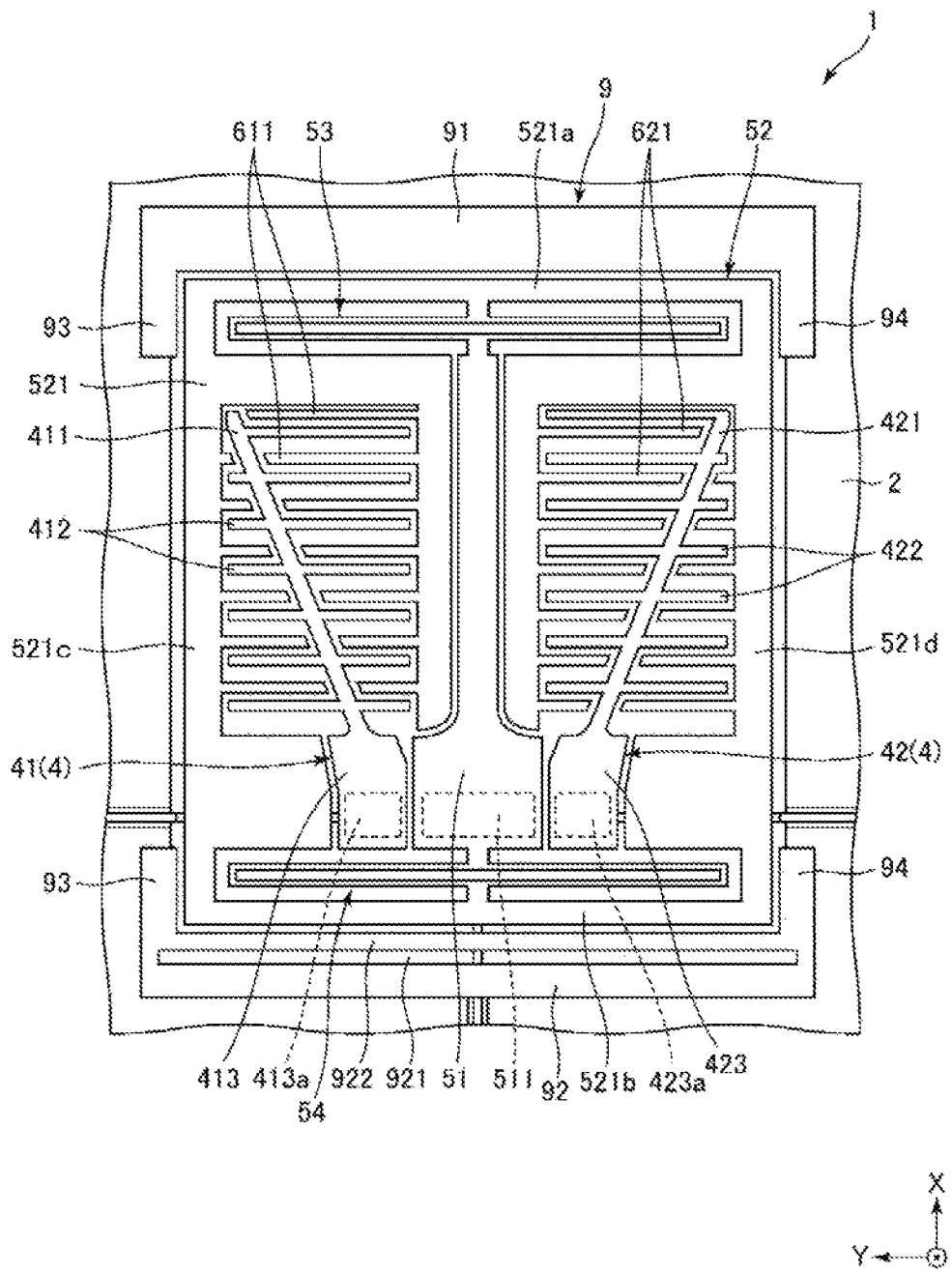
FIG. 10 is a plan view showing a modification of the physical quantity sensor shown in FIG. 7.
Figure 11:
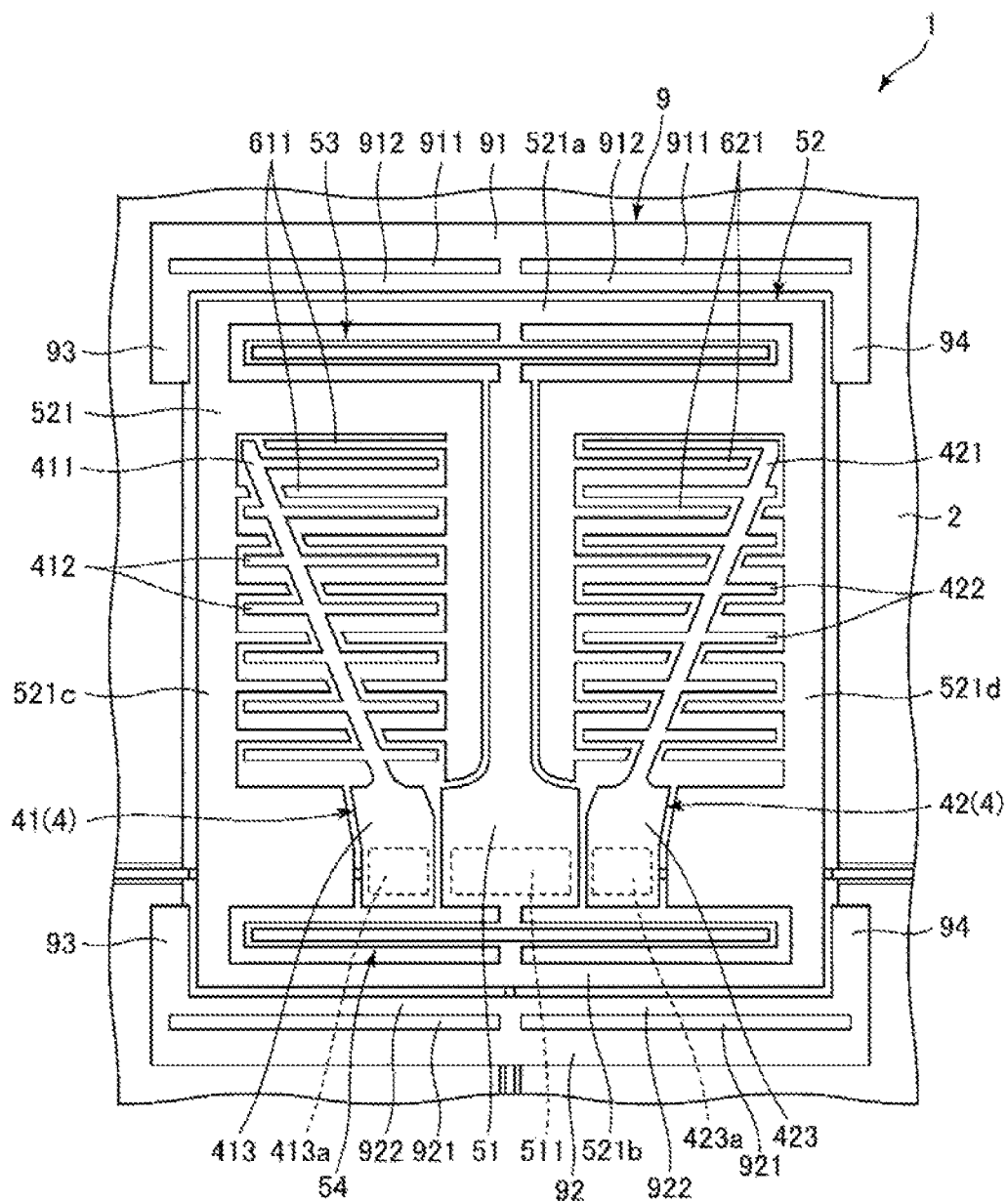
FIG. 11 is a plan view showing a modification of the physical quantity sensor shown in FIG. 7.

FIG. 7 is a plan view showing the physical quantity sensor according to the fourth embodiment of the invention. FIG. 8 is a B-B line sectional view in FIG. 7. FIGS. 9 to 11 are respectively plan views showing modifications of the physical quantity sensor shown in FIG. 7.

The physical quantity sensor 1 according to this embodiment is the same as the physical quantity sensor 1 according to the first embodiment mainly except that the configuration of the restrictor 9 is different.

Note that, in the following explanation, concerning the physical quantity sensor 1 according to the fourth embodiment, differences from the first embodiment explained above are mainly explained. Explanation of the similarities is omitted. In FIG. 7, the same components as the components in the first embodiment explained above are denoted by the same reference numerals and signs.

As shown in FIG. 7, the first restrictor 91 includes a slit 911 extending in the Y-axis direction (a through-hole groove piercing through in the Z-axis direction) and a beam 912 located on the X-axis direction minus side with respect to the slit 911 and extending in the Y-axis direction. In the first restrictor 91, when the movable member 52 is displaced to the X-axis direction plus side, the first outer edge 521a comes into contact with the beam 912. As shown in FIG. 8, the beam 912 is not bonded to the substrate 2 and is deflectively deformable in the X-axis direction. That is, the beam 912 has elasticity in the X-axis direction.

With such a configuration, the beam 912 is deflectively deformed in the X-axis direction, whereby a shock due to contact of the movable member 52 and the first restrictor 91 is mitigated. Therefore, damage to the element assembly 3 can be effectively reduced. Note that it is desirable that the slit 911 is formed longer than the first outer edge 521a and the entire region of the first outer edge 521a comes into contact with the beam 912.

Similarly, the second restrictor 92 includes a slit 921 extending in the Y-axis direction and a beam 922 located on the X-axis direction plus side with respect to the slit 921 and extending in the Y-axis direction. When the movable member 52 is displaced to the X-axis direction minus side, the second outer edge 521b comes into contact with the beam 922. As shown in FIG. 8, the beam 922 is not bonded to the substrate 2 and is deflectively deformable in the X-axis direction. That is, the beam 922 has elasticity in the X-axis direction.

With such a configuration, the beam 922 is deflectively deformed in the X-axis direction, whereby a shock due to contact of the movable member 52 and the second restrictor 92 is mitigated. Therefore, damage to the element assembly 3 can be effectively reduced. Note that it is desirable that the slit 921 is formed longer than the second outer edge 521b and the entire region of the second outer edge 521b comes into contact with the beam 922.

As explained above, the first restrictor 91 and the second restrictor 92 have elasticity in the X-axis direction. Consequently, a shock during the contact of the movable member 52 and the restrictor 9 can be mitigated. Damage to the element assembly 3 can be effectively reduced.

As explained above, in the plan view from the Z-axis direction (the normal direction of the substrate 2), the first restrictor 91 includes the slit 911 extending along the Y-axis direction and the second restrictor 92 includes the slit 921 extending along the Y-axis direction. Consequently, with a relatively simple configuration, elasticity can be imparted to the first restrictor 91 and the second restrictor 92 in the X-axis direction.

According to the fourth embodiment, the same effects as the effects in the first embodiment explained above can be exerted.

Note that the invention is not limited to this embodiment. For example, as shown in FIG. 9, the slit 921 and the beam 922 may be omitted from the second restrictor 92. Only the first restrictor 91 may have elasticity in the X-axis direction. Conversely, as shown in FIG. 10, the slit 911 and the beam 912 may be omitted from the first restrictor 91. Only the second restrictor 92 may have elasticity in the X-axis direction. As shown in FIG. 11, the first restrictor 91 may include a plurality of slits 911 disposed side by side in the Y-axis direction. The second restrictor 92 may include a plurality of slits 921 disposed side by side in the Y-axis direction. Note that, in FIG. 11, two each of the slits 911 and 921 are formed. However, the number of the slits 911 and 921 is not limited and may be three or more. The number of the slits 911 and 921 may be the same or may be different.

Fifth Embodiment

A physical quantity sensor according to a fifth embodiment of the invention is explained.

Figure 12:
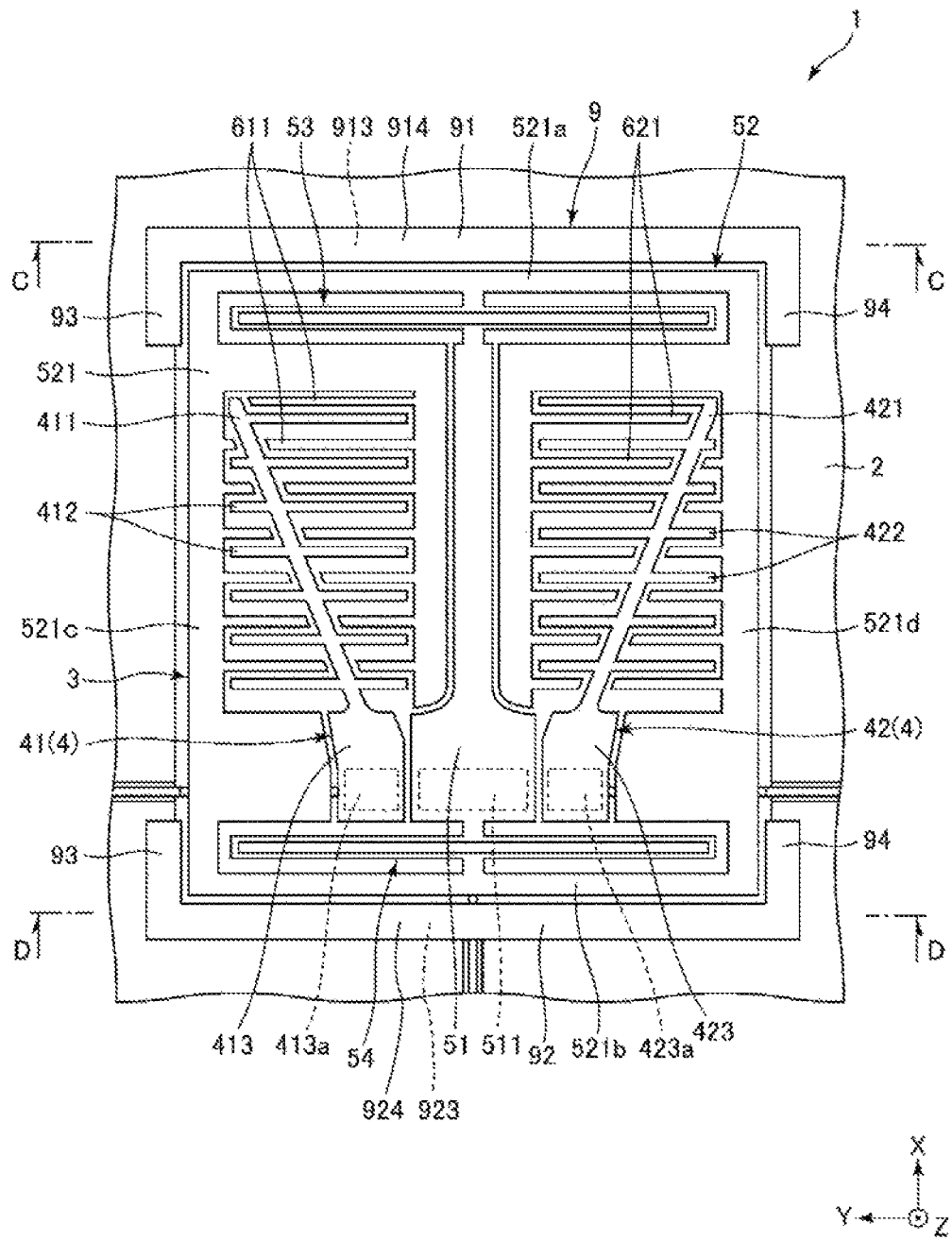
FIG. 12 is a plan view showing a physical quantity sensor according to a fifth embodiment of the invention.
Figure 13:
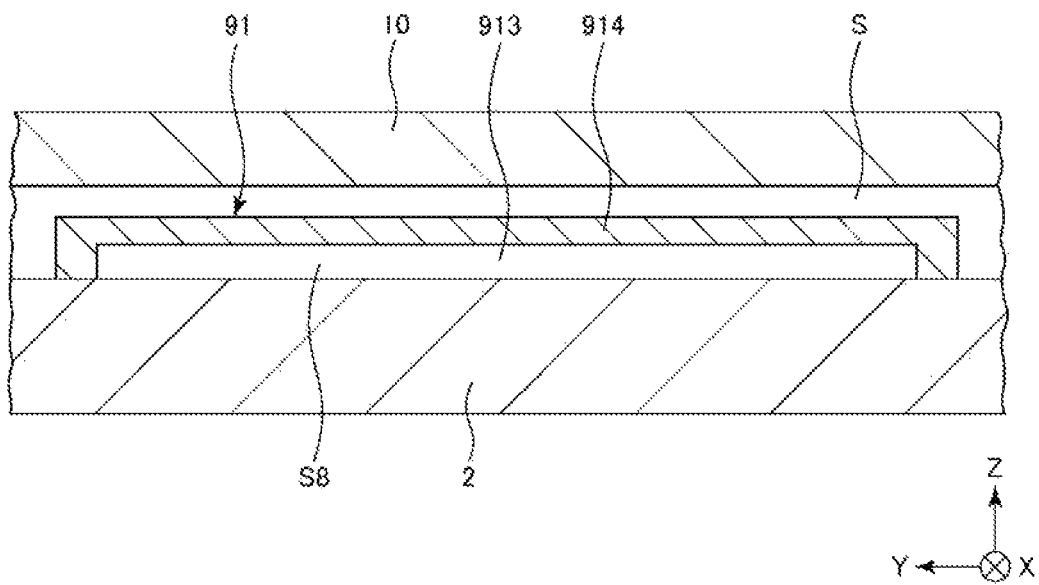
FIG. 13 is a C-C line sectional view in FIG. 12.
Figure 14:
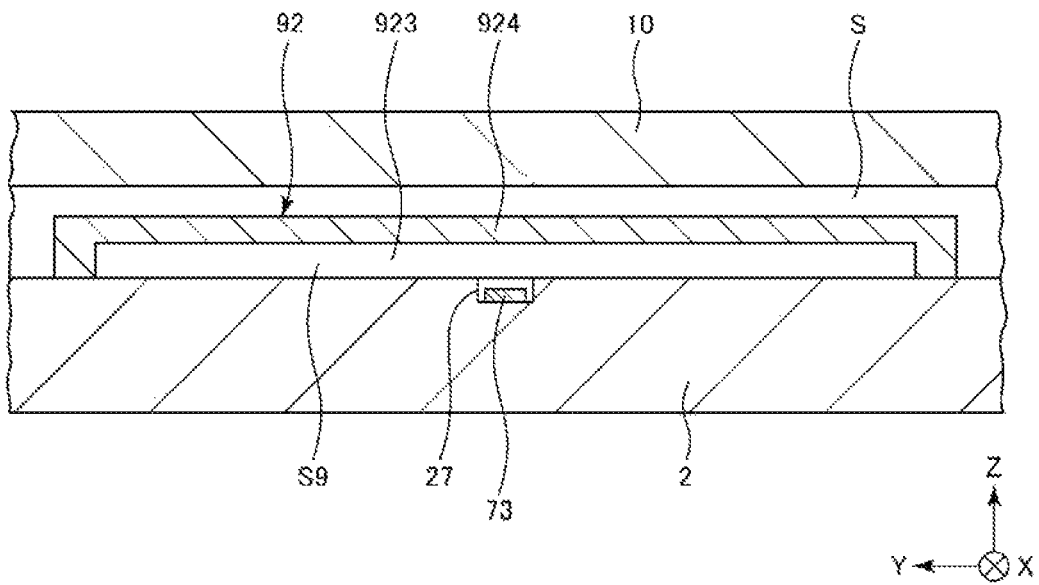
FIG. 14 is a D-D line sectional view in FIG. 12.
Figure 15:
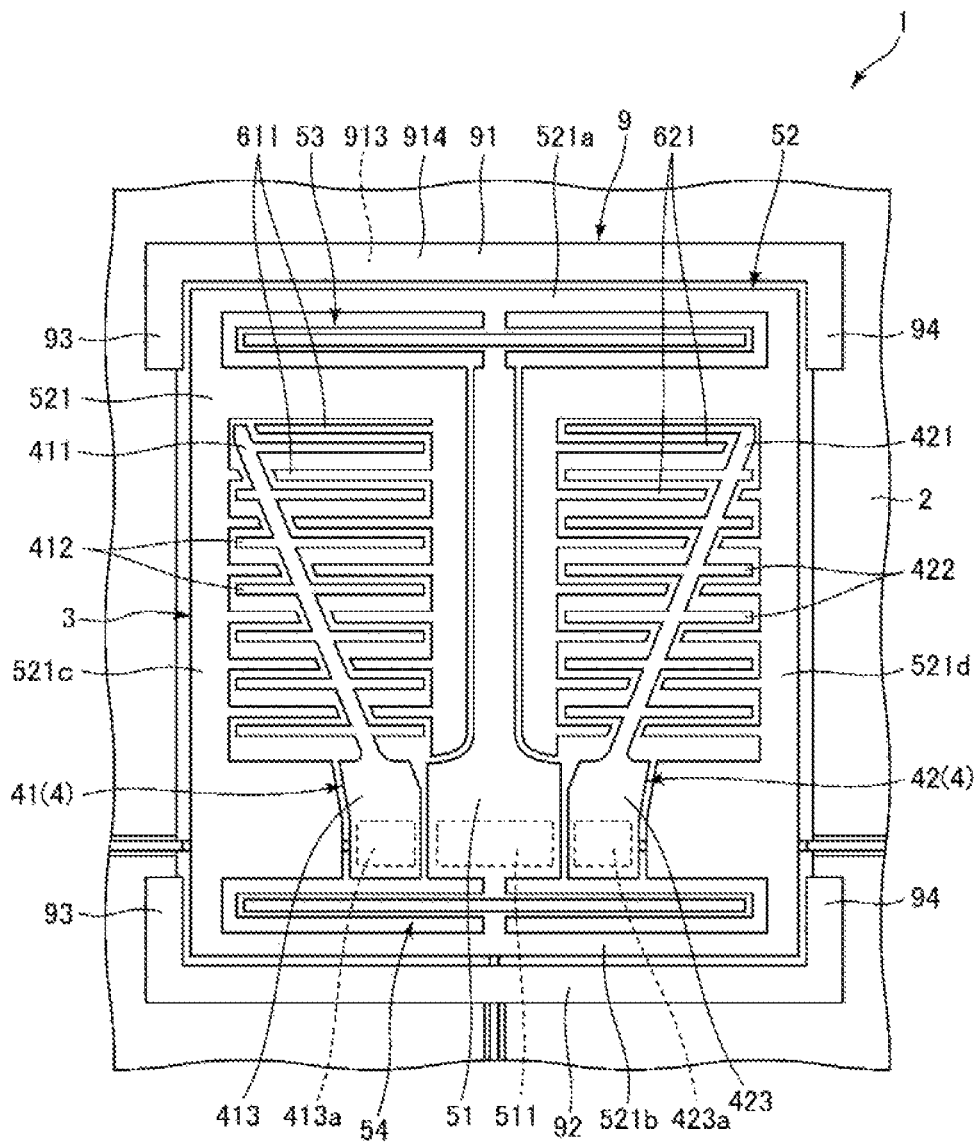
FIG. 15 is a plan view showing a modification of a physical quantity sensor shown in FIG. 12.
Figure 15:
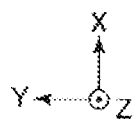
Figure 16:
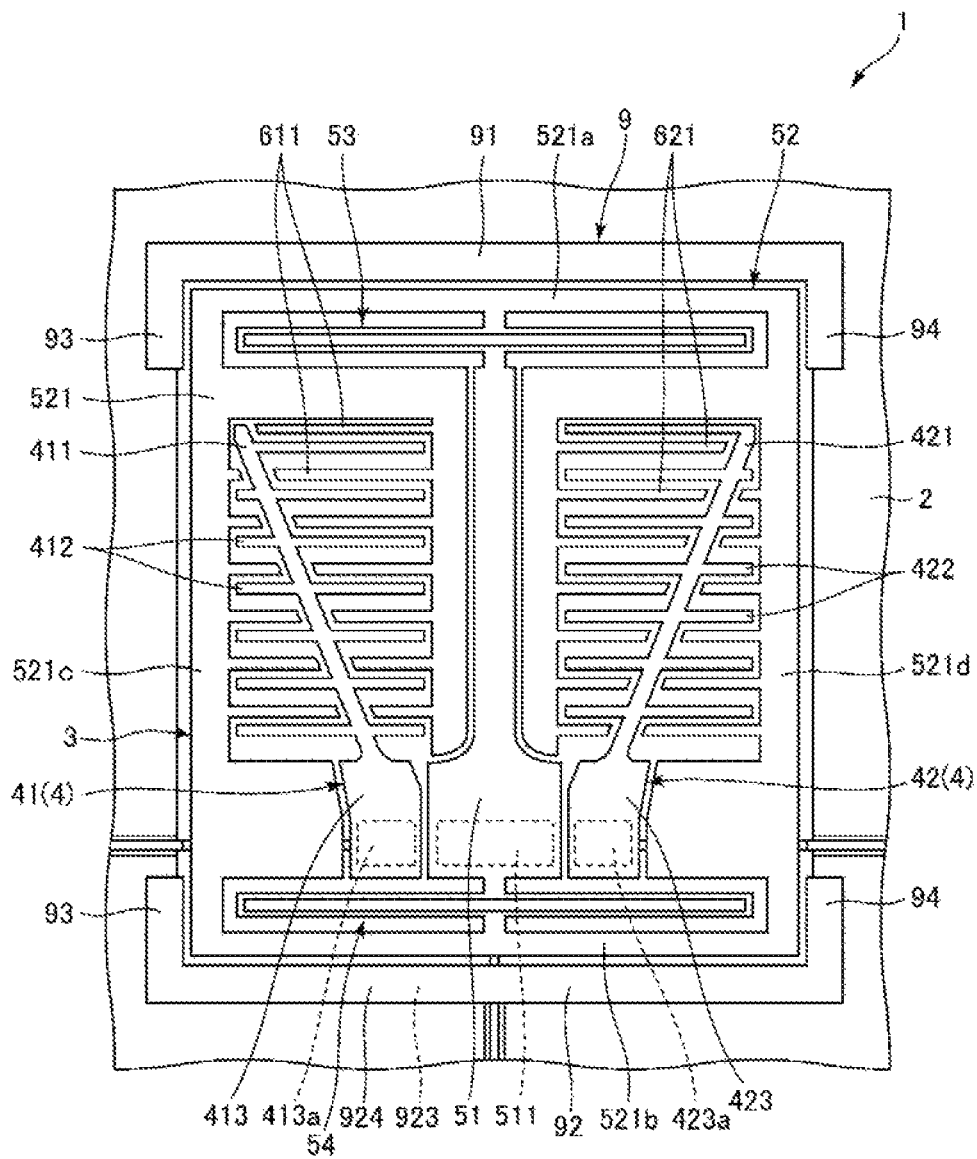
FIG. 16 is a plan view showing a modification of the physical quantity sensor shown in FIG. 12.
Figure 16:
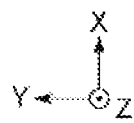
Figure 17:
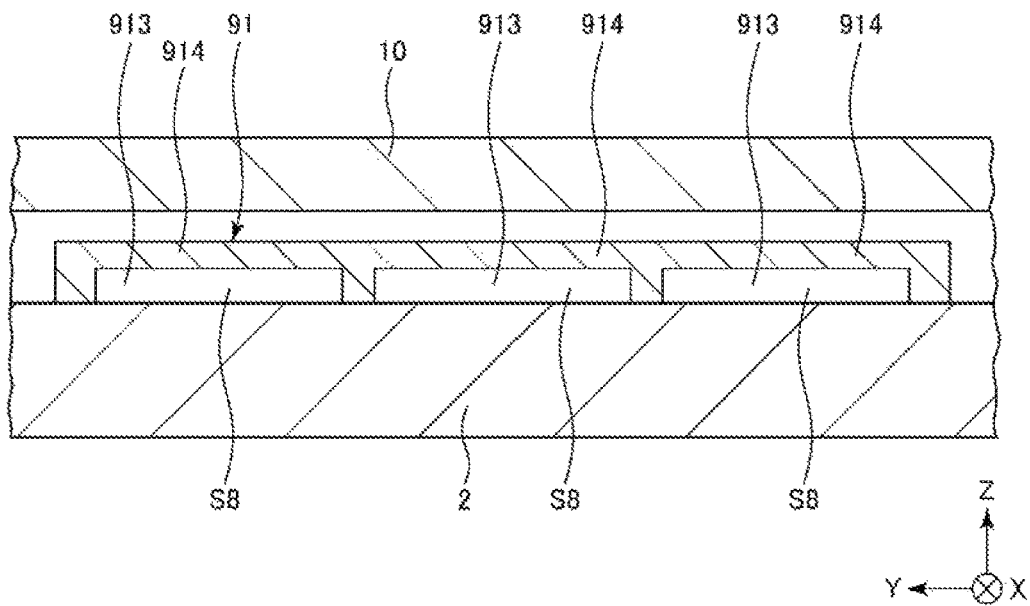
FIG. 17 is a plan view showing a modification of the physical quantity sensor shown in FIG. 12.
Figure 18:
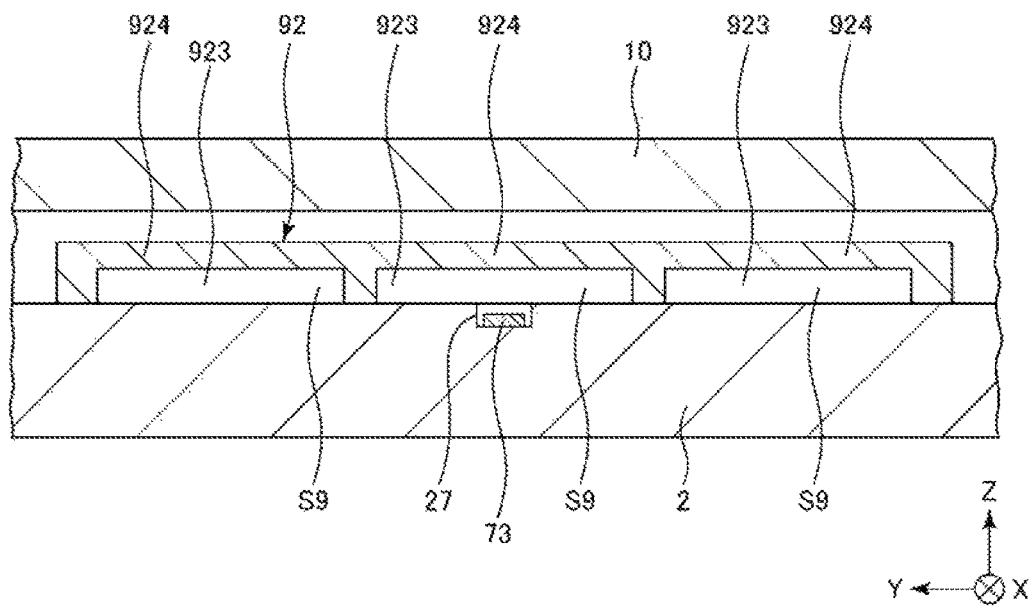
FIG. 18 is a sectional view showing a modification of the physical quantity sensor shown in FIG. 12.

FIG. 12 is a plan view showing the physical quantity sensor according to the fifth embodiment of the invention. FIG. 13 is a C-C line sectional view in FIG. 12. FIG. 14 is a D-D line sectional view in FIG. 12. FIGS. 15 and 16 are respectively plan views showing modifications of the physical quantity sensor shown in FIG. 12. FIGS. 17 to 22 are respectively sectional views showing modifications of the physical quantity sensor shown in FIG. 12. Note that FIGS. 17, 19, and 21 respectively correspond to the sectional view of FIG. 12. FIGS. 18, 20, and 22 respectively correspond to the sectional view of FIG. 13.

The physical quantity sensor 1 according to this embodiment is the same as the physical quantity sensor 1 according to the first embodiment mainly except that the configuration of the restrictor 9 is different.

Note that, in the following explanation, concerning the physical quantity sensor 1 according to the fifth embodiment, differences from the first embodiment explained above are mainly explained. Explanation of the similarities is omitted. In FIG. 12, the same components as the components in the first embodiment explained above are denoted by the same reference numerals and signs.

As shown in FIGS. 12 and 13, the first restrictor 91 includes a recess 913 opened on the lower surface of the first restrictor 91 and a beam 914 (a portion reduced in thickness by the recess 913) located above the recess 913. The recess 913 extends in the Y-axis direction to exclude both ends of the first restrictor 91. A gap S8 formed by the recess 913 is provided between the beam 914 and the substrate 2. The beam 914 is not bonded to the substrate 2. Therefore, the beam 914 is deflectively deformable in the X-axis direction. That is, the beam 914 has elasticity in the X-axis direction.

In the first restrictor 91, when the movable member 52 is displaced in the X-axis direction plus side, the first outer edge 521a comes into contact with the beam 914. Therefore, the beam 914 is deflectively deformed in the X-axis direction, whereby a shock due to the contact of the movable member 52 and the first restrictor 91 is mitigated. Therefore, damage to the element assembly 3 can be effectively reduced. Note that it is desirable that the recess 913 is formed longer than the first outer edge 521a and the entire region of the first outer edge 521a comes into contact with the beam 914.

Similarly, as shown in FIGS. 12 and 14, the second restrictor 92 includes a recess 923 opened on the lower surface of the second restrictor 92 and a beam 924 (a portion reduced in thickness by the recess 923) located above the recess 923. The recess 923 extends in the Y-axis direction to exclude both ends of the second restrictor 92. A gap S9 formed by the recess 923 is provided between the beam 924 and the substrate 2. The beam 924 is not bonded to the substrate 2. Therefore, the beam 924 is deflectively deformable in the X-axis direction. That is, the beam 924 has elasticity in the X-axis direction.

In the second restrictor 92, when the movable member 52 is displaced in the X-axis direction minus side, the second outer edge 521b comes into contact with the beam 924. Therefore, the beam 924 is deflectively deformed in the X-axis direction, whereby a shock due to the contact of the movable member 52 and the second restrictor 92 is mitigated. Therefore, damage to the element assembly 3 can be effectively reduced. Note that it is desirable that the recess 923 is formed longer than the second outer edge 521b and the entire region of the second outer edge 521b comes into contact with the beam 924.

As explained above, in the physical quantity sensor 1, the gap S8 is formed between the first restrictor 91 and the substrate 2 and the gap S9 is formed between the second restrictor 92 and the substrate 2. Consequently, the first restrictor 91 and the second restrictor 92 can be deflectively deformed in the X-axis direction. Therefore, a shock during the contact of the movable member 52 and the restrictor 9 can be mitigated. Damage to the element assembly 3 can be effectively reduced.

According to the fifth embodiment, the same effects as the effects in the first embodiment explained above can be exerted.

Note that the invention is not limited to this embodiment. For example, as shown in FIG. 15, the recess 923 and the beam 924 may be omitted from the second restrictor 92. Only the first restrictor 91 may have elasticity in the X-axis direction. Conversely, as shown in FIG. 16, the recess 913 and the beam 914 may be omitted from the first restrictor 91. Only the second restrictor 92 may have elasticity in the X-axis direction. As shown in FIG. 17, the first restrictor 91 may include a plurality of recesses 913 disposed side by side in the Y-axis direction. As shown in FIG. 18, the second restrictor 92 may include a plurality of recesses 923 disposed side by side in the Y-axis direction. Consequently, for example, bonding strength of the first restrictor 91 and the second restrictor 92 and the substrate 2 can be increased compared with this embodiment. Note that the number of recesses 913 and 923 may be the same or may be different.

Figure 19:
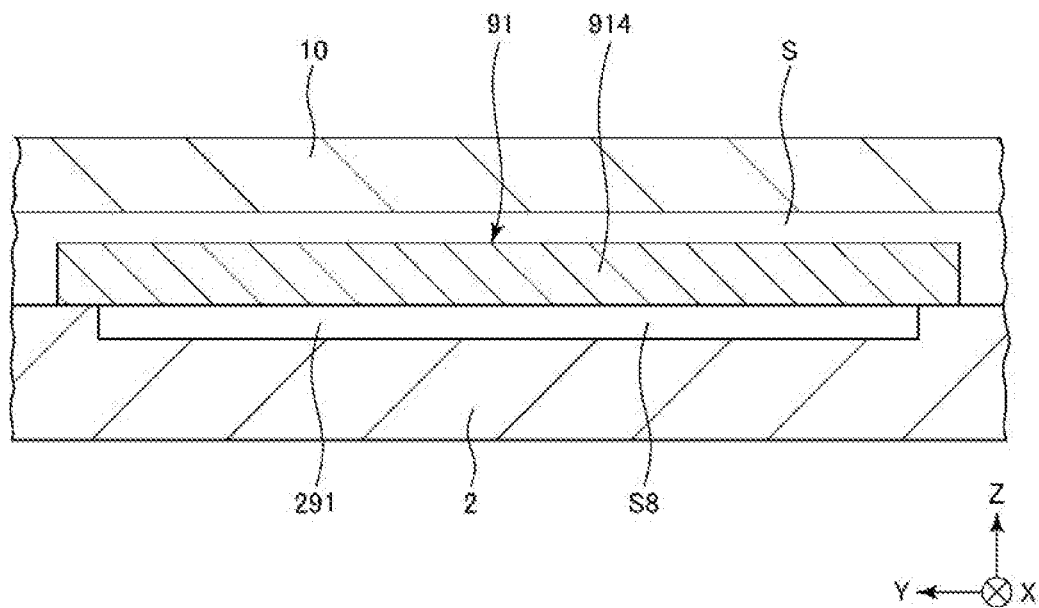
FIG. 19 is a sectional view showing a modification of the physical quantity sensor shown in FIG. 12.
Figure 20:
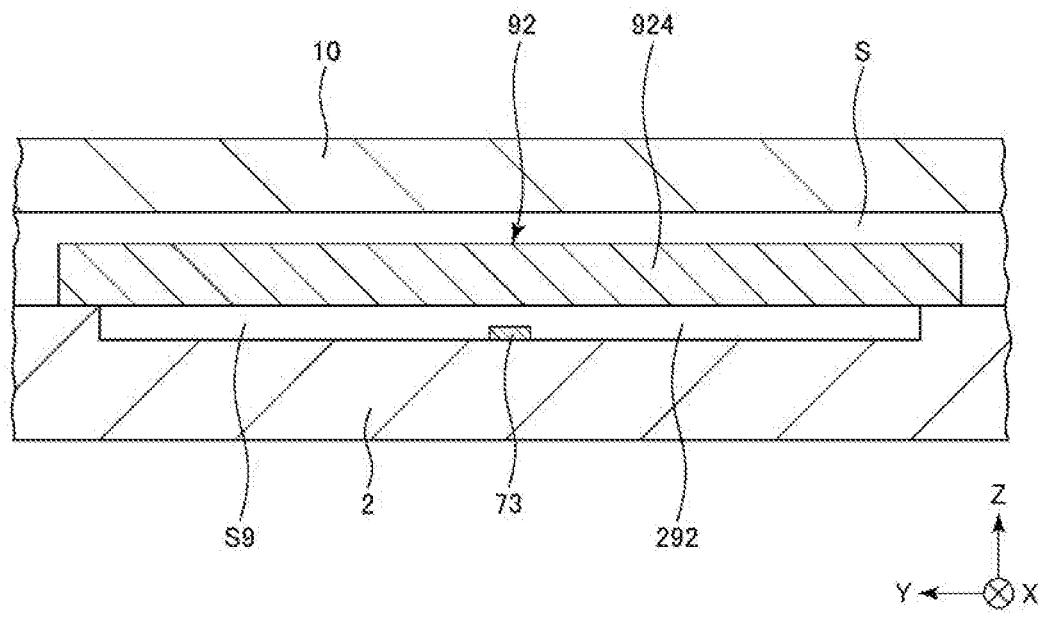
FIG. 20 is a sectional view showing a modification of the physical quantity sensor shown in FIG. 12.

For example, as shown in FIG. 19, the gap S8 may be formed between the substrate 2 and the first restrictor 91 by providing a recess 291 in a portion overlapping the first restrictor 91 on the upper surface of the substrate 2. Accordingly, the beam 914 may be provided in the first restrictor 91. Similarly, as shown in FIG. 20, the gap S9 may be formed between the substrate 2 and the second restrictor 92 by providing a recess 292 in a portion overlapping the second restrictor 92 on the upper surface of the substrate 2. Accordingly, the beam 924 may be provided in the second restrictor 92.

Figure 21:
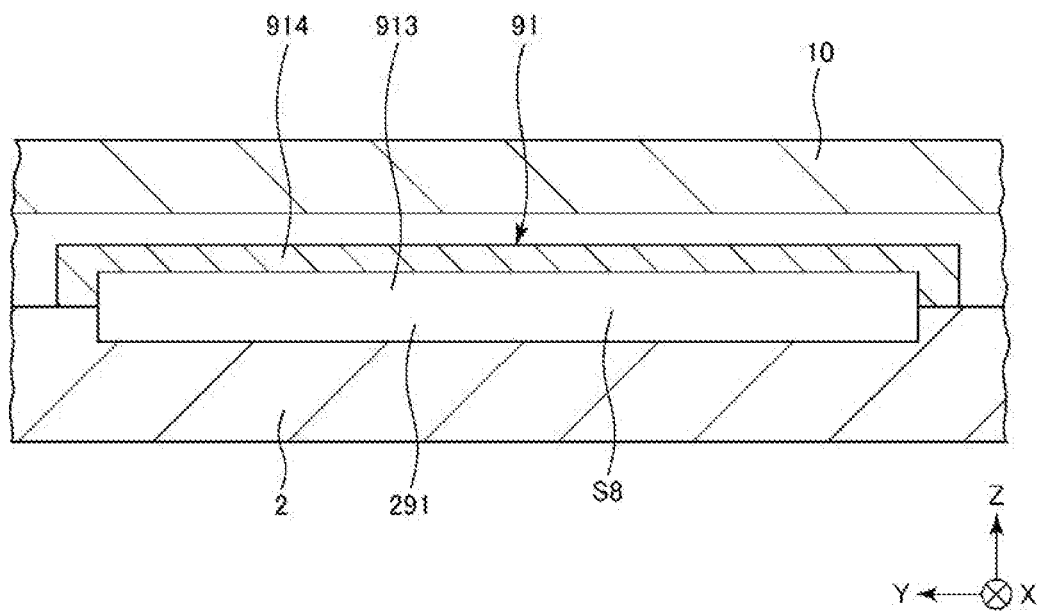
FIG. 21 is a sectional view showing a modification of the physical quantity sensor shown in FIG. 12.
Figure 22:
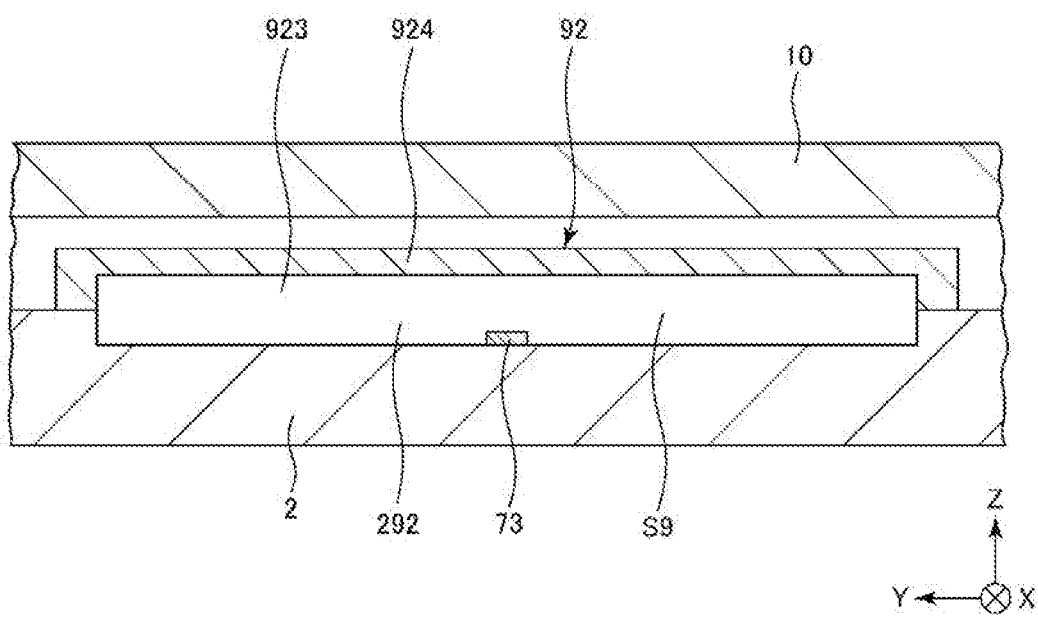
FIG. 22 is a sectional view showing a modification of the physical quantity sensor shown in FIG. 12.

As shown in FIG. 21, the gap S8 may be formed between the substrate 2 and the first restrictor 91 by forming the recess 913 in the first restrictor 91 and forming the recess 291 in the substrate 2. Similarly, as shown in FIG. 22, the gap S9 may be formed between the substrate 2 and the second restrictor 92 by forming the recess 923 in the second restrictor 92 and forming the recess 292 in the substrate 2.

Sixth Embodiment

A physical quantity sensor according to a sixth embodiment of the invention is explained.

Figure 23:
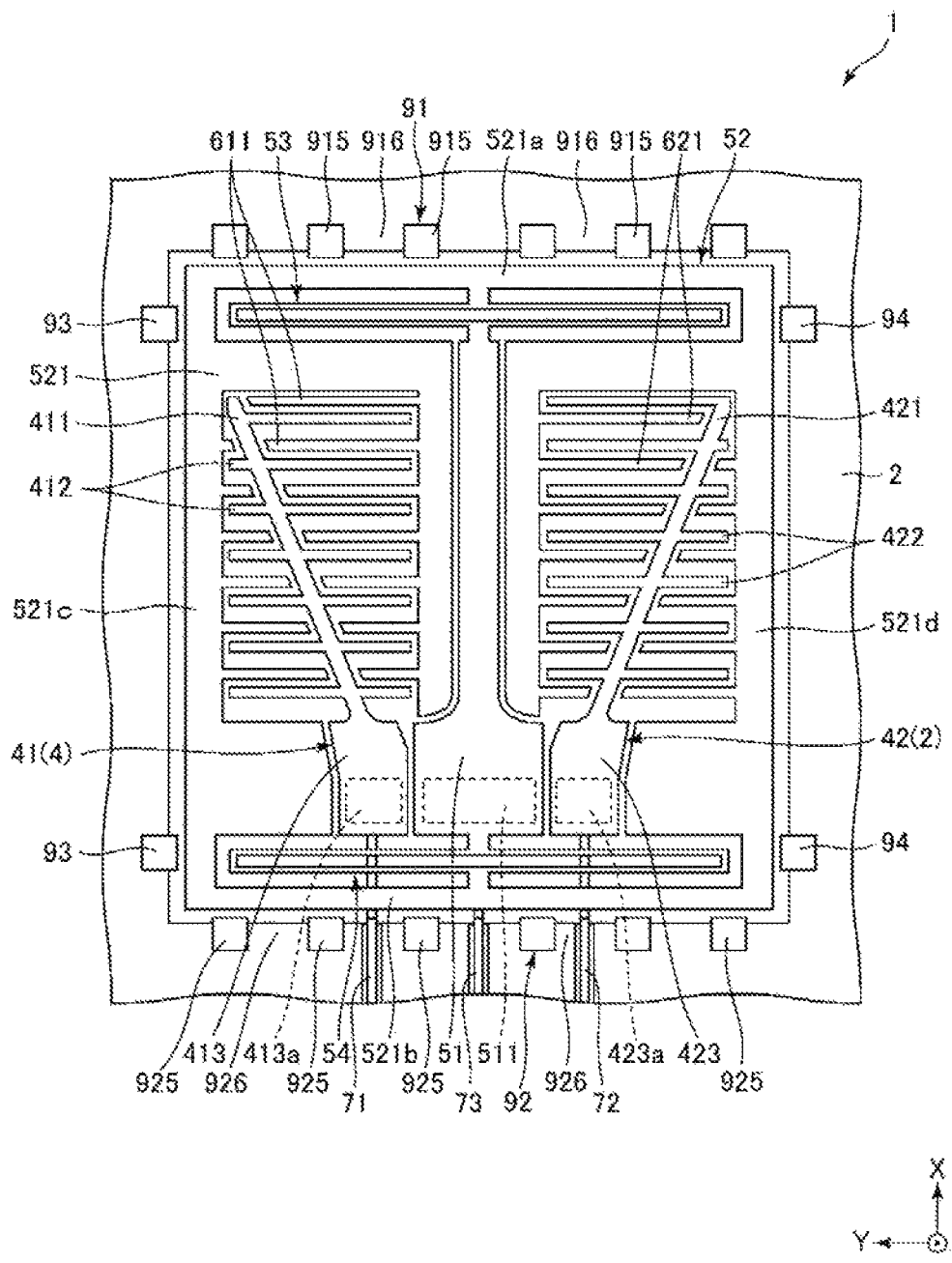
FIG. 23 is a plan view showing a physical quantity sensor according to a sixth embodiment of the invention.
Figure 24:
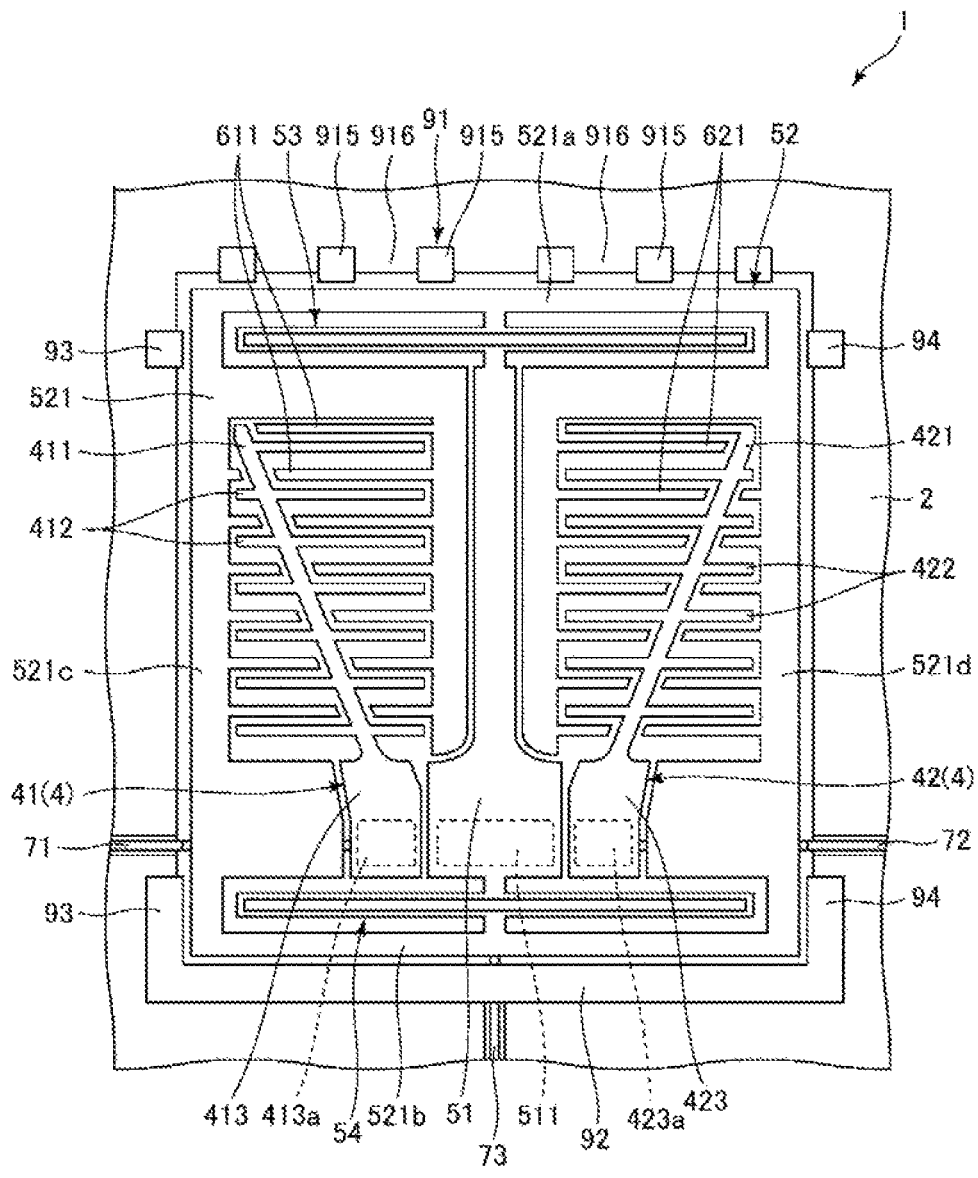
FIG. 24 is a plan view showing a modification of the physical quantity sensor shown in FIG. 23.
Figure 25:
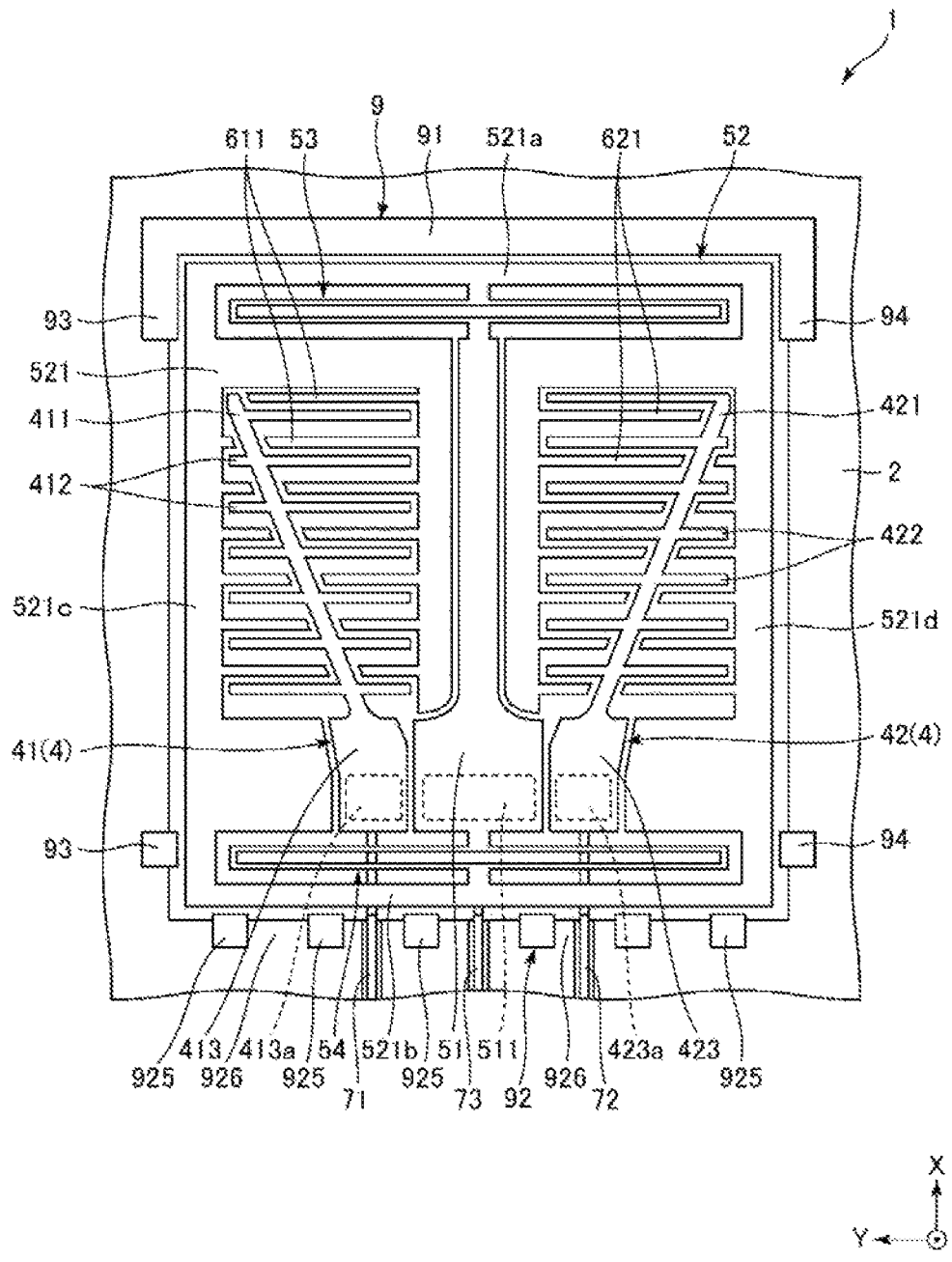
FIG. 25 is a plan view showing a modification of the physical quantity sensor shown in FIG. 23.
Figure 26:
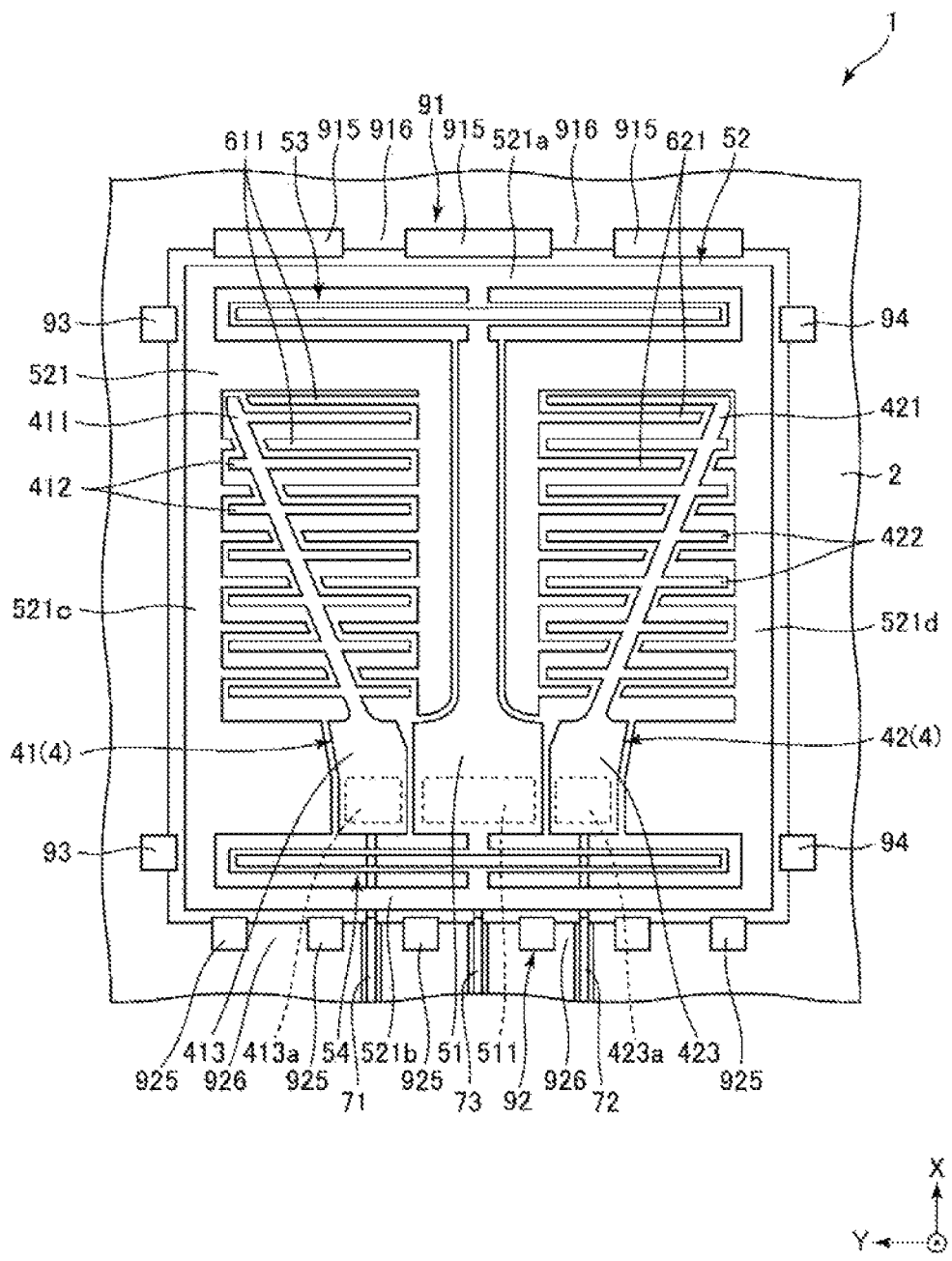
FIG. 26 is a plan view showing a modification of the physical quantity sensor shown in FIG. 23.

FIG. 23 is a plan view showing the physical quantity sensor according to the sixth embodiment of the invention. FIGS. 24 to 26 are respectively plan views showing modifications of the physical quantity sensor shown in FIG. 23.

The physical quantity sensor 1 according to this embodiment is the same as the physical quantity sensor 1 according to the first embodiment mainly except that the configuration of the restrictor 9 is different.

Note that, in the following explanation, concerning the physical quantity sensor 1 according to the sixth embodiment, differences from the first embodiment explained above are mainly explained. Explanation of the similarities is omitted. In FIG. 23, the same components as the components in the first embodiment explained above are denoted by the same reference numerals and signs.

As shown in FIG. 23, the first restrictor 91 includes a plurality of stoppers 915 disposed at intervals along the Y-axis direction. A gap 916 is formed between a pair of stoppers 915 adjacent to each other in the Y-axis direction. Similarly, the second restrictor 92 includes a plurality of stoppers 925 disposed at intervals along the Y-axis direction. A gap 926 is formed between a pair of stoppers 925 adjacent to each other in the Y-axis direction. In this embodiment, the wires 71, 72, and 73 are drawn around to overlap the gap 916. Consequently, overlap of the wires 71, 72, and 73 and the second restrictor 92 can be prevented. Formation of parasitic capacitance between the wires 71, 72, and 73 and the second restrictor 92 can be reduced.

As explained above, the first restrictor 91 includes the plurality of stoppers 915 disposed at intervals along the Y-axis direction. The second restrictor 92 includes the plurality of stoppers 925 disposed at intervals along the Y-axis direction. Consequently, by drawing around the wires 71, 72, and 73 in the gaps 916 and 926, overlap of the wires 71, 72, and 73 and the first restrictor 91 and the second restrictor 92 can be prevented. Formation of parasitic capacitance between the wires 71, 72, and 73 and the first restrictor 91 and the second restrictor 92 can be reduced. Therefore, the physical quantity sensor 1 that can more accurately detect the acceleration Ax is obtained. Note that, in this embodiment, the wires 71, 72, and 73 are drawn around in the gap 926.

According to the sixth embodiment, the same effects as the effects in the first embodiment explained above can be exerted.

Note that the invention is not limited to this embodiment. For example, as shown in FIG. 24, only the first restrictor 91 may include the stoppers 915 disposed at intervals along the Y-axis direction. Conversely, as shown in FIG. 25, only the second restrictor 92 may include the stoppers 925 disposed at intervals along the Y-axis direction. In this embodiment, the number of the stoppers 915 and 925 are six. However, the number is not limited to this and may be two, three, four, or five or may be seven or more. For example, as shown in FIG. 26, the shapes and the number of the stoppers 915 and 925 may be different from each other.

Seventh Embodiment

A physical quantity sensor according to a seventh embodiment of the invention is explained.

Figure 27:
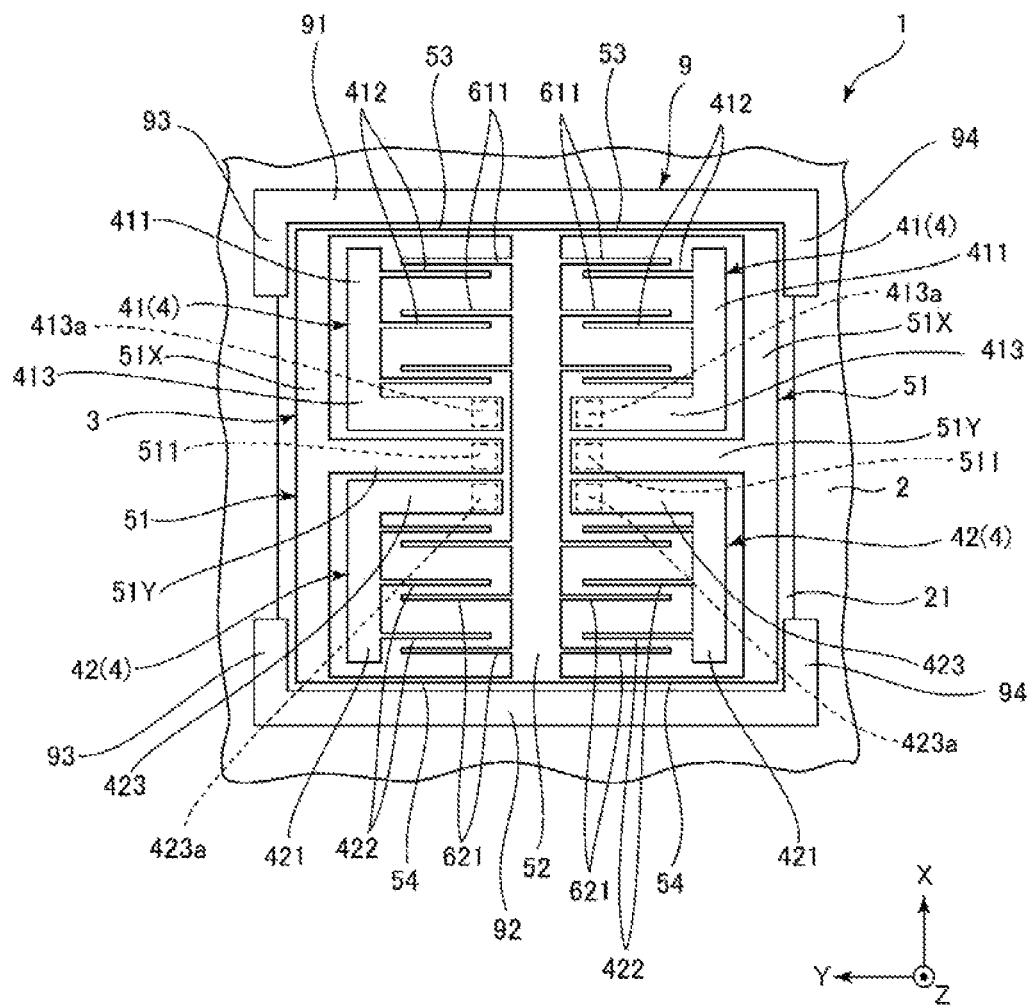
FIG. 27 is a plan view showing a physical quantity sensor according to a seventh embodiment of the invention.

FIG. 27 is a plan view showing the physical quantity sensor according to the seventh embodiment of the invention. Note that, in FIG. 27, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the seventh embodiment, differences from the first embodiment explained above are mainly explained. Explanation of the similarities is omitted. In FIG. 27, the same components as the components in the first embodiment explained above are denoted by the same reference numerals and signs.

As shown in FIG. 27, in the element assembly 3 in this embodiment, a pair of fixed members 51 is disposed side by side in the Y-axis direction. The fixed member 51 located on the Y-axis direction plus side includes an X-axis extending bar 51X extending in the X-axis direction and a Y-axis extending bar 51Y extending from the center of the X-axis extending bar 51X to the Y-axis direction minus side and including the bonding surface 511 at the distal end thereof and is formed in a substantial T shape. On the other hand, the fixed member 51 located on the Y-axis direction minus side includes the X-axis extending bar 51X extending in the X-axis direction and the Y-axis extending bar 51Y extending from the center of the X-axis extending bar 51X to the Y-axis direction plus side and including the bonding surface 511 at the distal end thereof and is formed in a substantial T shape.

The movable member 52 is located between the pair of fixed members 51 and 51 and formed in a long shape extending in the X-axis direction. The spring 53 couples the end on the X-axis direction plus side of the movable member 52 and the ends on the X-axis direction plus side of the fixed members 51. The spring 54 couples the end on the X-axis direction minus side of the movable member 52 and the ends on the X-axis direction minus side of the fixed members 51.

The plurality of first movable electrode fingers 611 extend from the movable member 52 toward the Y-axis direction on both sides. The plurality of first movable electrode fingers 611 are disposed eccentrically to the X-axis direction plus side of the movable member 52. On the other hand, the plurality of second movable electrode fingers 621 extend from the movable member 52 toward the Y-axis direction on both sides. The plurality of second movable electrode fingers 621 are disposed eccentrically to the X-axis direction minus side of the movable member 52.

A pair of the first fixed electrode assemblies 41 is provided across the movable member 52. The pair of first fixed electrode assemblies 41 is located further on the X-axis direction plus side than the Y-axis extending bar 51Y of the fixed member 51.

The first fixed electrode assembly 41 located on the Y-axis direction plus side includes the first stem 411 extending in the X-axis direction, the first fixed member 413 extending from the end on the X-axis direction minus side of the first stem 411 to the Y-axis direction minus side and including the bonding surface 413a at the distal end thereof, and the plurality of first fixed electrode fingers 412 extending from the first stem 411 to the Y-axis direction minus side. On the other hand, the first fixed electrode assembly 41 located on the Y-axis direction minus side includes the first stem 411 extending in the X-axis direction, the first fixed member 413 extending from the end on the X-axis direction minus side of the first stem 411 to the Y-axis direction plus side and including the bonding surface 413a at the distal end thereof, and the plurality of first fixed electrode fingers 412 extending from the first stem 411 to the Y-axis direction plus side.

A pair of the second fixed electrode assemblies 42 is provided across the movable member 52. The pair of second fixed electrode assemblies 42 is located further on the X-axis direction minus side than the Y-axis extending bar 51Y of the fixed member 51.

The second fixed electrode assembly 42 located on the Y-axis direction plus side includes the second stem 421 extending in the X-axis direction, the second fixed member 423 extending from the end on the X-axis direction plus side of the second stem 421 to the Y-axis direction minus side and including the bonding surface 423a at the distal end thereof, and the plurality of second fixed electrode fingers 422 extending from the second stem 421 to the Y-axis direction minus side. On the other hand, the second fixed electrode assembly 42 located on the Y-axis direction minus side includes the second stem 421 extending in the X-axis direction, the second fixed member 423 extending from the end on the X-axis direction plus side of the second stem 421 to the Y-axis direction plus side and including the bonding surface 423a at the distal end thereof, and the plurality of second fixed electrode fingers 422 extending from the second stem 421 to the Y-axis direction plus side.

In the fixed member 51, the first fixed electrode assembly 41, and the second fixed electrode assembly 42 located further on the Y-axis direction plus side than the movable member 52, the bonding surfaces 511, 413a, and 423a are disposed side by side in the X-axis direction. Similarly, in the fixed member 51, the first fixed electrode assembly 41, and the second fixed electrode assembly 42 located further on the Y-axis direction minus side than the movable member 52, the bonding surfaces 511, 413a, and 423a are disposed side by side in the X-axis direction.

According to the seventh embodiment, the same effects as the effects in the first embodiment explained above can be exerted.

Eighth Embodiment

A physical quantity sensor according to an eighth embodiment of the invention is explained.

Figure 28:
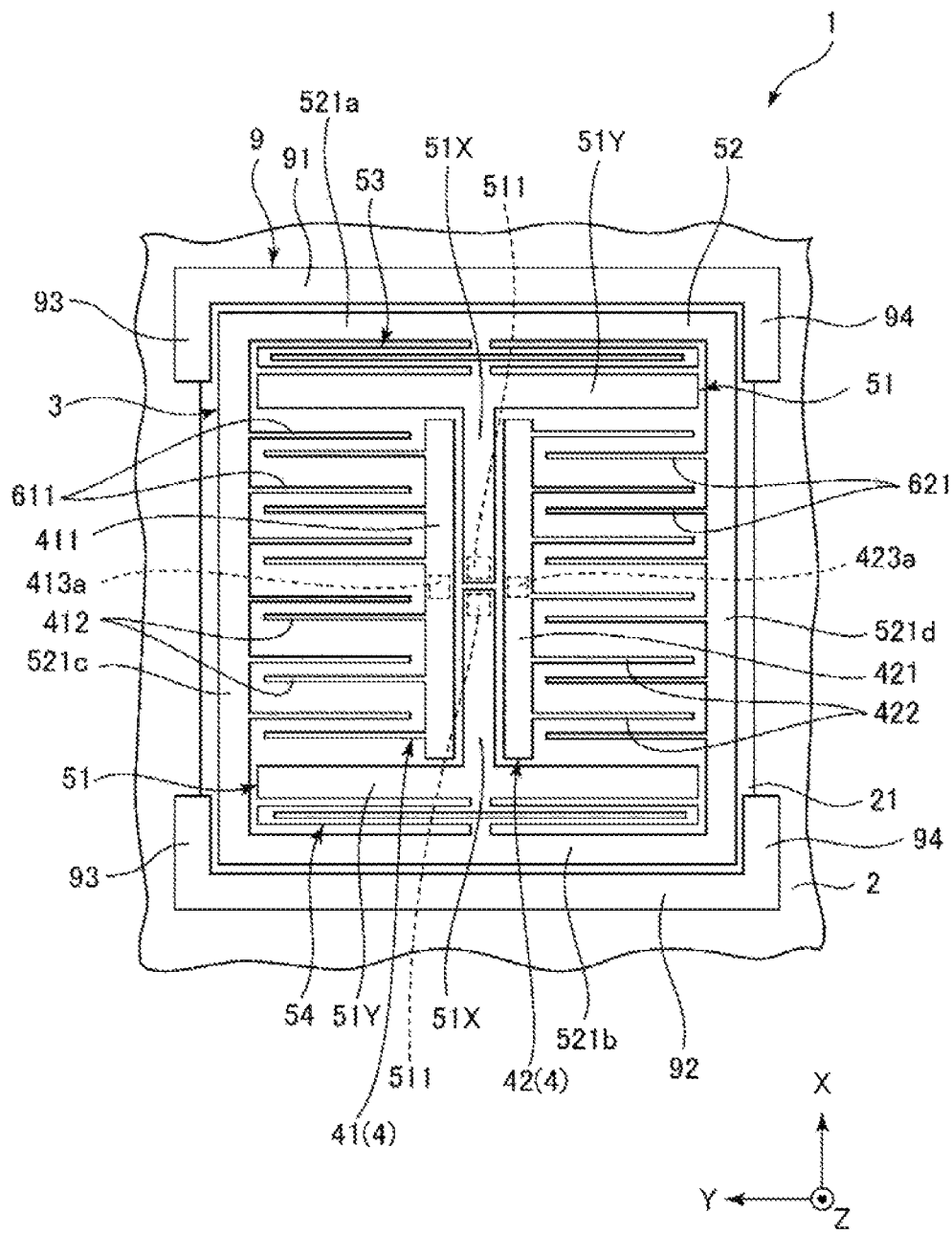
FIG. 28 is a plan view showing a physical quantity sensor according to an eighth embodiment of the invention.

FIG. 28 is a plan view showing the physical quantity sensor according to the eighth embodiment of the invention. Note that, in FIG. 28, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the eighth embodiment, differences from the first embodiment explained above are mainly explained. Explanation of the similarities is omitted. In FIG. 28, the same components as the components in the first embodiment explained above are denoted by the same reference numerals and signs.

As shown in FIG. 28, in the element assembly 3 in this embodiment, a pair of the fixed members 51 is provided side by side in the X-axis direction. The fixed member 51 located on the X-axis direction plus side includes the Y-axis extending bar 51Y extending in the Y-axis direction and the X-axis extending bar 51X extending from the center of the Y-axis extending bar 51Y to the X-axis direction minus side and including the bonding surface 511 at the distal end thereof and is formed in a substantial T shape. On the other hand, the fixed member 51 located on the X-axis direction minus side includes the Y-axis extending bar 51Y extending in the Y-axis direction and the X-axis extending bar 51X extending from the center of the Y-axis extending bar 51Y to the X-axis direction plus side and including the bonding surface 511 at the distal end thereof and is formed in a substantial T shape.

The movable member 52 is formed in a frame shape and disposed to surround the pair of fixed members 51 and 51. The spring 53 couples the end on the X-axis direction plus side of the movable member 52 and the end on the X-axis direction plus side of the fixed member 51 located on the X-axis direction plus side. The spring 54 couples the end on the X-axis direction minus side of the movable member 52 and the end on the X-axis direction minus side of the fixed member 51 located on the X-axis direction minus side.

The plurality of first movable electrode fingers 611 extend from the third outer edge 521c of the movable member 52 toward the Y-axis direction minus side. The plurality of second movable electrode fingers 621 extend from the fourth outer edge 521d of the movable member 52 toward the Y-axis direction plus side.

The first fixed electrode assembly 41 is located on the inner side of the movable member 52 and on the Y-axis direction plus side with respect to the X-axis extending bar 51X. The first fixed electrode assembly 41 includes the first stem 411 extending in the X-axis direction and including the bonding surface 413a in the center thereof and the plurality of first fixed electrode fingers 412 extending from the first stem 411 to the Y-axis direction plus side.

On the other hand, the second fixed electrode assembly 42 is located on the inner side of the movable member 52 and on the Y-axis direction minus side with respect to the X-axis extending bar 51X. The second fixed electrode assembly 42 includes the second stem 421 extending in the X-axis direction and including the bonding surface 423a in the center thereof and the plurality of second fixed electrode fingers 422 extending from the second stem 421 to the Y-axis direction minus side.

According to the eighth embodiment, the same effects as the effects in the first embodiment can be exerted.

Ninth Embodiment

A physical quantity sensor according to a ninth embodiment of the invention is explained.

Figure 29:
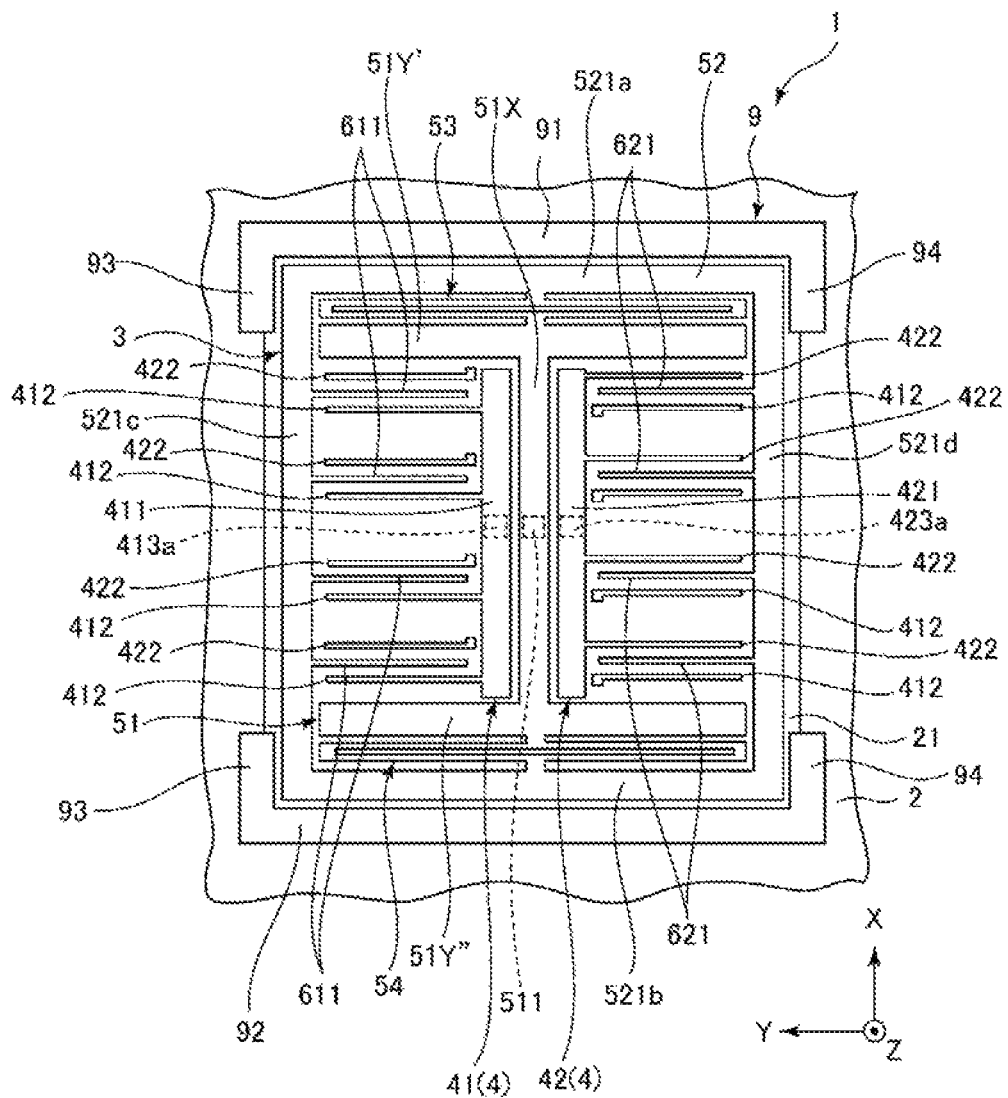
FIG. 29 is a plan view showing a physical quantity sensor according to a ninth embodiment of the invention.
Figure 30:
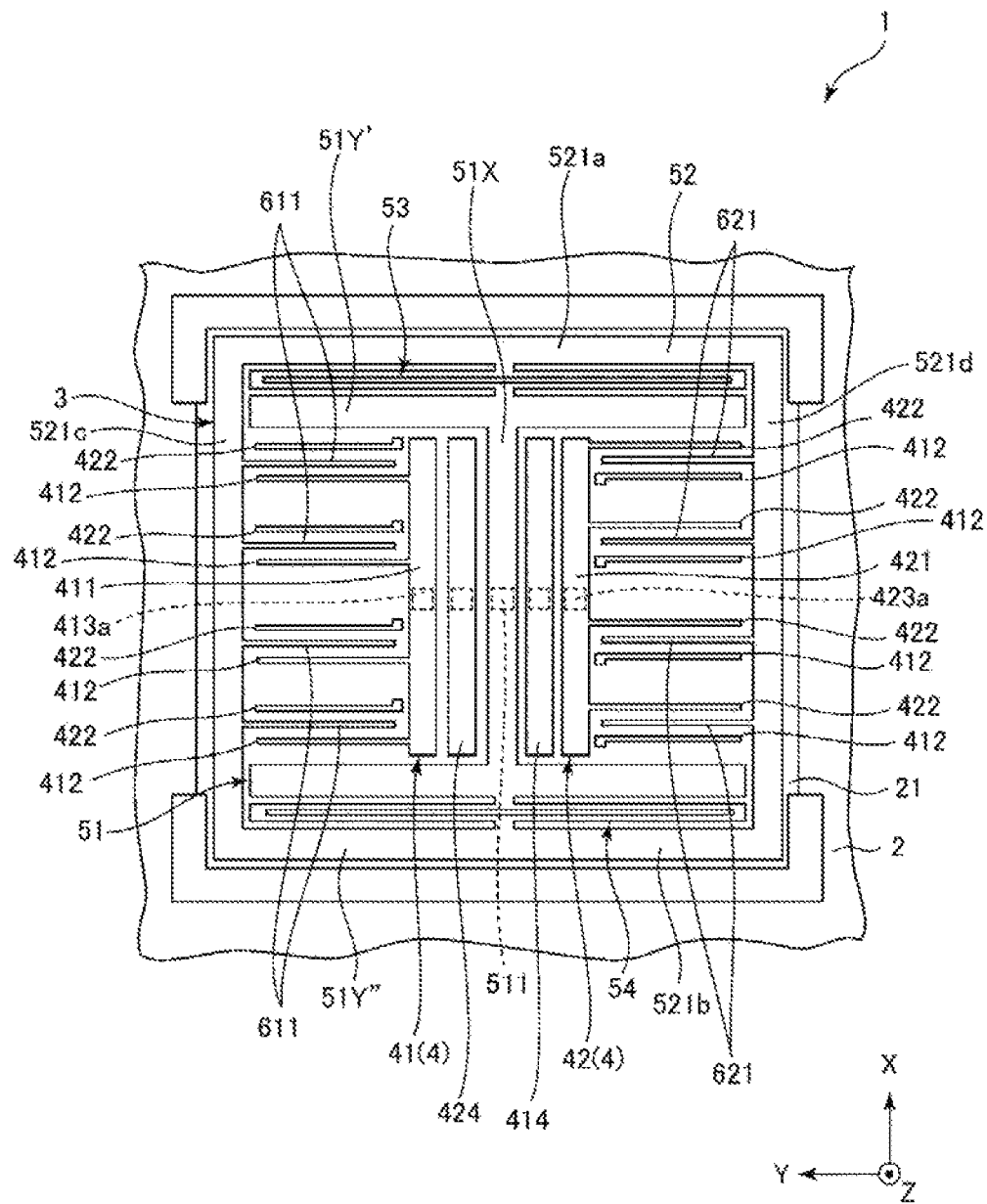
FIG. 30 is a plan view showing a modification of the physical quantity sensor shown in FIG. 29.
Figure 31:
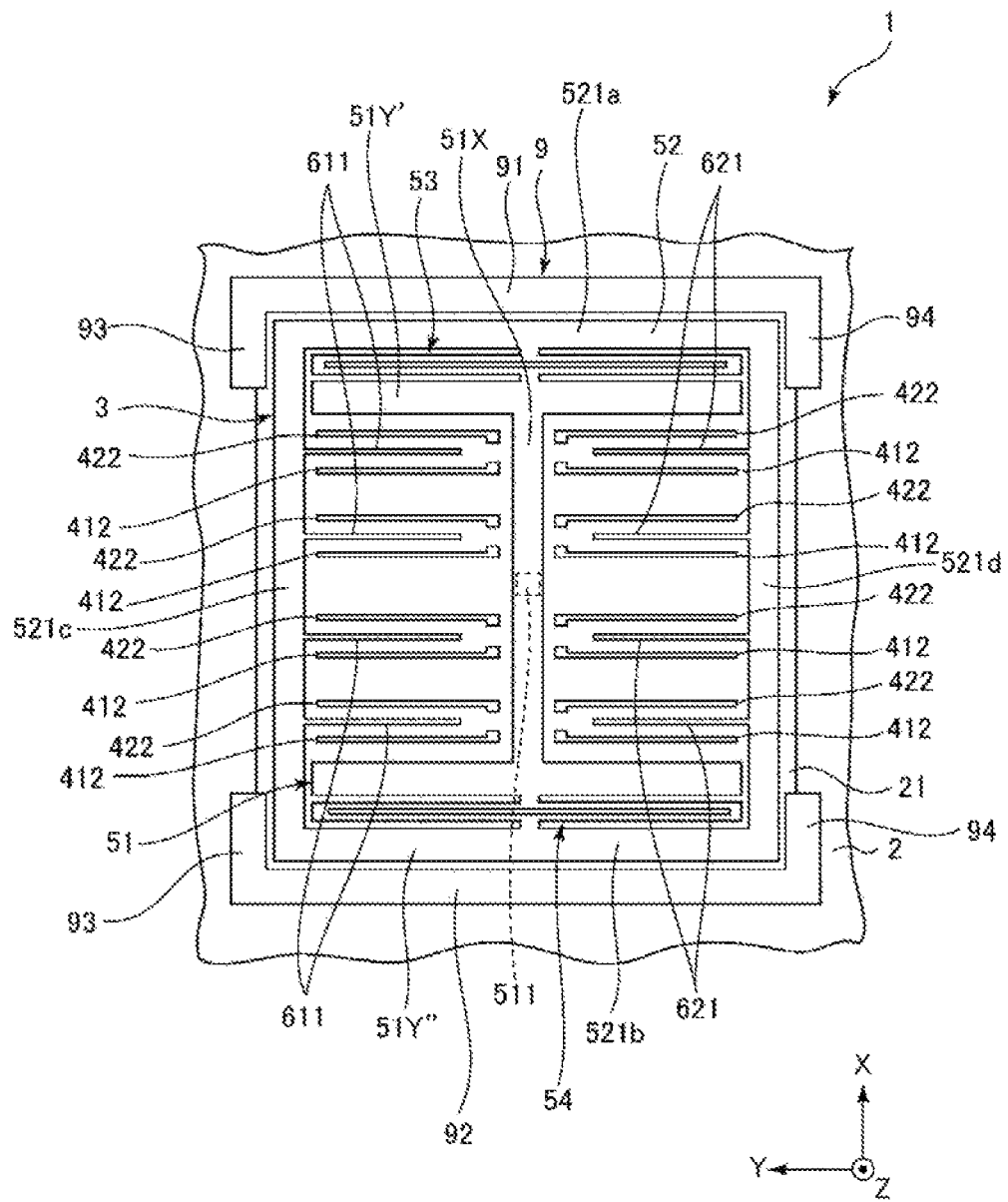
FIG. 31 is a plan view showing a modification of the physical quantity sensor shown in FIG. 29.

FIG. 29 is a plan view showing the physical quantity sensor according to the ninth embodiment of the invention. FIGS. 30 and 31 are respectively plan views showing modifications of the physical quantity sensor shown in FIG. 29. Note that, in each of FIGS. 29 to 31, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the ninth embodiment, differences from the first embodiment explained above are mainly explained. Explanation of the similarities is omitted. In FIG. 29, the same components as the components in the first embodiment explained above are denoted by the same reference numerals and signs.

As shown in FIG. 29, in the element assembly 3 in this embodiment, the fixed member 51 includes the X-axis extending bar 51X extending in the X-axis direction and including the bonding surface 511 in the center thereof, a Y-axis extending bar 51Y' extending from the end on the X-axis direction plus side of the X-axis extending bar 51X to the Y-axis direction on both sides, and a Y-axis extending bar 51Y" extending from the end on the X-axis direction minus side of the X-axis extending bar 51X to the Y-axis direction on both sides.

The movable member 52 is formed in a frame shape and disposed to surround the fixed member 51. The spring 53 couples the end on the X-axis direction plus side of the movable member 52 and the Y-axis extending bar 51Y'. The spring 54 couples the end on the X-axis direction minus side of the movable member 52 and the Y-axis extending bar 51Y".

The plurality of first movable electrode fingers 611 extend from the third outer edge 521c of the movable member 52 toward the Y-axis direction minus side. The plurality of second movable electrode fingers 621 extend from the fourth outer edge 521d of the movable member 52 toward the Y-axis direction plus side.

The first fixed electrode assembly 41 is located on the inner side of the movable member 52. The first fixed electrode assembly 41 includes the first stem 411 located on the Y-axis direction plus side with respect to the X-axis extending bar 51X, extending in the X-axis direction, and including the bonding surface 413a in the center thereof and the plurality of first fixed electrode fingers 412 extending from the first stem 411 to the Y-axis direction plus side. Further, the first fixed electrode assembly 41 includes the plurality of first fixed electrode fingers 412 located on the Y-axis direction minus side with respect to the X-axis extending bar 51X and bonded to the substrate 2 at the end on the Y-axis direction plus side. The first fixed electrode fingers 412 are located on the X-axis direction minus side with respect to the first and second movable electrode fingers 611 and 621 corresponding to the first fixed electrode fingers 412.

The second fixed electrode assembly 42 is located on the inner side of the movable member 52. The second fixed electrode assembly 42 includes the second stem 421 located on the Y-axis direction minus side with respect to the X-axis extending bar 51X, extending in the X-axis direction, and including the bonding surface 423a in the center thereof and the plurality of second fixed electrode fingers 422 extending from the second stem 421 to the Y-axis direction minus side. Further, the second fixed electrode assembly 42 includes the plurality of second fixed electrode fingers 422 located on the Y-axis direction plus side with respect to the X-axis extending bar 51X and bonded to the substrate 2 at the end on the Y-axis direction minus side. The second fixed electrode fingers 422 are located on the X-axis direction plus side with respect to the first and second movable electrode fingers 611 and 621 corresponding to the second fixed electrode fingers 422.

According to the ninth embodiment, the same effects as the effects in the first embodiment can be exerted.

Note that, as a modification of this embodiment, for example, as shown in FIG. 30, the physical quantity sensor 1 may include, between the fixed member 51 and the first stem 411, a connector 424 extending in the X-axis direction and electrically connected to the second fixed electrode fingers 422 located on the Y-axis direction plus side and include, between the fixed member 51 and the second stem 421, a connector 414 extending in the X-axis direction and electrically connected to the first fixed electrode fingers 412 located on the Y-axis direction minus side.

As shown in FIG. 31, the first stem 411 may be omitted from the first fixed electrode assembly 41. All the first fixed electrode fingers 412 may be directly bonded to the substrate 2. The second stem 421 may be omitted from the second fixed electrode assembly 42. All the second fixed electrode fingers 422 may be directly bonded to the substrate 2.

Tenth Embodiment

A physical quantity sensor according to the tenth embodiment of the invention is explained.

Figure 32:
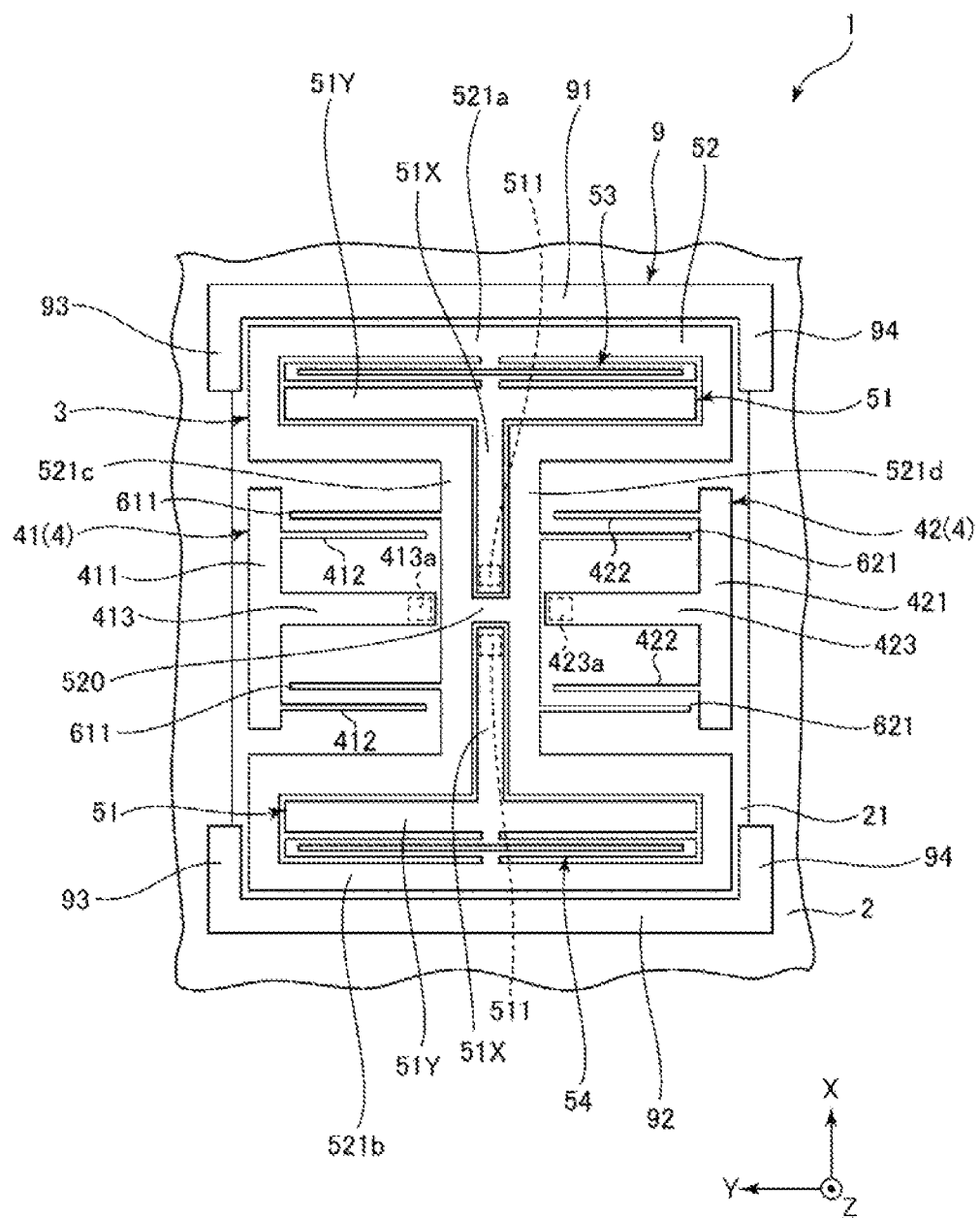
FIG. 32 is a plan view showing a physical quantity sensor according to a tenth embodiment of the invention.

FIG. 32 is a plan view showing the physical quantity sensor according to the tenth embodiment of the invention. Note that, in FIG. 32, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the tenth embodiment, differences from the first embodiment explained above are mainly explained. Explanation of the similarities is omitted. In FIG. 32, the same components as the components in the first embodiment explained above are denoted by the same reference numerals and signs.

As shown in FIG. 32, in the element assembly 3 in this embodiment, a pair of the fixed members 51 is disposed side by side in the X-axis direction. The fixed member 51 located on the X-axis direction plus side includes the Y-axis extending bar 51Y extending in the Y-axis direction and the X-axis extending bar 51X extending from the center of the Y-axis extending bar 51Y to the X-axis direction minus side and including the bonding surface 511 at the distal end thereof and is formed in a substantial T shape. On the other hand, the fixed member 51 located on the X-axis direction minus side includes the Y-axis extending bar 51Y extending in the Y-axis direction and the X-axis extending bar 51X extending from the center of the Y-axis extending bar 51Y to the X-axis direction plus side and including the bonding surface 511 at the distal end thereof and is formed in a substantial T shape.

The spring 53 couples the fixed member 51 on the X-axis direction plus side and the movable member 52. The spring 54 couples the fixed member 51 on the X-axis direction minus side and the movable member 52. The movable member 52 is formed in a frame shape and disposed to surround the fixed member 51 and the springs 53 and 54. The movable member 52 is formed along the contours of the fixed member 51 and the springs 53 and 54. The movable member 52 includes a coupler 520 configured to couple the third outer edge 521c and the fourth outer edge 521d between the pair of X-axis extending bars 51X.

The plurality of first movable electrode fingers 611 extend from the third outer edge 521c of the movable member 52 toward the Y-axis direction plus side (the outer side of the movable member 52). The plurality of second movable electrode fingers 621 extend from the fourth outer edge 521d of the movable member 52 toward the Y-axis direction minus side (the outer side of the movable member 52).

The first fixed electrode assembly 41 is located on the outer side of the movable member 52. The first fixed electrode assembly 41 includes the first stem 411 located on the Y-axis direction plus side with respect to the fixed member 51 and extending in the X-axis direction, the first fixed member 413 extending from the center of the first stem 411 to the Y-axis direction minus side and including the bonding surface 413a at the distal end thereof, and the plurality of first fixed electrode fingers 412 extending from the first stem 411 to the Y-axis direction minus side.

The second fixed electrode assembly 42 is located on the outer side of the movable member 52. The second fixed electrode assembly 42 includes the second stem 421 located on the Y-axis direction minus side with respect to the fixed member 51 and extending in the X-axis direction, the second fixed member 423 extending from the center of the second stem 421 to the Y-axis direction plus side, and including the bonding surface 423a at the distal end thereof, and the plurality of second fixed electrode fingers 422 extending from the second stem 421 to the Y-axis direction plus side.

According to the tenth embodiment, the same effects as the effects in the first embodiment can be exerted.

Eleventh Embodiment

A physical quantity sensor according to an eleventh embodiment of the invention is explained.

Figure 33:
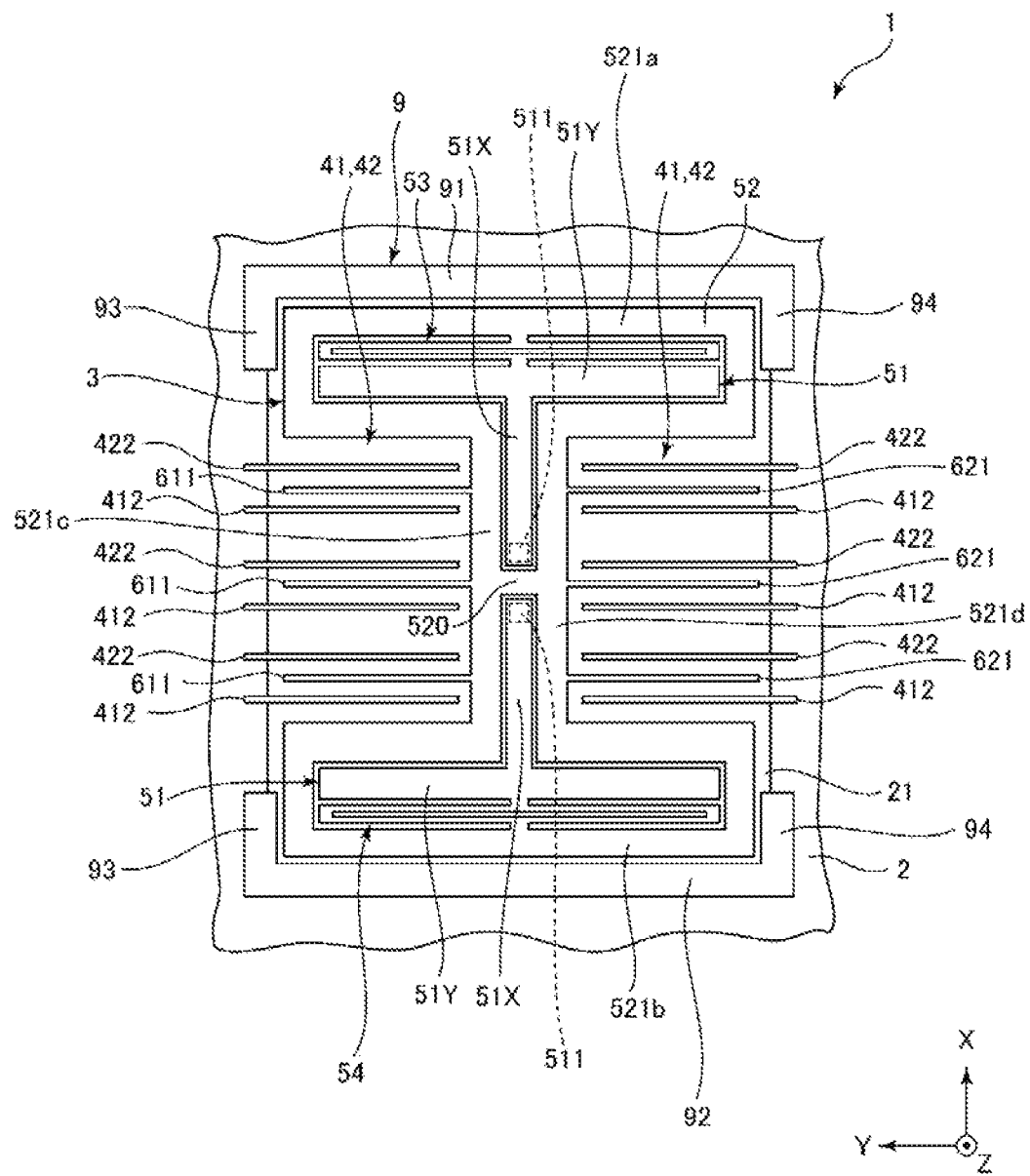
FIG. 33 is a plan view showing a physical quantity sensor according to an eleventh embodiment of the invention.

FIG. 33 is a plan view showing the physical quantity sensor according to the eleventh embodiment of the invention. Note that, in FIG. 33, for convenience of explanation, illustration of the grooves 25, 26, and 27 and the wires 71, 72, and 73 is omitted.

The physical quantity sensor 1 according to this embodiment is the same as the physical quantity sensor 1 according to the tenth embodiment mainly except that the configuration of the element assembly 3 is different.

Note that, in the following explanation, concerning the physical quantity sensor 1 according to the eleventh embodiment, differences from the tenth embodiment explained above are mainly explained. Explanation of the similarities is omitted. In FIG. 33, the same components as the components in the tenth embodiment explained above are denoted by the same reference numerals and signs.

As shown in FIG. 33, in the element assembly 3 in this embodiment, the first fixed electrode assembly 41 includes the plurality of first fixed electrode fingers 412 located on the X-axis direction minus side with respect to the first and second movable electrode fingers 611 and 621 corresponding to the first fixed electrode assembly 41. The first fixed electrode fingers 412 are bonded to the substrate 2 at one end thereof. The second fixed electrode assembly 42 includes the plurality of second fixed electrode fingers 422 located on the X-axis direction plus side with respect to the first and second movable electrode fingers 611 and 621 corresponding to the second fixed electrode assembly 42. The second fixed electrode fingers 422 are bonded to the substrate 2 at one end thereof.

According to the eleventh embodiment, the same effects as the effects in the first embodiment can be exerted.

Twelfth Embodiment

A physical quantity sensor according to a twelfth embodiment of the invention is explained.

Figure 34:
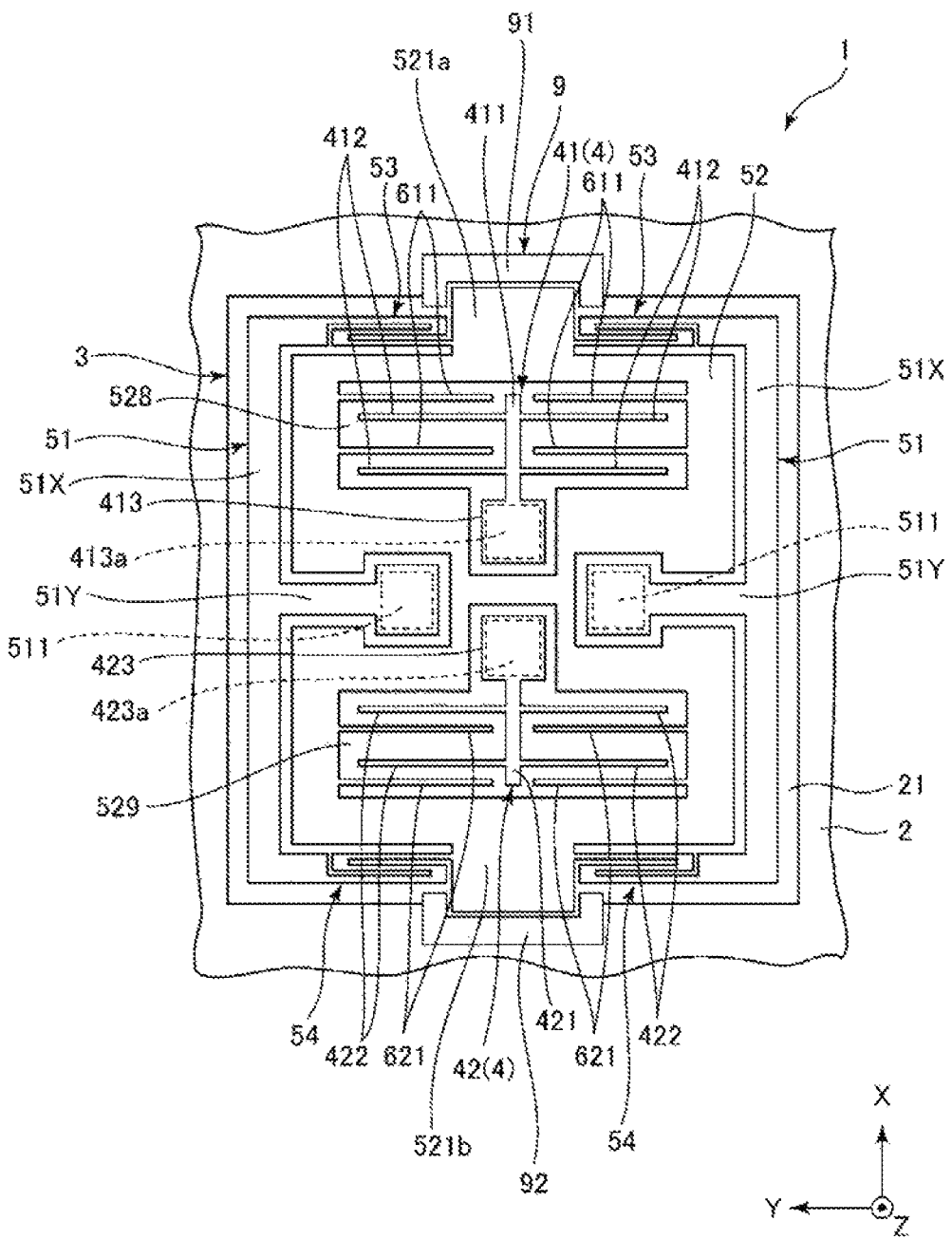
FIG. 34 is a plan view showing a physical quantity sensor according to a twelfth embodiment of the invention.

FIG. 34 is a plan view showing the physical quantity sensor according to the twelfth embodiment of the invention. Note that, in FIG. 34, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the twelfth embodiment, differences from the first embodiment explained above are mainly explained. Explanation of the similarities is omitted. In FIG. 34, the same components as the components in the first embodiment explained above are denoted by the same reference numerals and signs.

As shown in FIG. 34, in the element assembly 3 in this embodiment, a pair of the fixed members 51 is disposed side by side in the Y-axis direction. The fixed member 51 located on the Y-axis direction plus side includes the X-axis extending bar 51X extending in the X-axis direction and the Y-axis extending bar 51Y extending from the center of the X-axis extending bar 51X to the Y-axis direction minus side and including the bonding surface 511 at the distal end thereof and is formed in a substantial T shape. On the other hand, the fixed member 51 located on the Y-axis direction minus side includes the X-axis extending bar 51X extending in the X-axis direction and the Y-axis extending bar 51Y extending from the center of the X-axis extending bar 51X to the Y-axis direction plus side and including the bonding surface 511 at the distal end thereof and is formed in a substantial T shape.

The movable member 52 is located between the pair of fixed members 51 and 51. The movable member 52 includes the first opening 528, on the inner side of which the first fixed electrode assembly 41 is disposed, and the second opening 529, on the inner side of which the second fixed electrode assembly 42 is disposed. The spring 53 couples the end on the X-axis direction plus side of the movable member 52 and the ends on the X-axis direction plus side of the fixed members 51. The springs 54 couples the end on the X-axis direction minus side of the movable member 52 and the ends on the X-axis direction minus side of the fixed members 51.

The plurality of first movable electrode fingers 611 extend from the Y-axis direction on both sides of the movable member 52 to project into the first opening 528. On the other hand, the plurality of second movable electrode fingers 621 extend from the Y-axis direction on both sides of the movable member 52 to project into the second opening 529.

The first fixed electrode assembly 41 is located in the first opening 528. The first fixed electrode assembly 41 includes the first fixed member 413 including the bonding surface 413a, the first stem 411 extending from the first fixed member 413 to the X-axis direction plus side, and the plurality of first fixed electrode fingers 412 extending from the first stem 411 to the Y-axis direction on both sides.

On the other hand, the second fixed electrode assembly 42 is located in the second opening 529. The second fixed electrode assembly 42 includes the second fixed member 423 including the bonding surface 423a, the second stem 421 extending from the second fixed member 423 to the X-axis direction minus side, and the plurality of second fixed electrode fingers 422 extending from the second stem 421 to the Y-axis direction on both sides.

According to the twelfth embodiment, the same effects as the effects in the first embodiment can be exerted.

Thirteenth Embodiment

A physical quantity sensor according to the thirteenth embodiment of the invention is explained.

Figure 35:
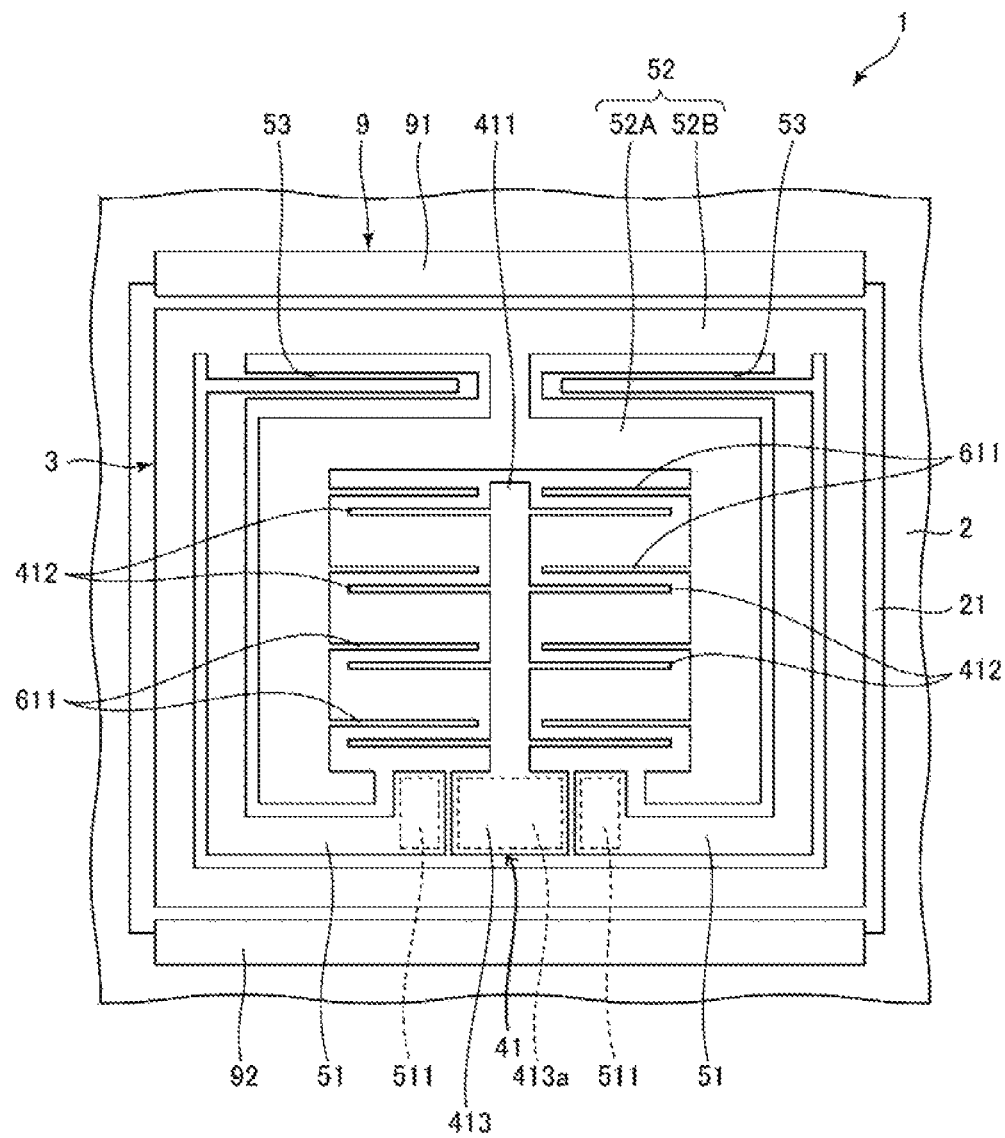
FIG. 35 is a plan view showing a physical quantity sensor according to a thirteenth embodiment of the invention.
Figure 36:
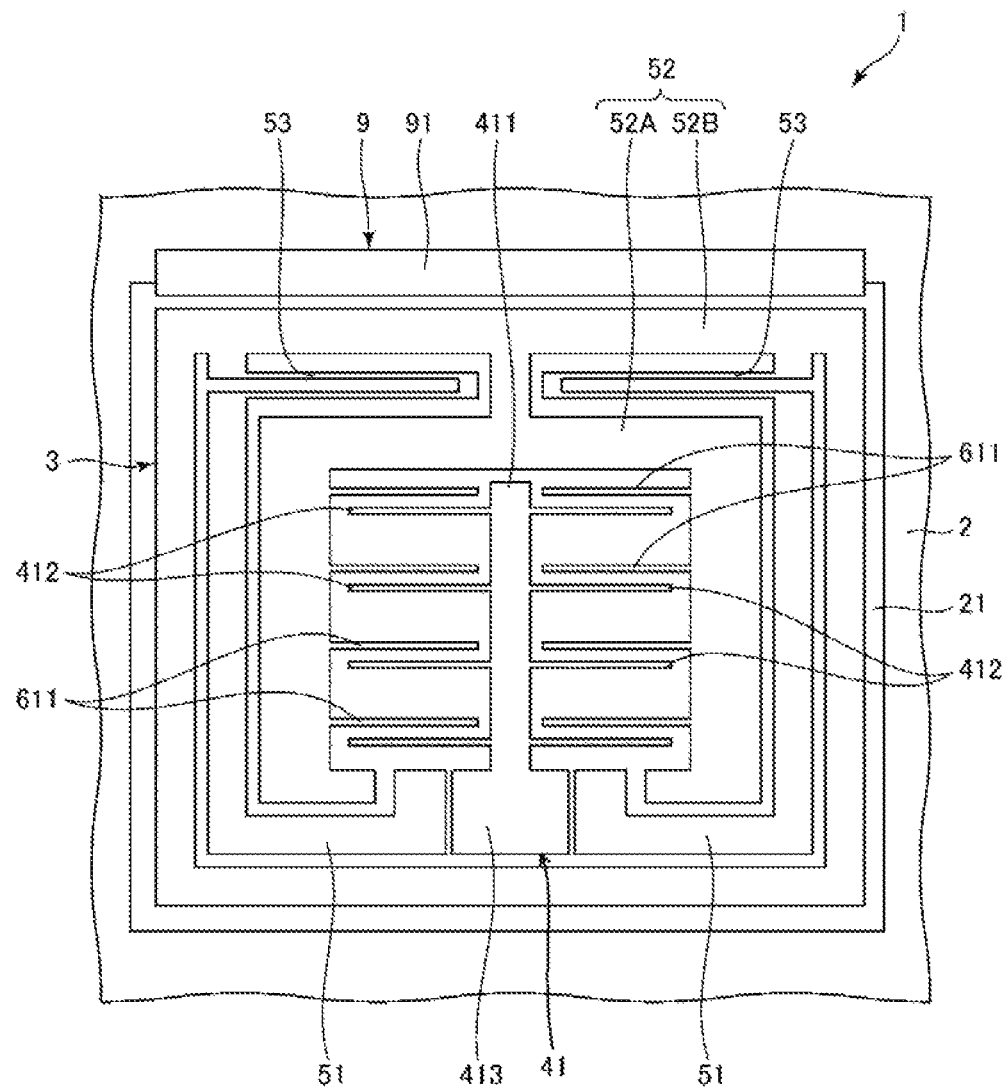
FIG. 36 is a plan view showing a modification of the physical quantity sensor shown in FIG. 35.
Figure 37:
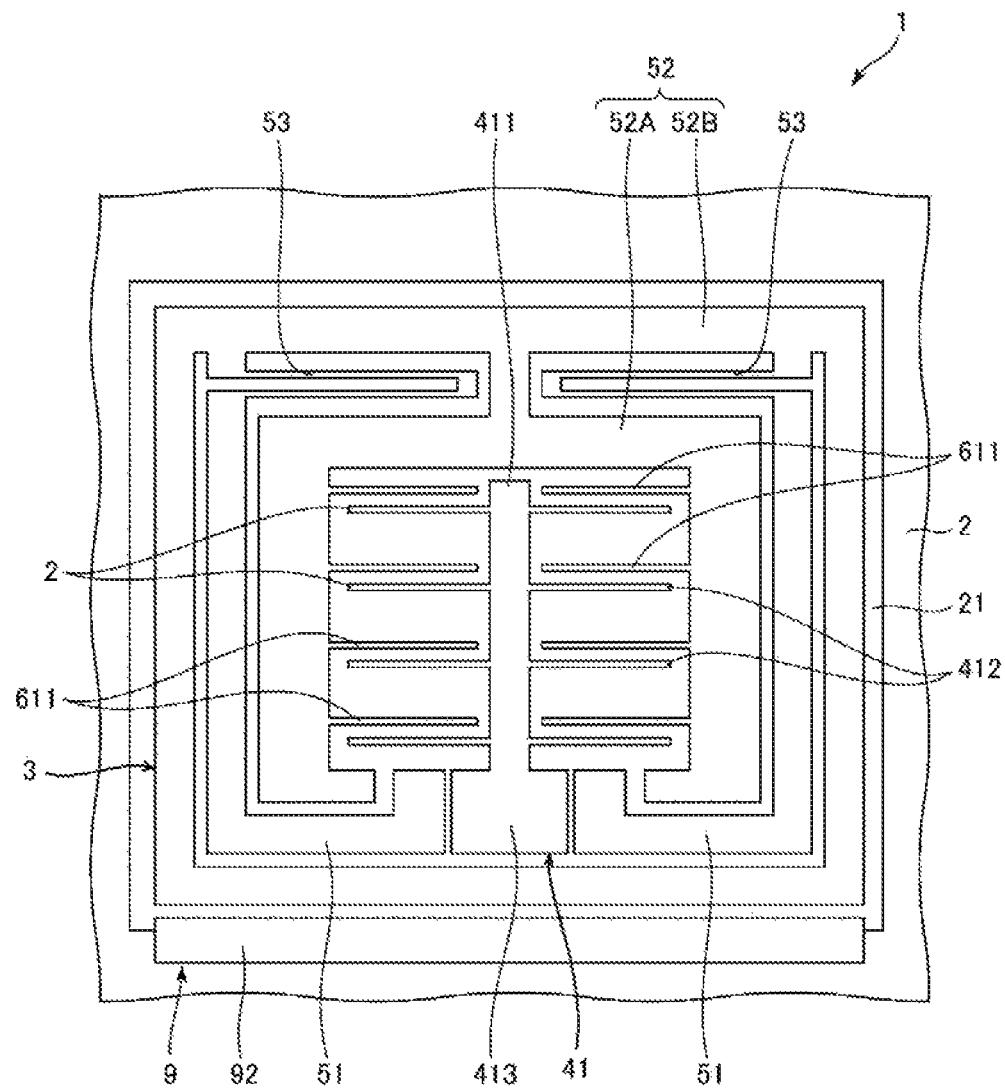
FIG. 37 is a plan view showing a modification of the physical quantity sensor shown in FIG. 35.

FIG. 35 is a plan view showing the physical quantity sensor according to the thirteenth embodiment of the invention. FIGS. 36 and 37 are respectively plan views showing modifications of the physical quantity sensor shown in FIG. 35. Note that, in each of FIGS. 35 to 37, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the thirteenth embodiment, differences from the first embodiment explained above are mainly explained. Explanation of the similarities is omitted. In FIGS. 35 to 37, the same components as the components in the first embodiment explained above are denoted by the same reference numerals and signs.

As shown in FIG. 35, in the element assembly 3 in this embodiment, a pair of the fixed members 51 is provided side by side in the Y-axis direction. Each of the pair of fixed members 51 is formed in a substantial L shape. The movable member 52 includes an inner frame 52A located between the pair of fixed members 51 and 51 and an outer frame 52B located on the outer side of the pair of fixed members 51 and 51 to surround the pair of fixed members 51 and 51. The fixed members 51 and the outer frame 52B are connected by a pair of springs 53. The plurality of first movable electrode fingers 611 extend in the Y-axis direction from the inner frame 52A toward the inner side of the inner frame 52A. Note that, in this embodiment, the second movable electrode fingers 621 in the first embodiment explained above is omitted.

The first fixed electrode assembly 41 includes the first fixed member 413, the first stem 411 extending from the first fixed member 413 toward the X-axis direction plus side and the plurality of first fixed electrode fingers 412 extending from the first stem 411 toward the Y-axis direction on both sides. Note that, in this embodiment, the second fixed electrode assembly 42 in the first embodiment explained above is omitted.

According to the thirteenth embodiment, the same effects as the effects in the first embodiment can be exerted. Note that, in this embodiment, the restrictor 9 includes both of the first restrictor 91 and the second restrictor 92. However, the restrictor 9 is not limited to this and only has to include at least one of the first restrictor 91 and the second restrictor 92. That is, the restrictor 9 may include only the first restrictor 91 as shown in FIG. 36 or may include only the second restrictor 92 as shown in FIG. 37. Consequently, the restrictor 9 can exert a function of a stopper for acceleration to at least one side in the X-axis direction.

Fourteenth Embodiment

A physical quantity sensor according to a fourteenth embodiment of the invention is explained.

Figure 38:
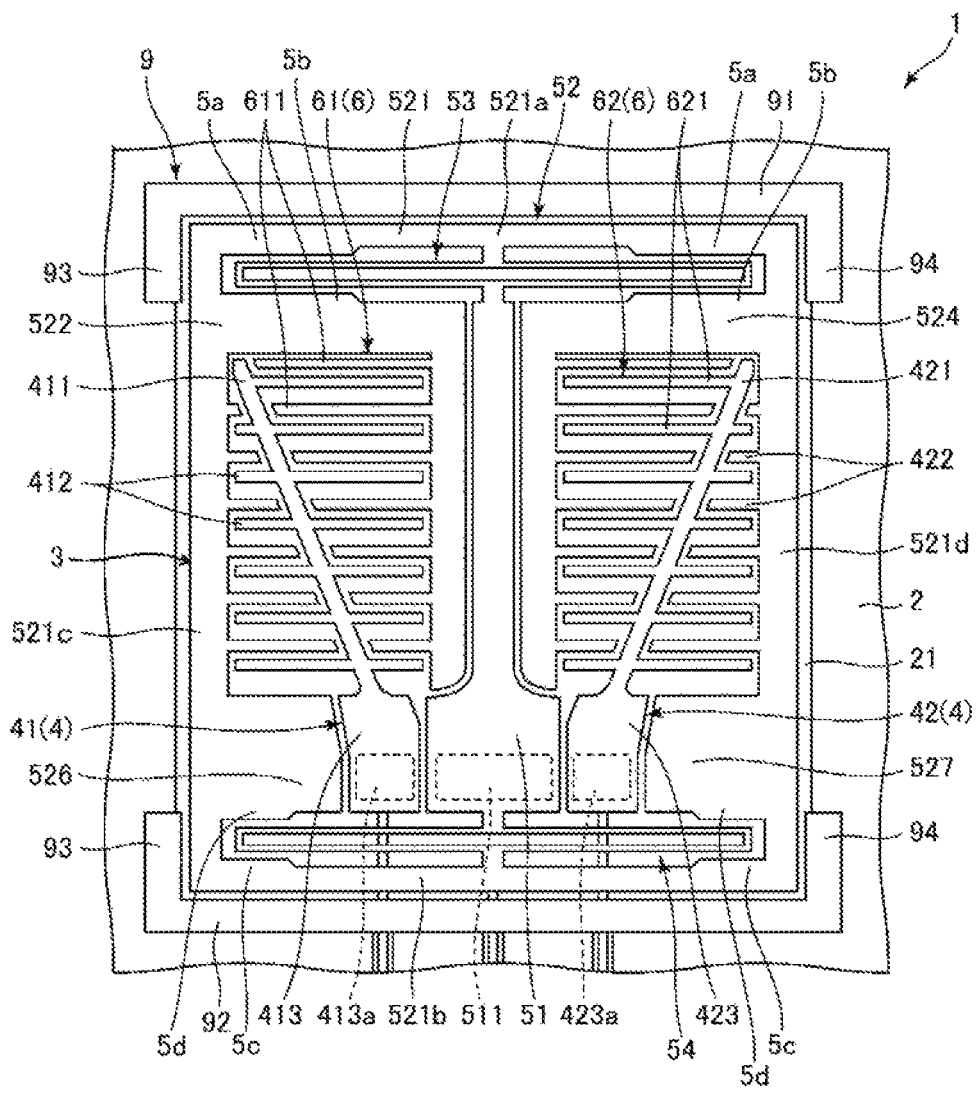
FIG. 38 is a plan view showing a physical quantity sensor according to a fourteenth embodiment of the invention.

FIG. 38 is a plan view showing the physical quantity sensor according to the fourteenth embodiment of the invention. Note that, in FIG. 38, for convenience of explanation, illustration of the grooves 25, 26, and 27 and the wires 71, 72, and 73 is omitted.

The physical quantity sensor 1 according to this embodiment is the same as the physical quantity sensor 1 according to the first embodiment mainly except that the configuration of the element assembly 3 is different.

Note that, in the following explanation, concerning the physical quantity sensor 1 according to the fourteenth embodiment, differences from the first embodiment explained above are mainly explained. Explanation of the similarities is omitted. In FIG. 38, the same components as the components in the first embodiment explained above are denoted by the same reference numerals and signs.

As shown in FIG. 38, the movable member 52 includes a pair of projections 5a projecting from the frame 521 (the first outer edge 521a) toward the spring 53 and a pair of projections 5b projecting from the first and second Y-axis extending bars 522 and 524 toward the spring 53. Therefore, the spring 53 is disposed to be held between the pair of projections 5a and the pair of projections 5b. The movable member 52 includes a pair of projections 5c projecting from the frame 521 (the second outer edge 521b) toward the spring 54 and a pair of projections 5d projecting from the first and second projections 526 and 527 toward the spring 54. Therefore, the spring 54 is disposed to be held between the pair of projections 5c and the pair of projections 5d.

When the movable member 52 is excessively displaced in the X-axis direction, the projections 5a, 5b, 5c, and 5d come into contact with the springs 53 and 54 to function as stoppers that restrict displacement of the springs 53 and 54. Folded-back portions (distal ends) of the springs 53 and 54 are extremely easily displaced when a strong shock is applied thereto. Therefore, by providing the projections 5a, 5b, 5c, and 5d, the excessive displacement of the springs 53 and 54 can be reduced and damage to the springs 53 and 54 can be reduced. Therefore, the physical quantity sensor 1 having excellent shock resistance is obtained.

According to the fourteenth embodiment, the same effects as the effects in the first embodiment can be exerted.

Fifteenth Embodiment

A physical quantity sensor according to a fifteenth embodiment of the invention is explained.

Figure 39:
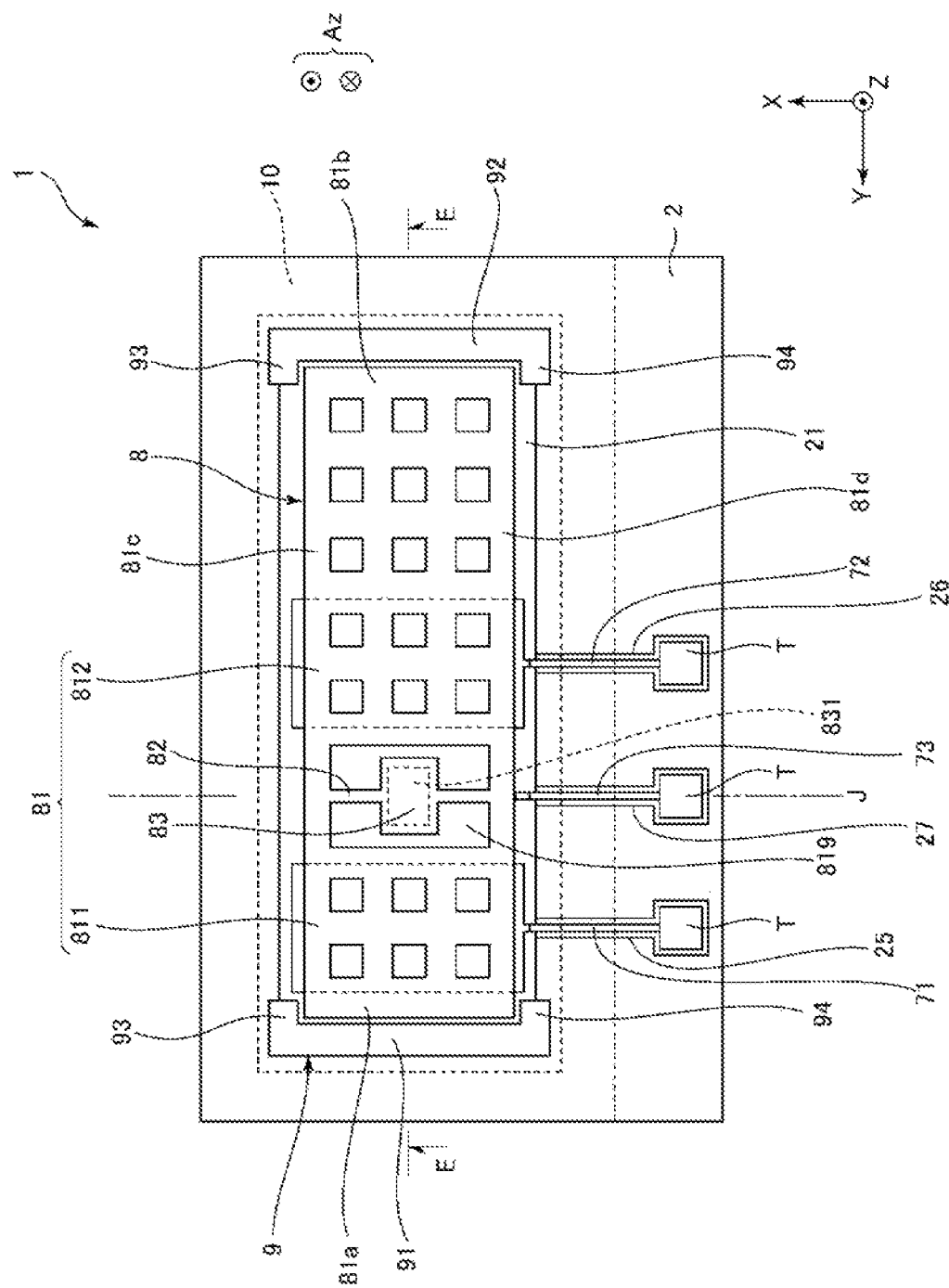
FIG. 39 is a plan view showing a physical quantity sensor according to a fifteenth embodiment of the invention.
Figure 40:
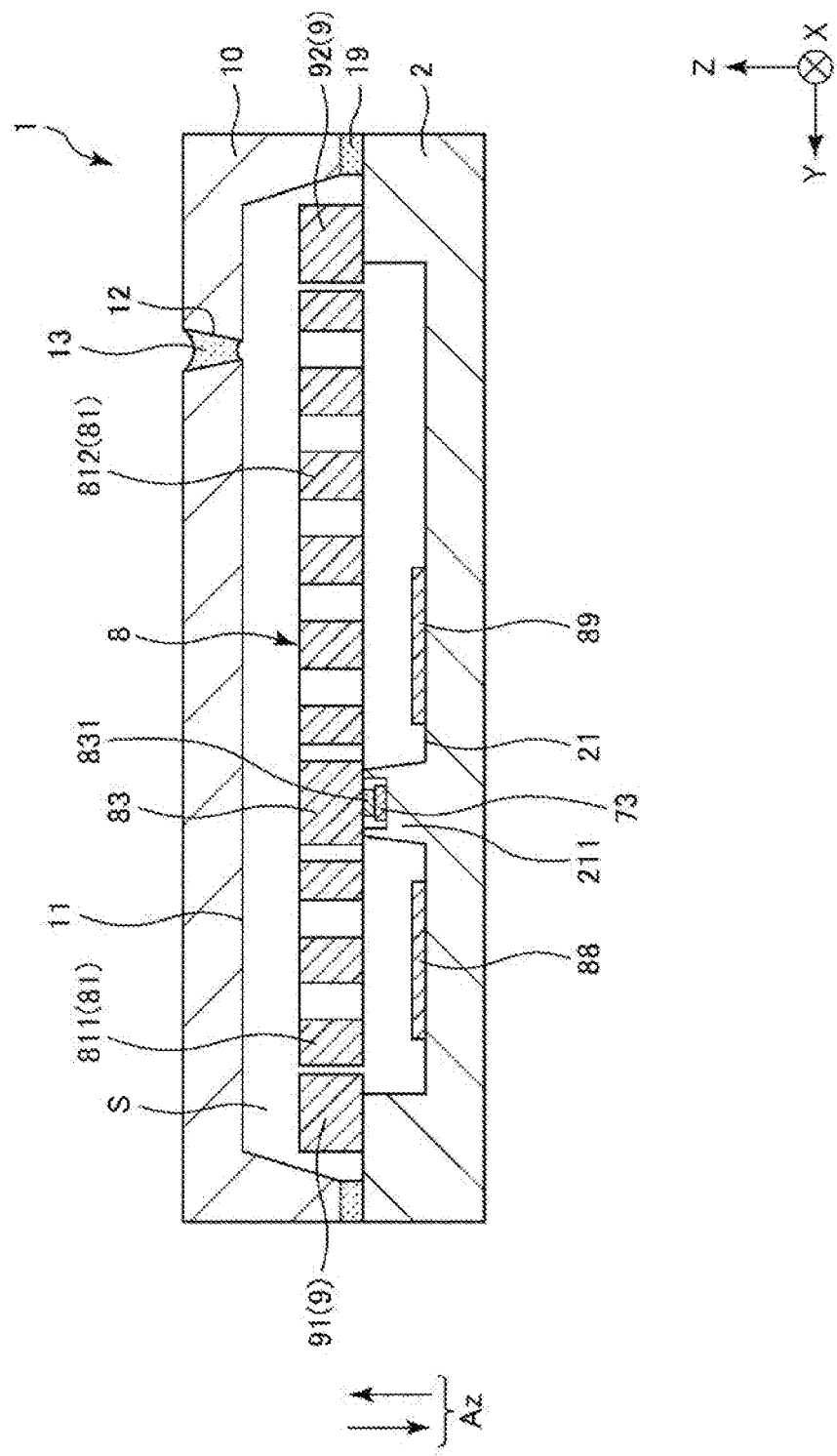
FIG. 40 is an E-E line sectional view in FIG. 39.
Figure 41:
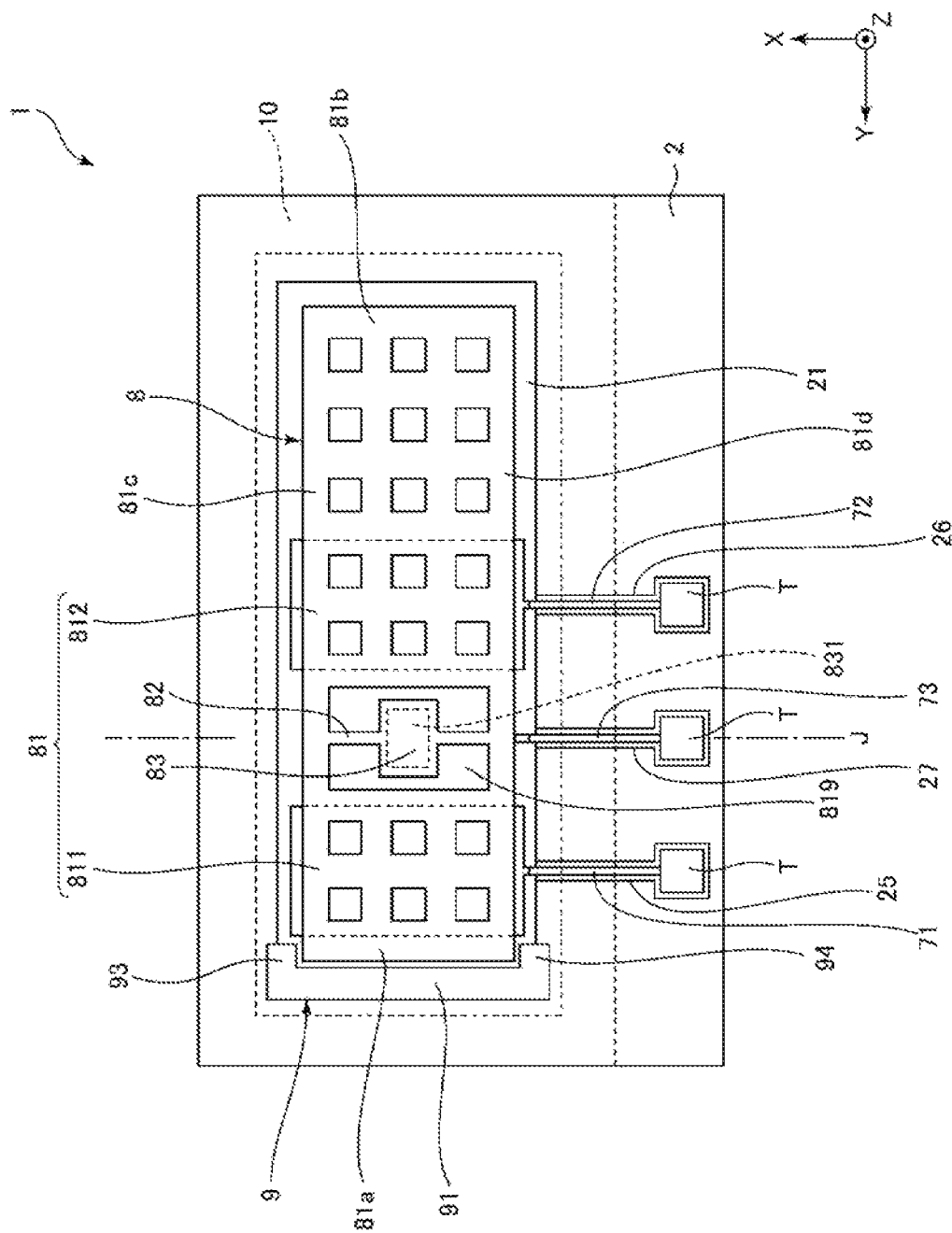
FIG. 41 is a plan view showing a modification of the physical quantity sensor shown in FIG. 39.
Figure 42:
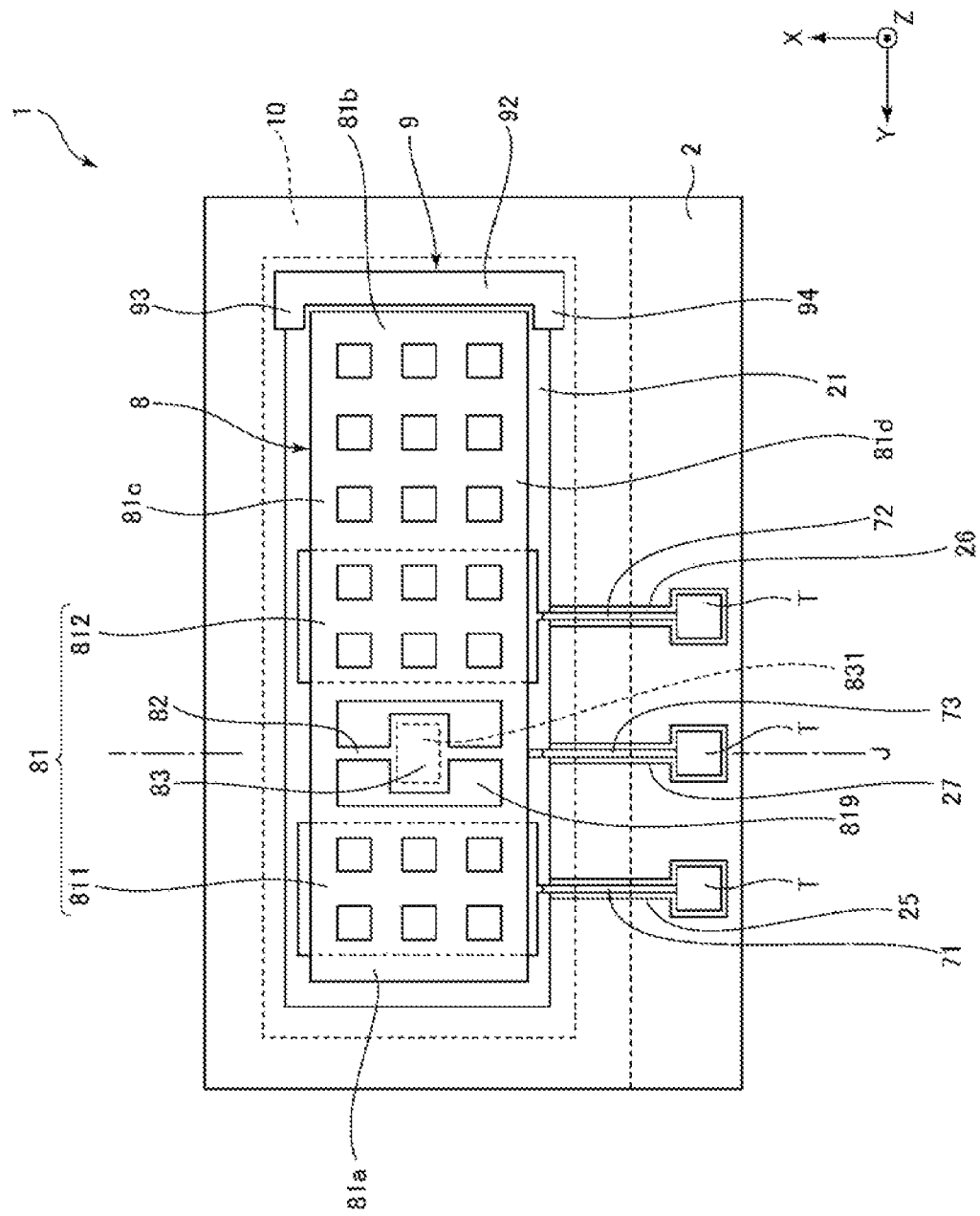
FIG. 42 is a plan view showing a modification of the physical quantity sensor shown in FIG. 39.

FIG. 39 is a plan view showing the physical quantity sensor according to the fifteenth embodiment of the invention. FIG. 40 is an E-E line sectional view in FIG. 39. FIGS. 41 and 42 are respectively plan views showing modifications of the physical quantity sensor shown in FIG. 39.

The physical quantity sensor 1 according to this embodiment is the same as the physical quantity sensor 1 according to the first embodiment mainly except that the configuration of an element assembly 8 is different.

Note that, in the following explanation, concerning the physical quantity sensor 1 according to the fifteenth embodiment, differences from the first embodiment explained above are mainly explained. Explanation of the similarities is omitted. In FIGS. 39 to 42, the same components as the components in the first embodiment explained above are denoted by the same reference numerals and signs.

The physical quantity sensor 1 shown in FIG. 39 is an acceleration sensor that can detect acceleration Az in the Z-axis direction. The element assembly 8 included in the physical quantity sensor 1 includes a movable member 81, a beam 82, and a fixed member 83.

The movable member 81 is tabular and is formed in a longitudinal shape having the Y-axis direction as a longitudinal direction in the plan view from the Z-axis direction. The movable member 81 is connected to the fixed member 83 via the beam 82. The fixed member 83 includes a bonding surface 831 to a mount 211 provided in the recess 21. Note that the movable member 81 includes an opening 819 on the inner side thereof. The beam 82 and the fixed member 83 are disposed in the opening 819.

The movable member 81 includes a first movable electrode assembly 811 located on one side (the Y-axis direction plus side) of a swing axis J formed by the beam 82 in the plan view from the Z-axis direction and a second movable electrode assembly 812 located on the other side (the Y-axis direction minus side) of the swing axis J in the plan view from the Z-axis direction. The first movable electrode assembly 811 and the second movable electrode assembly 812 are designed such that rotation moments at the time when the acceleration Az is applied are different from each other. Therefore, when the acceleration Az is applied, the movable member 81 swings in a seesaw manner around the swing axis J.

The element assembly 8 is formed by patterning a silicon substrate doped with an impurity such as phosphorus (P) or boron (B). The element assembly 8 is bonded to the substrate 2 by the anodic bonding. The element assembly 8 is electrically connected to the wire 73 in the mount 211.

As shown in FIG. 40, a first fixed electrode assembly 88 opposed to the first movable electrode assembly 811 and a second fixed electrode assembly 89 opposed to the second movable electrode assembly 812 are provided on the bottom surface of the recess 21. As shown in FIG. 39, the first fixed electrode assembly 88 is electrically connected to the wire 71 and the second fixed electrode assembly 89 is electrically connected to the wire 72.

During operation of the physical quantity sensor 1, for example, the voltage V1 is applied to the movable member 81 and the voltage V2 is applied to each of the first fixed electrode assembly 88 and the second fixed electrode assembly 89 (see FIG. 4). Therefore, capacitance is formed between the first movable electrode assembly 811 and the first fixed electrode assembly 88 and capacitance is formed between the second movable electrode assembly 812 and the second fixed electrode assembly 89.

When the acceleration Az is applied to the physical quantity sensor 1, the movable member 81 swings in a seesaw manner around the swing axis J on the basis of the magnitude of the acceleration Az. A gap between the first movable electrode assembly 811 and the first fixed electrode assembly 88 and a gap between the second movable electrode assembly 812 and the second fixed electrode assembly 89 respectively change according to the seesaw swing. The capacitance between the first movable electrode assembly 811 and the first fixed electrode assembly 88 and the capacitance between the second movable electrode assembly 812 and the second fixed electrode assembly 89 respectively change according to the change of the gaps. Therefore, the acceleration Az can be detected on the basis of amounts of the changes in the capacitance.

As shown in FIG. 39, the restrictor 9 configured to restrict a movable range of the movable member 81 is disposed around the movable member 81.

The movable member 81 includes a first outer edge 81*a* (a first end) located on the Y-axis direction plus side of the fixed member 83 and disposed along the X-axis direction, a second outer edge 81*b* (a second end) located on the Y-axis direction minus side of the fixed member 83 and disposed along the X-axis direction, a third outer edge 81*c* located on the X-axis direction plus side of the fixed member 83 and disposed along the Y-axis direction, and a fourth outer edge 81*d* located on the X-axis direction minus side of the fixed member 83 and disposed along the Y-axis direction.

The restrictor 9 includes the first restrictor 91 located on the Y-axis direction plus side of the first outer edge 81*a* and disposed to be opposed to the first outer edge 81*a* via a gap, the second restrictor 92 located on the Y-axis direction minus side of the second outer edge 81*b* and disposed to be opposed to the second outer edge 81*b* via a gap, the third restrictor 93 located on the X-axis direction plus side of the third outer edge 81*c* and disposed to be opposed to the third outer edge 81*c* via a gap, and the fourth restrictor 94 located on the X-axis direction minus side of the fourth outer edge 81*d* and disposed to be opposed to the fourth outer edge 81*d* via a gap. Note that the configuration of the restrictor 9 is the same as the configuration in the first embodiment. Therefore, detailed explanation of the configuration is omitted.

The movable member 81 comes into contact with the first restrictor 91, whereby displacement of the movable member 81 to the Y-axis direction plus side is restricted. The movable member 81 comes into contact with the second restrictor 92, whereby displacement of the movable member 81 to the Y-axis direction minus side is restricted. The movable member 81 comes into contact with the third restrictor 93, whereby displacement of the movable member 81 in the X-axis direction plus side is restricted. The movable member 81 comes into contact with the fourth restrictor 94, whereby displacement of the movable member 81 in the X-axis direction minus side is restricted. In particular, when the movable member 81 is excessively displaced to the Y-axis direction plus side, the entire region in the length direction of the first outer edge 81*a* comes into contact with the first restrictor 91. Therefore, stress during the contact can be mitigated. Similarly, when the movable member 81 is excessively displaced to the Y-axis direction minus side, the entire region in the length direction of the second outer edge 81*b* comes into contact with the second restrictor 92. Therefore, stress during the contact can be mitigated. With the restrictor 9, while allowing displacement (swing around the swing axis J) for detecting the acceleration Az of the movable member 81, it is possible to reduce excessive displacement in directions other than the direction of the displacement. Therefore, damage to the element assembly 8 can be reduced. The physical quantity sensor 1 having excellent shock resistance is obtained.

The physical quantity sensor 1 according to this embodiment is explained above. As explained above, the physical quantity sensor 1 includes the substrate 2, the element assembly 8 (a swinging body) including the movable member 81 including the first movable electrode assembly 811 (a first mass member) and the second movable electrode assembly 812 (a second mass member), the fixed member 83 disposed between the first movable electrode assembly 811 and the second movable electrode assembly 812 in a plan view and supported by the substrate 2, and the beam 82 (a coupler) that couples the movable member 81 and the fixed member 83, the first fixed electrode assembly 88 disposed on the substrate 2 to be opposed to the first movable electrode 811, the second fixed electrode assembly 89 disposed on the substrate 2 to be opposed to the second movable electrode assembly 812, and the restrictor 9 configured to restrict a movable range of the element assembly 8 in a direction in which the first movable electrode assembly 811 and the second movable electrode assembly 812 are disposed side by side in a plan view from the normal direction of the substrate 2. The restrictor 9 includes at least one of (in this embodiment, both of) the first restrictor 91 disposed to be opposed to the first outer edge 81a via a gap on the opposite side of the side of the fixed member 83 with respect to the first outer edge 81a (a first end) located on the first movable electrode assembly 811 side of the movable member 81 and the second restrictor 92 disposed to be opposed to the second outer edge 81b via a gap on the opposite side of the side of the fixed member 83 with respect to the second outer edge 81b (a second end) located on the second movable electrode assembly 812 side of the movable member 81.

With such a configuration, excessive displacement in the X-axis direction of the movable member 81 is prevented. Therefore, the physical quantity sensor 1 having excellent shock resistance is obtained. Note that, in this embodiment, the restrictor 9 includes both of the first restrictor 91 and the second restrictor 92. However, the restrictor 9 is not limited to this and only has to include at least one of the first restrictor 91 and the second restrictor 92. That is, the restrictor 9 may include only the first restrictor 91 as shown in FIG. 41 or may include only the second restrictor 92 as shown in FIG. 42. Consequently, the restrictor 9 can exert a function of a stopper for at least acceleration to one side in the X-axis direction.

Sixteenth Embodiment

A physical quantity sensor device according to a sixteenth embodiment of the invention is explained.

Figure 43:
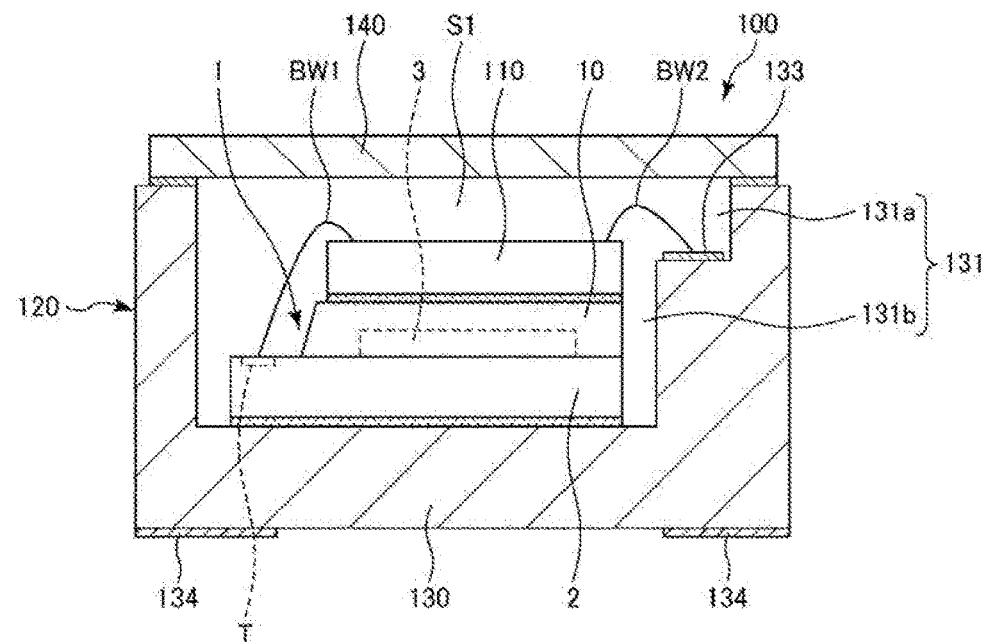
FIG. 43 is a sectional view showing a physical quantity sensor device according to a sixteenth embodiment of the invention.
Figure 44:
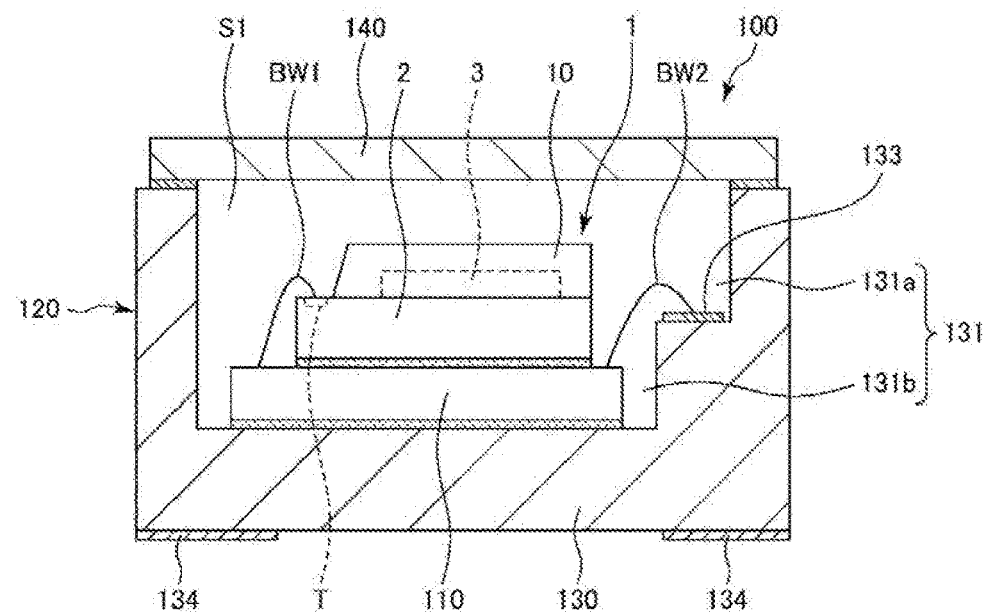
FIG. 44 is a sectional view showing a modification of the physical quantity sensor device shown in FIG. 43.
Figure 45:
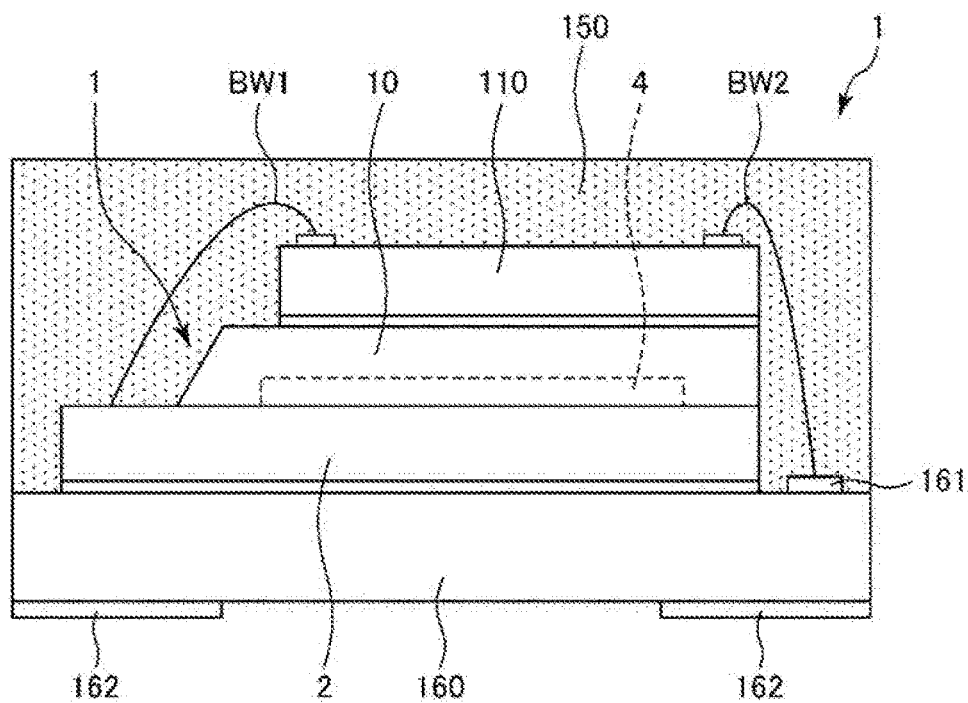
FIG. 45 is a sectional view showing a modification of the physical quantity sensor device shown in FIG. 43.

FIG. 43 is a sectional view showing the physical quantity sensor device according to the sixteenth embodiment of the invention. FIGS. 44 and 45 are respectively sectional views showing modifications of the physical quantity sensor device shown in FIG. 43.

As shown in FIG. 43, a physical quantity sensor device 100 includes the physical quantity sensor 1, a circuit element 110, and a package 120 configured to house the physical quantity sensor 1 and the circuit element 110. The physical quantity sensor 1 is not particularly limited. For example, the physical quantity sensors 1 according to the embodiments explained above can be used. The physical quantity sensor device 100 can be suitably used as an inertia measurement unit (MIU).

The circuit element 110 (an IC) is bonded to the lid body 10 of the physical quantity sensor 1 via a bonding member. The circuit element 110 is electrically connected to the terminals T of the physical quantity sensor 1 via a bonding wire BW1 and electrically connected to the package 120 (an internal terminal 133 explained below) via a bonding wire BW2. The circuit element 110 includes, according to necessity, a driving circuit configured to drive the physical quantity sensor 1, a detection circuit configured to detect acceleration on the basis of an output signal from the physical quantity sensor 1, a correction circuit configured to correct the detected acceleration, and an output circuit configured to convert a signal output from the detection circuit into a predetermined signal and output the predetermined signal. Note that the circuit element 110 may be provided on the outer side of the package 120 or may be omitted.

The package 120 includes a base 130 and a lid body 140 bonded to the upper surface of the base 130 to form a housing space S1, in which the physical quantity sensor 1 and the circuit element 110 are housed, between the lid body 140 and the base 130.

The base 130 is formed in a cavity shape including a recess 131 opened on the upper surface of the base 130. The recess 131 includes a first recess 131a opened on the upper surface of the base 130 and a second recess 131b opened on the bottom surface of the first recess 131a.

On the other hand, the lid body 140 is tabular and is bonded to the upper surface of the base 130 to close the opening of the recess 131. In this way, the housing space S1 is formed by closing the opening of the recess 131 with the lid body 140. The physical quantity sensor 1 and the circuit element 110 are housed in the housing space S1.

The housing space S1 is hermetically sealed and has the same atmosphere as the atmosphere in the housing space S of the physical quantity sensor 1. Consequently, even if the airtightness of the housing space S is broken and the housing space S and the housing space S1 communicate, the atmosphere in the housing space S can be maintained. Therefore, a change in a physical quantity detection characteristic of the physical quantity sensor 1 due to a change in the atmosphere in the housing space S can be reduced. The physical quantity sensor device 100 that can perform stable driving is obtained. Note that the "same atmosphere" not only means that the atmospheres completely coincide but also means that the spaces have an inevitable error in manufacturing, for example, pressures in the spaces are slightly different. The atmosphere in the housing space S1 does not have to be the same as the atmosphere in the housing space S.

A constituent material of the base 130 is not particularly limited. Various ceramics, for example, oxide ceramics such as alumina, silica, titania, and zirconia and nitride ceramics such as silicon nitride, aluminum nitride, and titanium nitride can be used. In this case, the base 130 can be manufactured by sintering a stacked body of ceramic sheets (green sheets). By adopting such a configuration, the recess 131 can be easily manufactured.

A constituent material of the lid body 140 is not particularly limited. However, the constituent material is desirably a member having a coefficient of linear expansion approximate to a coefficient of linear expansion of the constituent material of the base 130. For example, when the constituent material of the base 130 is the ceramics described above, it is desirable to use an alloy such as Kovar as the constituent material of the lid body 140.

The base 130 includes a plurality of internal terminals 133 disposed on the bottom surface of the first recess 131a and a plurality of external terminals 134 disposed on the lower surface of the base 130. The internal terminals 133 are electrically connected to a predetermined external terminal 134 via a not-shown internal wire disposed in the base 130. The plurality of internal terminals 133 are respectively electrically connected to the circuit element 110 via the bonding wire BW2. Consequently, electric connection to the circuit element 110 can be performed from the outer side of the package 120. The physical quantity sensor device 100 is easily mounted.

The physical quantity sensor device 100 is explained above. The physical quantity sensor device 100 includes the physical quantity sensor 1 and the circuit element 110 as explained above. Therefore, the effects of the physical quantity sensor 1 explained above can be enjoyed. The physical quantity sensor device 100 having high reliability is obtained.

As explained above, in the physical quantity sensor device 100, the circuit element 110 is disposed to overlap the physical quantity sensor 1. Consequently, planar spread of the physical quantity sensor device 100 can be reduced. A reduction in the size of the physical quantity sensor device 100 can be achieved.

Note that the configuration of the physical quantity sensor device 100 is not particularly limited. For example, as shown in FIG. 44, the disposition of the physical quantity sensor 1 and the circuit element 110 may be opposite to the displacement in this embodiment. As shown in FIG. 45, the physical quantity sensor device 100 may include an interposer substrate 160 including a connection terminal 161 and an external terminal 162, the physical quantity sensor 1 disposed on the interposer substrate 160, the circuit element 110 disposed on the physical quantity sensor 1, and a mold 150 configured to mold the physical quantity sensor 1 and the circuit element 110.

Seventeenth Embodiment

A physical quantity sensor device according to a seventeenth embodiment of the invention is explained.

Figure 46:
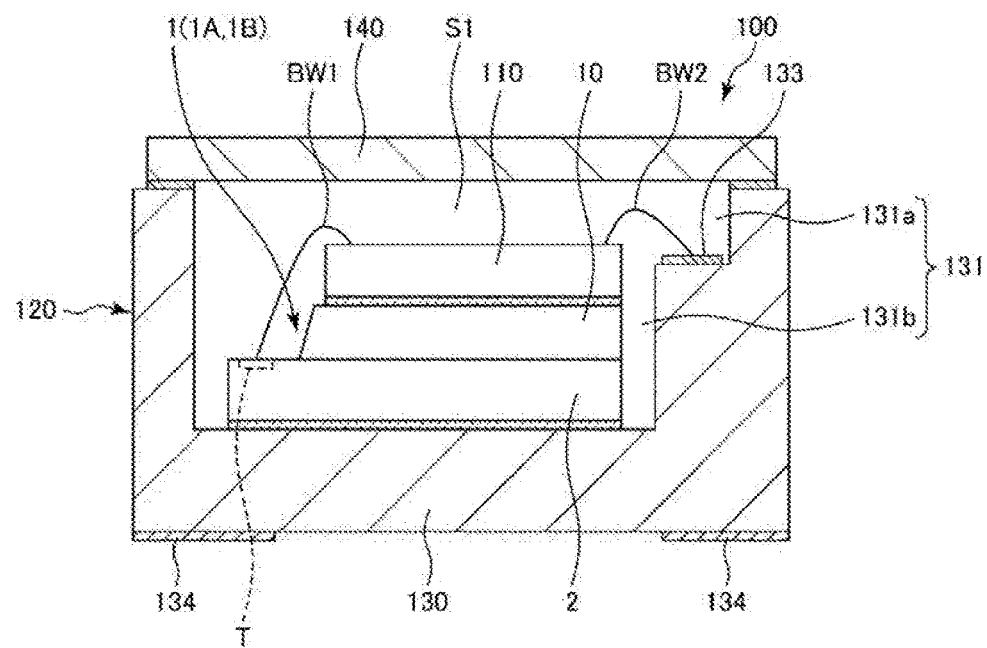
FIG. 46 is a sectional view showing a physical quantity sensor device according to a seventeenth embodiment of the invention.
Figure 47:
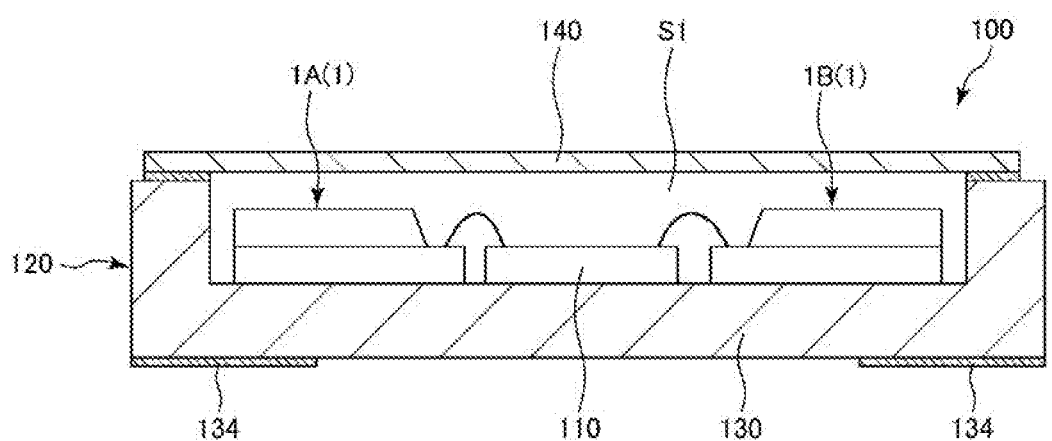
FIG. 47 is a sectional view showing a modification of the physical quantity sensor device shown in FIG. 46.

FIG. 46 is a sectional view showing the physical quantity sensor device according to the seventeenth embodiment of the invention. FIG. 47 is a sectional view showing a modification of the physical quantity sensor device shown in FIG. 46.

The physical quantity sensor device 100 according to this embodiment is the same as the physical quantity sensor device 100 according to the sixteenth embodiment explained above mainly except that the configuration of the physical quantity sensor 1 is different.

Note that, in the following explanation, concerning the physical quantity sensor device 100 according to the seventeenth embodiment, differences from the sixteenth embodiment explained above are mainly explained. Explanation of similarities is omitted. In FIG. 46, the same components as the components in the sixteenth embodiment explained above are denoted by the same reference numerals and signs.

As shown in FIG. 46, the physical quantity sensor according to this embodiment includes an acceleration sensor 1A capable of detecting acceleration and an angular velocity sensor 1B capable of detecting angular velocity. The acceleration sensor 1A only has to be capable of detecting at least one of acceleration in the X-axis direction, acceleration in the Y-axis direction, and acceleration in the Z-axis direction. However, the acceleration sensor 1A desirably can detect all of these accelerations. As the acceleration sensor 1A, the same configuration as the physical quantity sensors 1 according to the embodiments explained above can be used. On the other hand, the angular velocity sensor 1B only has to be capable of detecting at least one of angular velocity around the X axis, angular velocity around the Y axis, and angular velocity around the Z axis. However, the angular velocity sensor 1B desirably can detect all of these angular velocities. Consequently, the physical quantity sensor device 100 that can detect accelerations of three axes and angular velocities of three axes is obtained. More information can be acquired.

The physical quantity sensor device 100 is explained above. As explained above, in the physical quantity sensor device 100, the physical quantity sensor 1 includes the acceleration sensor 1A and the angular velocity sensor 1B. Therefore, the physical quantity sensor device 100 that can acquire more kinds of information is obtained. The physical quantity sensor device 100 can be particularly suitably applied as an inertia measurement unit (MIU).

Note that the configuration of the physical quantity sensor device 100 is not particularly limited. For example, as shown in FIG. 47, the acceleration sensor 1A and the angular velocity sensor 1B may be separately disposed. Further, the acceleration sensor 1A, the angular velocity sensor 1B, and the circuit element 110 may be planarly disposed without overlapping.

Eighteenth Embodiment

An electronic device according to an eighteenth embodiment of the invention is explained.

Figure 48:
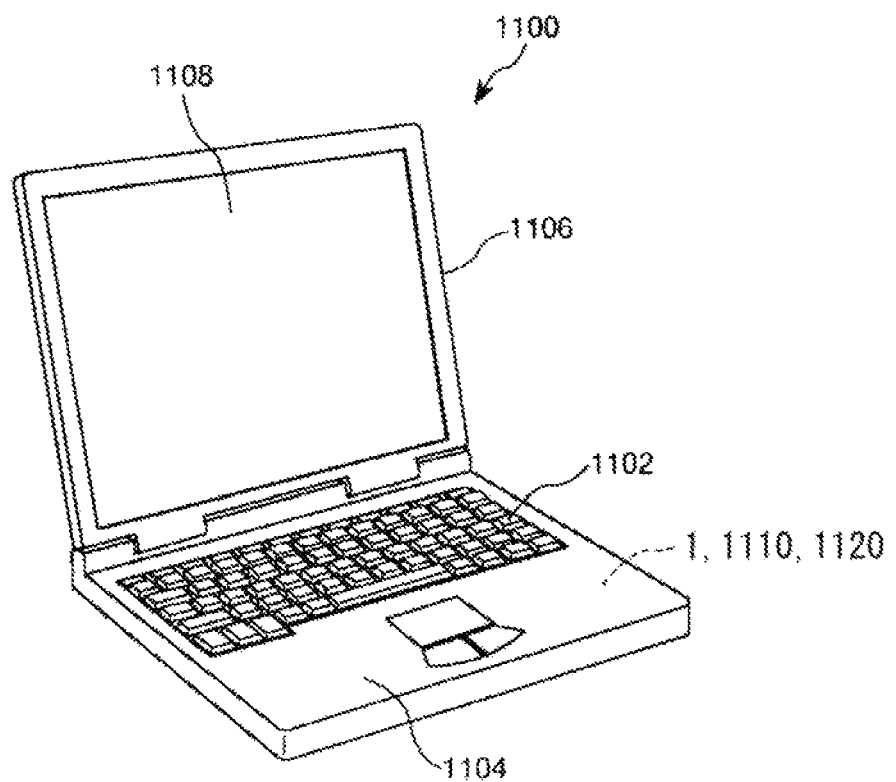
FIG. 48 is a perspective view showing an electronic device according to an eighteenth embodiment of the invention.

FIG. 48 is a perspective view showing the electronic apparatus according to the eighteenth embodiment of the invention.

A personal computer 1100 of a mobile type (a notebook type) shown in FIG. 48 is an application of the electronic device according to this embodiment. In this figure, the personal computer 1100 is configured by a main body 1104 including a keyboard 1102, and a display 1106 including a display 1108. The display 1106 is turnably supported with respect to the main body 1104 via a hinge structure section.

In the personal computer 1100, the physical quantity sensor 1, a control circuit 1110 configured to control driving of the physical quantity sensor 1, and a correction circuit 1120 configured to correct, on the basis of, for example, an environmental temperature, a physical quantity detected by the physical quantity sensor 1 are incorporated. Note that the physical quantity sensor 1 is not particularly limited. For example, all of the physical quantity sensors 1 according to the embodiments explained above can be used.

The personal computer 1100 (the electronic device) includes the physical quantity sensor 1, the control circuit 1110, and the correction circuit 1120. Therefore, the effects of the physical quantity sensor 1 explained above can be enjoyed. High reliability can be exerted.

Nineteenth Embodiment

An electronic device according to a nineteenth embodiment of the invention is explained.

Figure 49:
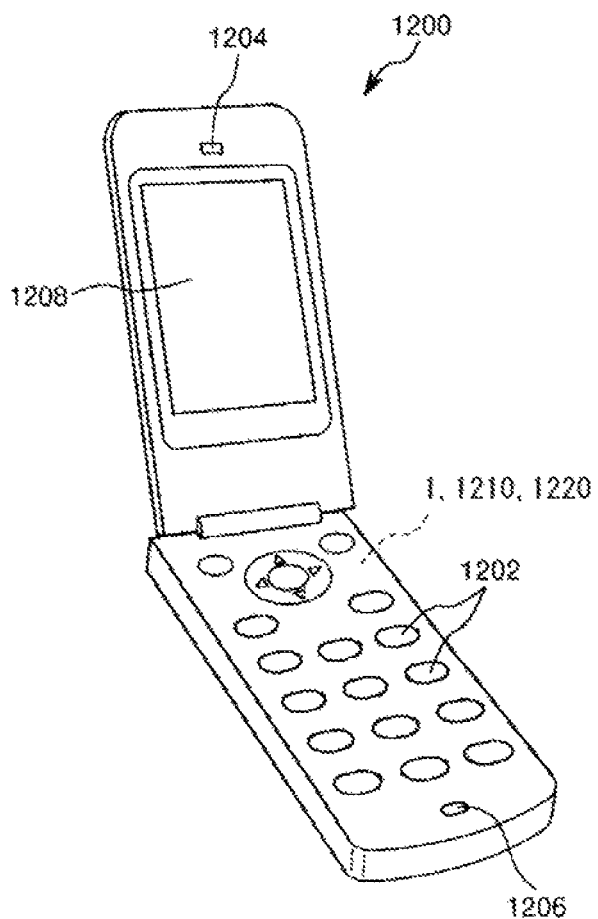
FIG. 49 is a perspective view showing an electronic device according to a nineteenth embodiment of the invention.

FIG. 49 is a perspective view showing the electronic device according to the nineteenth embodiment of the invention.

A cellular phone 1200 (including a PHS) shown in FIG. 49 is an application of the electronic device according to this embodiment. In this figure, the cellular phone 1200 includes an antenna (not shown in the figure), a plurality of operation buttons 1202, an ear piece 1204, and a mouth piece 1206. A display 1208 is disposed between the operation buttons 1202 and the ear piece 1204.

In the cellular phone 1200, the physical quantity sensor 1, a control circuit 1210 configured to control driving of the physical quantity sensor 1, and a correction circuit 1220 configured to correct, on the basis of, for example, an environmental temperature, a physical quantity detected by the physical quantity sensor 1 are incorporated. Note that the physical quantity sensor 1 is not particularly limited. For example, all of the physical quantity sensors 1 according to the embodiments explained above can be used.

The cellular phone 1200 (the electronic device) includes the physical quantity sensor 1, the control circuit 1210, and the correction circuit 1220. Therefore, the effects of the physical quantity sensor 1 explained above can be enjoyed. High reliability can be exerted.

Twentieth Embodiment

An electronic device according to a twentieth embodiment of the invention is explained.

Figure 50:
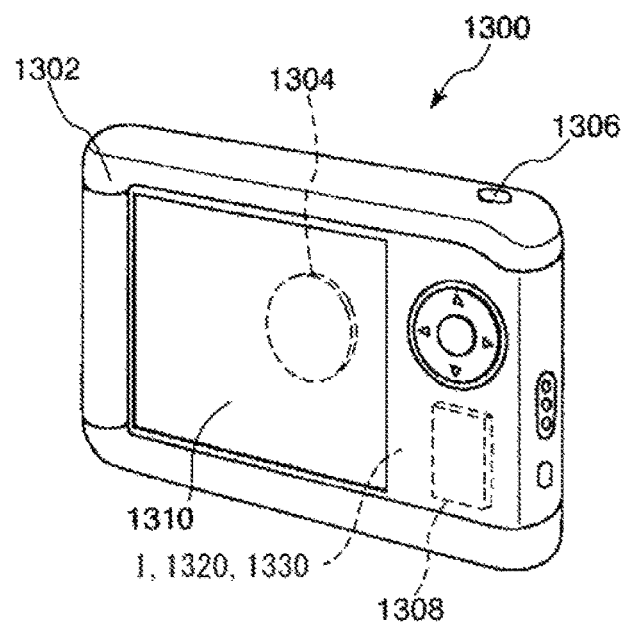
FIG. 50 is a perspective view showing an electronic device according to a twentieth embodiment of the invention.

FIG. 50 is a perspective view showing the electronic device according to the twentieth embodiment of the invention.

A digital still camera 1300 shown in FIG. 50 is an application of the electronic device according to this embodiment. In this figure, a display 1310 is provided on the rear surface of a case 1302. The display 1310 is configured to perform display on the basis of an imaging signal generated by a CCD. The display 1310 functions as a finder that displays an object as an electronic image. A light receiver 1304 including an optical lens (an imaging optical system) and a CCD is provided on the front surface side (in the figure, the rear surface side) of the case 1302. When a photographer confirms an object image displayed on the display 1310 and presses a shutter button 1306, an imaging signal of the CCD at that point in time is transferred to and stored in a memory 1308.

In the digital still camera 1300, the physical quantity sensor 1, a control circuit 1320 configured to control driving of the physical quantity sensor 1, and a correction circuit 1330 configured to correct, on the basis of, for example, an environment temperature, a physical quantity detected by the physical quantity sensor 1 are incorporated. Note that the physical quantity sensor 1 is not particularly limited. For example, all of the physical quantity sensors 1 according to the embodiments explained above can be used.

The digital still camera 1300 (the electronic device) includes the physical quantity sensor 1, the control circuit 1320, and the correction circuit 1330. Therefore, the effects of the physical quantity sensor 1 explained above can be enjoyed. High reliability can be exerted.

Note that the electronic device according to this embodiment can be applied to, besides the personal computer and the cellular phone in the embodiments explained above and the digital still camera in this embodiment, for example, a smartphone, a tablet terminal, a watch (including a smartwatch), an inkjet-type ejecting apparatus (e.g., an inkjet printer), a laptop personal computer, a television, a wearable terminal such as a HMD (head mounted display), a video camera, a video tape recorder, a car navigation device, a pager, an electronic notebook (including an electronic notebook with a communication function), an electronic dictionary, an electronic calculator, an electronic game machine, a word processor, a work station, a video phone, a television monitor for crime prevention, an electronic binocular, a POS terminal, medical devices (e.g., an electronic thermometer, a manometer, a blood sugar meter, an electrocardiographic device, an ultrasonic diagnosis device, and an electronic endoscope), a fish finder, various measuring devices, a device for a mobile terminal base station, meters (e.g., meters for a vehicle, an airplane, and a ship), a flight simulator, and a network server.

Twenty-First Embodiment

A portable electronic device according to a twenty-first embodiment of the invention is explained.

Figure 51:
FIG. 51 is a plan view showing a portable electronic device according to a twenty-first embodiment of the invention.
Figure 52:
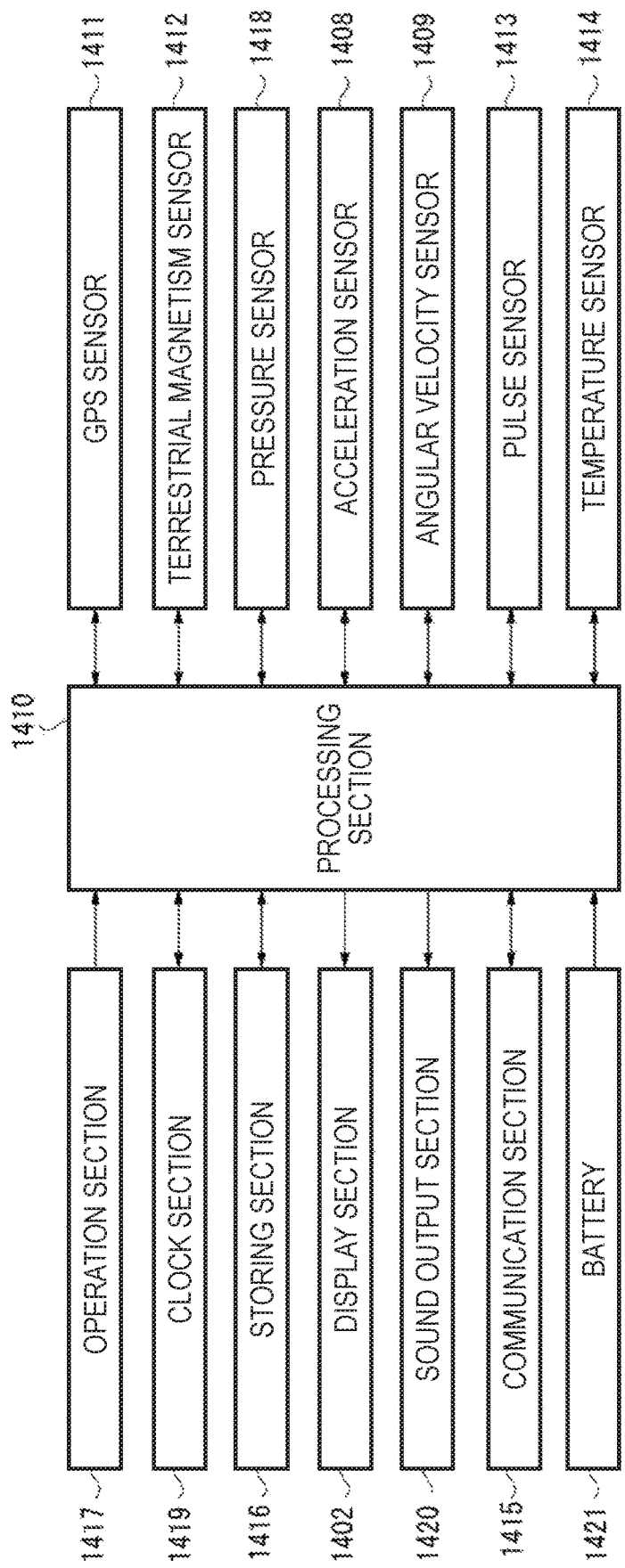
FIG. 52 is a functional block diagram showing a schematic configuration of the portable electronic device shown in FIG. 51.

FIG. 51 is a plan view showing the portable electronic device according to the twenty-first embodiment of the invention. FIG. 52 is a functional block diagram showing a schematic configuration of the portable electronic device shown in FIG. 51.

An activity meter 1400 (an active tracker) of a wristwatch type shown in FIG. 51 is a wrist device applied with the portable electronic device according to this embodiment. The activity meter 1400 is worn on a part (a subject) such as a wrist of a user by a band 1401. The activity meter 1400 includes a digital display 1402 and is capable of performing wireless communication. The physical quantity sensor 1 according to any one of the embodiments explained above is incorporated in the activity meter 1400 as a sensor that measures acceleration or a sensor that measures angular velocity.

The activity meter 1400 includes a case 1403 in which the physical quantity sensor 1 is housed, a processor 1410 housed in the case 1403 and configured to process output data from the physical quantity sensor 1, the display 1402 housed in the case 1403, and a light-transmissive cover 1404 closing an opening of the case 1403. A bezel 1405 is provided on the outer side of the light-transmissive cover 1404. A plurality of operation buttons 1406 and 1407 are provided on a side surface of the case 1403.

As shown in FIG. 52, an acceleration sensor 1408 functioning as the physical quantity sensor 1 detects respective accelerations in three-axis directions crossing (ideally, orthogonal to) one another and outputs signals (acceleration signals) corresponding to magnitudes and directions of the detected three-axis accelerations. An angular velocity sensor 1409 detects respective angular velocities in three-axis directions crossing (ideally, orthogonal to) one another and outputs signals (acceleration signals) corresponding to magnitudes and directions of the detected three-axis angular velocities.

On a liquid crystal display (LCD) configuring the display 1402, for example, position information and a movement amount detected using a GPS sensor 1411 and a terrestrial magnetism sensor 1412, exercise information such as an exercise amount detected using the acceleration sensor 1408 and the angular velocity sensor 1409 included in the physical quantity sensor 1, biological information such as a pulse rate detected using a pulse sensor 1413 or the like, and time information such as present time are displayed according to various detection modes. Note that environmental temperature detected using a temperature sensor 1414 can also be displayed.

A communication assembly 1415 performs various kinds of control to establish communication between a user terminal and a not-shown information terminal. The communication assembly 1415 includes a transmitter adapted to a short range wireless communication standard such as Bluetooth (registered trademark) (including BTLE: Bluetooth Low Energy), Wi-Fi (registered trademark) (Wireless Fidelity), Zigbee (registered trademark), NFC (Near field communication), or ANT+ (registered trademark) and a connector adapted to a communication bus standard such as USB (Universal Serial Bus).

The processor 1410 is configured by, for example, a MPU (Micro Processing Unit), a DSP (Digital Signal Processor), or an ASIC (Application Specific Integrated Circuit). The processor 1410 executes various kinds of processing on the basis of computer programs stored in a memory 1416 and signals input from an interface 1417 (e.g., the operation buttons 1406 and 1407). The processing by the processor 1410 includes data processing for output signals of the GPS sensor 1411, the terrestrial magnetism sensor 1412, a pressure sensor 1418, the acceleration sensor 1408, the angular velocity sensor 1409, the pulse sensor 1413, the temperature sensor 1414, and a clock 1419, display processing for causing the display 1402 to display an image, sound output processing for causing a sound output assembly 1420 to output sound, communication processing for performing communication with an information terminal via the communication assembly 1415, and power control processing for supplying electric power from a battery 1421 to the various components.

The activity meter 1400 can have at least the following functions:

1. Distance: measuring a total distance from a measurement start with a high-precision GPS function.
2. Pace: displaying a present running pace from pace distance measurement.
3. Average speed: calculating and displaying average speed from an average speed running start to the present.
4. Altitude: measuring and displaying an altitude with a GPS function.
5. Stride: measuring and displaying a step even in a tunnel or the like where a GPS radio wave does not reach.
6. Pitch: measuring and displaying the number of steps per one minute.
7. Heart rate: measuring and displaying a heart rate with a pulse sensor.
8. Gradient: measuring and displaying a gradient of the ground in training or trail run in a mountainous area.
9. Auto lap: automatically performing lap measurement when a user runs a fixed distance or a fixed time set beforehand.
10. Exercise consumed calorie: displaying a consumed calorie.
11. Number of steps: displaying a total of the number of steps from an exercise start.

The activity meter 1400 (the portable electronic device) includes the physical quantity sensor 1, the case 1403 in which the physical quantity sensor 1 is housed, the processor 1410 housed in the case 1403 and configured to process output data from the physical quantity sensor 1, the display 1402 housed in the case 1403, and the light-transmissive cover 1404 closing the opening of the case 1403. Therefore, the effects of the physical quantity sensor 1 explained above can be enjoyed. High reliability can be exerted.

Note that the activity meter 1400 can be widely applied to a running watch, a runner's watch, a runner's watch adaptable to multi-sports such as duathlon and triathlon, an outdoor watch, a GPS watch mounted with a satellite positioning system, for example, a GPS, and the like.

In the above explanation, the GPS (Global Positioning System) is used as the satellite positioning system. However, other Global Navigation Satellite Systems (GNSSs) may be used. For example, one or two or more of satellite positioning systems such as an EGNOS (European Geostationary-Satellite Navigation Overlay Service), a QZSS (Quasi Zenith Satellite System), a GLONASS (GLObal NAvigation Satellite System), a GALILEO, and a BeiDou (BeiDou Navigation Satellite System) may be used. A Satellite-based Augmentation System (SBAS) such as a WAAS (Wide Area Augmentation System) or an EGNOS (European Geostationary-Satellite Navigation Overlap Service) may be used as at least one of the satellite positioning systems.

Twenty-Second Embodiment

A mobile body according to a twenty-second embodiment of the invention is explained.

Figure 53:
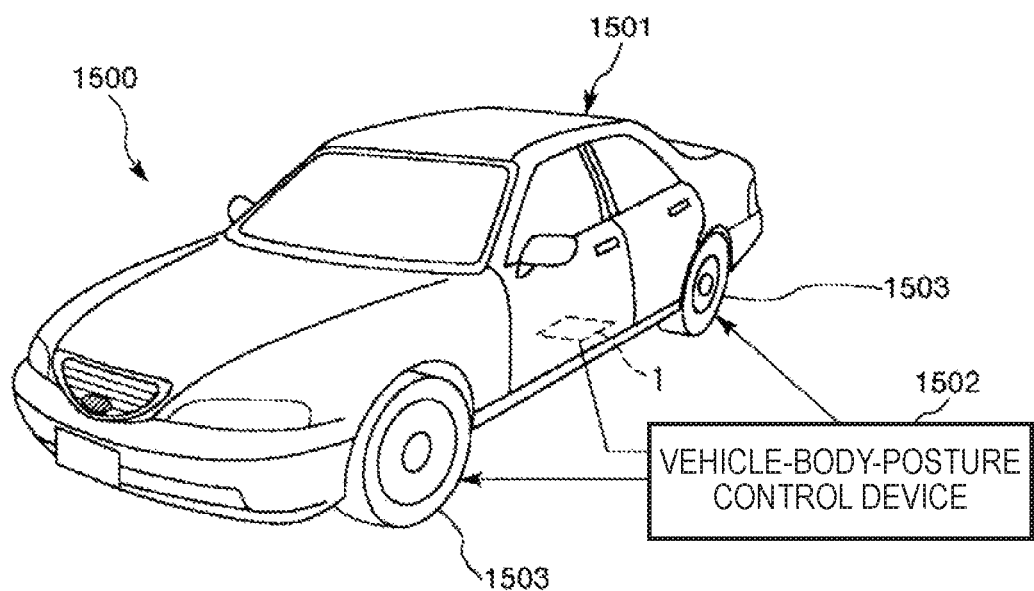
FIG. 53 is a perspective view showing a mobile body according to a twenty-second embodiment of the invention.

FIG. 53 is a perspective view showing the mobile body according to the twenty-second embodiment of the invention.

An automobile 1500 shown in FIG. 53 is an automobile applied with the mobile body according to this embodiment. In this figure, the physical quantity sensor 1 functioning as at least one of an acceleration sensor and an angular velocity sensor (preferably, a composite sensor that can detect both of acceleration and angular velocity) is incorporated in the automobile 1500. A posture of a vehicle body 1501 can be detected by the physical quantity sensor 1. A detection signal of the physical quantity sensor 1 is supplied to a vehicle-body-posture control device 1502 (a posture controller). The vehicle-body-posture control device 1502 can detect the posture of the vehicle body 1501 on the basis of the signal, control hardness and softness of a suspension according to a result of the detection, and control brakes of respective wheels 1503. As the physical quantity sensor 1, for example, the same physical quantity sensor 1 as the physical quantity sensors 1 according to in the embodiments can be used.

The automobile 1500 (the mobile body) includes the physical quantity sensor 1 and the vehicle-body-posture control device 1502 (the posture controller). Therefore, the effects of the physical quantity sensor 1 can be enjoyed. High reliability can be exerted.

Note that, besides, the physical quantity sensor 1 can be widely applied to electronic control units (ECUs) of a car navigation system, a car air conditioner, an antilock brake system (ABS), an air bag, a tire pressure monitoring system (TPMS), an engine control, a battery monitor of a hybrid automobile and an electric automobile, and the like.

The mobile body is not limited to the automobile 1500. The mobile body can also be applied to, for example, an airplane, a rocket, an artificial satellite, a ship, an AGV (Automatic Guided Vehicle), a bipedal walking robot, and an unmanned aircraft such as a drone.

The embodiments of the invention are explained above with reference to the drawings. However, the invention is not limited to the embodiments. The components of the assemblies and members can be replaced with any components having the same functions. Any other components may be added to the invention. The embodiments may be combined as appropriate.

In the embodiments, the configuration including one element assembly is explained. However, a plurality of element assemblies may be provided. In this case, accelerations in a plurality of axial directions can be detected by disposing the plurality of element assemblies to differentiate detection axes from one another.

In the embodiments, the physical quantity sensor that detects acceleration is explained. However, the physical quantity sensor is not limited to this. For example, the physical quantity sensor may detect angular velocity. The physical quantity sensor may detect both of the acceleration and angular velocity.

The entire disclosure of Japanese Patent Application no. 2017-162281 filed Aug. 25, 2017 is expressly incorporated herein by reference.

What is claimed is:

1. A physical quantity sensor comprising:
   a substrate;
   an element assembly, a periphery of the element assembly having first, second, third, and fourth sides, the first side and the second side being opposite to each other in a first direction, the first and second sides extending in a second direction perpendicular to the first direction, the third side and the fourth side being opposite to each other in the second direction, the third and fourth sides extending in the first direction, the element assembly including:
   a fixed member extending along the first direction and passing a center of the element assembly, part of the fixed member being fixed to the substrate;

a fixed electrode having a stem and a plurality of fixed electrode fingers, the stem obliquely extending with respect to the first and second directions, part of the stem being fixed to the substrate, the plurality of fixed electrode fingers extending in the second direction from the stem; and a movable member, the movable member being frame-shaped, a periphery of the movable member being the periphery of the element assembly, the movable member being configured by:

a movable electrode section having a plurality of movable electrode fingers, the movable electrode section being displaceable in the first direction with respect to the fixed electrode, the plurality of movable electrode fingers extending in the second direction from the third and fourth sides, the plurality of fixed electrode fingers and the plurality of movable electrode fingers facing to each other in the first direction; and first and second edge sections at the first and second sides, respectively, the first and second edge sections being coupled to the fixed member and the movable electrode section; and first and second restrictors configured to restrict a movable range of the movable member in the first direction, wherein the movable electrode section with the plurality of movable electrode fingers and the first and second edge sections form a monolithic structure of the movable member, wherein the first restrictor is located directly adjacent to the first edge section, and the first restrictor faces an entirety of the first side of the periphery of the element assembly via a first gap, and the second restrictor is located directly adjacent to the second edge section, and the second restrictor faces the second side of the periphery of the element assembly via a second gap.

2. An electronic device comprising:
the physical quantity sensor according to claim 1;
a control circuit configured to control driving of the physical quantity sensor; and
a correction circuit configured to correct a physical value detected by the physical quantity sensor based on an environmental temperature.

3. A portable electronic device comprising:
the physical quantity sensor according claim 1, the physical quantity sensor configured to detect a physical value of the portable electronic device so as to output a detection signal corresponding to the detected physical value of the portable electronic device;
a case in which the physical quantity sensor is housed;
a processor housed in the case and configured to process the detection signal from the physical quantity sensor;
a display housed in the case, the display being configured to display information corresponding to the detection signal; and
a light-transmissive cover closing an opening of the case.

4. A mobile body comprising:
the physical quantity sensor according to claim 1, the physical quantity sensor configured to detect a physical value of the mobile body so as to output a detection signal corresponding to the detected physical value of the mobile body; and
a posture controller configured to detect a posture of the mobile body based on the detection signal so as to control the mobile body.

5. The physical quantity sensor according to claim 1, wherein the second restrictor faces an entirety of the second side of the periphery of the element assembly via the second gap.

6. The physical quantity sensor according to claim 1, wherein at least one of the first restrictor and the second restrictor has elasticity in the first direction.

7. The physical quantity sensor according to claim 6, wherein the element assembly has a thickness along a third direction perpendicular to the first and second directions, and
the at least one of the first restrictor the second restrictor has a slit extending along the second direction when viewed along the third direction.

8. The physical quantity sensor according to claim 1, wherein the element assembly has a thickness along a third direction perpendicular to the first and second directions, and
the substrate and at least one of the first restrictor and the second restrictor is spaced apart via a bottom gap along the third direction.

9. The physical quantity sensor according to claim 1, further comprising:
a third restrictor located directly adjacent to the third side of the element assembly, the third restrictor facing the third side of the periphery of the element assembly via a third gap; and
a fourth restrictor located directly adjacent to the fourth side of the element assembly, the fourth restrictor facing the fourth side of the periphery of the element assembly via a fourth gap.

10. The physical quantity sensor according to claim 1, wherein G1 is a separation distance along the first direction between a first finger of the plurality of movable electrode fingers and a second finger, which is located directly adjacent to the first finger, of the plurality of fixed electrode fingers, G2 is a separation distance along the first direction between the first outer edge and the first restrictor, G3 is a separation distance along the first direction between the second outer edge and the second restrictor, and G1>G2 and G1>G3.

11. The physical quantity sensor according to claim 1, wherein the first and second restrictors and the movable member have equal potentials.

12. The physical quantity sensor according to claim 1, wherein the movable member and the first and second restrictors are made of the same material.

13. The physical quantity sensor according to claim 1, wherein the movable member and each of the first and second restrictors are configured to come into surface contact with each other.

14. A physical quantity sensor comprising:
a substrate;
an element assembly, a periphery of the element assembly having first, second, third, and fourth sides, the first side and the second side being opposite to each other in a first direction, the first and second sides extending in a second direction perpendicular to the first direction, the third side and the fourth side being opposite to each other in the second direction, the third and fourth sides extending in the first direction, the element assembly including:
a fixed member extending along the first direction and passing a center of the element assembly, part of the fixed member being fixed to the substrate;
a fixed electrode having a stem and a plurality of fixed electrode fingers, the stem obliquely extending with respect to the first and second directions, part of the stem being fixed to the substrate, the plurality of fixed electrode fingers extending in the second direction from the stem; and a movable member, the movable member being frame-shaped, a periphery of the movable member being the periphery of the element assembly, the movable member being configured by:

a movable electrode section having a plurality of movable electrode fingers, the movable electrode section being displaceable in the first direction with respect to the fixed electrode, the plurality of movable electrode fingers extending in the second direction from the third and fourth sides, the plurality of fixed electrode fingers and the plurality of movable electrode fingers facing to each other in the first direction; and first and second edge sections at the first and second sides, respectively, the first and second edge sections being coupled to the fixed member and the movable electrode section; and a restrictor configured to restrict a movable range of the movable electrode section in the first direction, the restrictor being located directly adjacent to the first edge section, the restrictor facing an entirety of the first side of the periphery of the element assembly via a gap, wherein the movable electrode section with the plurality of movable electrode fingers and the first and second edge sections form a monolithic structure of the movable member.

15. A physical quantity sensor device comprising:

a physical quantity sensor housed in a package, the physical quantity sensor having:

a substrate;

an element assembly, a periphery of the element assembly having first, second, third, and fourth sides, the first side and the second side being opposite to each other in a first direction, the first and second sides extending in a second direction perpendicular to the first direction, the third side and the fourth side being opposite to each other in the second direction, the third and fourth sides extending in the first direction, the element assembly including:

a fixed member extending along the first direction and passing a center of the element assembly, part of the fixed member being fixed to the substrate;

a fixed electrode having a stem and a plurality of fixed electrode fingers, the stem obliquely extending with respect to the first and second directions, part of the stem being fixed to the substrate, the plurality of fixed electrode fingers extending in the second direction from the stem; and a movable member, the movable member being frame-shaped, a periphery of the movable member being the periphery of the element assembly, the movable member being configured by:

a movable electrode section having a plurality of movable electrode fingers, the movable electrode section being displaceable in the first direction with respect to the fixed electrode, the plurality of movable electrode fingers extending in the second direction from the third and fourth sides, the plurality of fixed electrode fingers and the plurality of movable electrode fingers facing to each other in the first direction; and first and second edge sections at the first and second sides, respectively, the first and second edge sections being coupled to the fixed member and the movable electrode section;

first and second restrictors configured to restrict a movable range of the movable member in the first direction; and a circuit element housed in the package, wherein the movable electrode section with the plurality of movable electrode fingers and first and second edge sections form a monolithic structure of the movable member, wherein the first restrictor is located directly adjacent to the first edge section, and the first restrictor faces an entirety of the first side of the periphery of the element assembly via a first gap, and the second restrictor is located directly adjacent to the second edge section, and the second restrictor faces the second side of the periphery of the element assembly via a second gap.

16. The physical quantity sensor device according to claim 15, wherein the second restrictor faces an entirety of the second side of the periphery of the element assembly via the second gap.

17. The physical quantity sensor device according to claim 15, wherein the element assembly has a thickness along a third direction perpendicular to the first and second directions, and the circuit element overlaps the physical quantity sensor in the package when viewed along the third direction.

18. The physical quantity sensor device according to claim 15, wherein the physical quantity sensor includes:

an acceleration sensor element configured to detect an acceleration of an apparatus in which the physical quantity sensor is assembled; and an angular velocity sensor element configured to detect an angular velocity of an axis of the apparatus.

* * * * *